(12) United States Patent
Fischer et al.

(10) Patent No.: US 9,091,746 B2
(45) Date of Patent: Jul. 28, 2015

(54) DETERMINATION OF POSITIONS OF WIRELESS TRANSCEIVERS TO BE ADDED TO A WIRELESS COMMUNICATION NETWORK

(75) Inventors: Sven Fischer, Nuremberg (DE); Muhammad Awais Amin, Nuremberg (DE); Ravi Palanki, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 490 days.

(21) Appl. No.: 13/172,818

(22) Filed: Jun. 29, 2011

(65) Prior Publication Data

US 2012/0165012 A1 Jun. 28, 2012

Related U.S. Application Data

(60) Provisional application No. 61/471,625, filed on Apr. 4, 2011, provisional application No. 61/360,832, filed on Jul. 1, 2010.

(51) Int. Cl.
*H04W 24/10* (2009.01)
*G01S 5/10* (2006.01)
(Continued)

(52) U.S. Cl.
CPC .................. *G01S 5/10* (2013.01); *G01S 5/0242* (2013.01); *G01S 5/0289* (2013.01); *H04W 64/00* (2013.01)

(58) Field of Classification Search
CPC .............................. H04W 64/00; G01S 5/0242
USPC ........... 455/435.1, 456.1, 63.1; 370/328, 338, 370/252, 350; 342/451, 378, 458
See application file for complete search history.

(56) References Cited

U.S. PATENT DOCUMENTS 5,859,612 A 1/1999 Gilhousen 6,185,429 B1 2/2001 Gehrke
(Continued)

FOREIGN PATENT DOCUMENTS

| CN | 1288645 A | 3/2001 |
|---|---|---|
| CN | 1454013 A | 11/2003 |

(Continued)

OTHER PUBLICATIONS

Jun Xiao et al: "Research of TDOA Based Self-localization Approach in Wireless Sensor Network", Intelligent Robots and Systems, 2006 IEEE/RSJ International Conference on, IEEE, PI, Oct. 1, 2006, pp. 2035-2040, XP031006391, ISBN: 978-1-4244-0258-8.
(Continued)

*Primary Examiner* — Phuoc H Doan
(74) *Attorney, Agent, or Firm* — Silicon Valley Patent Group LLP

(57) ABSTRACT

Positions of non-reference wireless transceivers to be added to a wireless communication network are determined as follows. Each non-reference wireless transceiver performs measurements of times of arrival (TOA) of signals transmitted by other non-reference wireless transceivers, as well as reference wireless transceivers. Thereafter, time difference of arrival (TDOA) values are computed from at least two types of pairs of measurements as follows: (a) unknown-unknown TDOA values are obtained as differences between TOA measurements of signals transmitted by non-reference wireless transceivers and (b) unknown-known TDOA values are obtained as differences between a TOA measurement of a signal transmitted by a non-reference wireless transceiver and another TOA measurement of another signal transmitted by a reference wireless transceiver. Both types of TDOA values are used to solve simultaneous equations to identify the positions of the non-reference wireless transceivers and optionally times of transmission of the signals by the non-reference wireless transceivers.

54 Claims, 31 Drawing Sheets

(51) Int. Cl.
*G01S 5/02* (2010.01)
*H04W 64/00* (2009.01)

(56) References Cited

U.S. PATENT DOCUMENTS

| | | | |
|---|---|---|---|
| 6,317,049 B1 | 11/2001 | Toubia et al. |
| 6,317,474 B1 | 11/2001 | Carsello |
| 6,445,927 B1 | 9/2002 | King et al. |
| 6,570,530 B2 | 5/2003 | Gaal et al. |
| 6,714,563 B1 | 3/2004 | Kushi |
| 6,894,644 B2 | 5/2005 | Duffett-Smith et al. |
| 7,233,800 B2 | 6/2007 | Laroia et al. |
| 7,349,366 B2 | 3/2008 | De et al. |
| 7,660,588 B2 | 2/2010 | Sheynblat et al. |
| 7,706,328 B2 | 4/2010 | Mukkavilli et al. |
| 7,729,707 B2 | 6/2010 | Aljadeff |
| 7,813,383 B2 | 10/2010 | Wang et al. |
| 7,817,616 B2 | 10/2010 | Park et al. |
| 7,826,343 B2 | 11/2010 | Krasner |
| 7,940,740 B2 | 5/2011 | Krishnamurthy et al. |
| 8,130,657 B2 | 3/2012 | Mosko |
| 8,165,586 B2 | 4/2012 | Krishnamurthy et al. |
| 8,228,923 B1 | 7/2012 | Jain et al. |
| 8,233,432 B2 | 7/2012 | Northcutt et al. |
| 8,289,159 B2 | 10/2012 | Julian et al. |
| 8,326,318 B2 | 12/2012 | Attar et al. |
| 2001/0004601 A1 | 6/2001 | Drane et al. |
| 2001/0034238 A1 | 10/2001 | Voyer |
| 2002/0118723 A1 | 8/2002 | McCrady et al. |
| 2002/0155845 A1 | 10/2002 | Martorana |
| 2003/0036390 A1 | 2/2003 | Villier et al. |
| 2003/0119523 A1 | 6/2003 | Bulthuis |
| 2003/0189948 A1 | 10/2003 | Sashihara |
| 2004/0033808 A1 | 2/2004 | Rorabaugh |
| 2004/0052228 A1 | 3/2004 | Tellado et al. |
| 2005/0153653 A1 | 7/2005 | Diao et al. |
| 2005/0192024 A1 | 9/2005 | Sheynblat et al. |
| 2005/0281247 A1 | 12/2005 | Lim et al. |
| 2006/0125690 A1 | 6/2006 | Goren et al. |
| 2006/0160545 A1 | 7/2006 | Goren et al. |
| 2007/0040703 A1 | 2/2007 | Akkarakaran et al. |
| 2007/0075899 A1 | 4/2007 | Inaba |
| 2007/0121560 A1 | 5/2007 | Edge |
| 2007/0155401 A1 | 7/2007 | Ward et al. |
| 2007/0176826 A1 | 8/2007 | Daniele et al. |
| 2007/0177605 A1 | 8/2007 | Benco et al. |
| 2008/0088507 A1 | 4/2008 | Smith et al. |
| 2008/0125161 A1 | 5/2008 | Ergen et al. |
| 2008/0126161 A1 | 5/2008 | Willis et al. |
| 2008/0132247 A1 | 6/2008 | Anderson |
| 2008/0137691 A1 | 6/2008 | Barry et al. |
| 2008/0232517 A1 | 9/2008 | Terabe et al. |
| 2008/0267304 A1 | 10/2008 | Chong et al. |
| 2008/0274750 A1 | 11/2008 | Carlson et al. |
| 2008/0285505 A1 | 11/2008 | Carlson et al. |
| 2008/0318596 A1 | 12/2008 | Tenny |
| 2009/0034459 A1 | 2/2009 | Shousterman et al. |
| 2009/0097452 A1 | 4/2009 | Gogic |
| 2009/0149169 A1 | 6/2009 | Tanno et al. |
| 2009/0322603 A1 | 12/2009 | Liao |
| 2010/0014443 A1 | 1/2010 | Cristian et al. |
| 2010/0029295 A1 | 2/2010 | Touboul et al. |
| 2010/0054237 A1 | 3/2010 | Han |
| 2010/0074180 A1 | 3/2010 | Palanki |
| 2010/0110983 A1 | 5/2010 | Fu |
| 2010/0118737 A1 | 5/2010 | Kim et al. |
| 2010/0172311 A1 | 7/2010 | Agrawal |
| 2010/0232543 A1 | 9/2010 | Sampath et al. |
| 2010/0260154 A1 | 10/2010 | Frank et al. |
| 2010/0273506 A1 | 10/2010 | Stern-Berkowitz et al. |
| 2010/0279707 A1 | 11/2010 | Fischer |
| 2010/0322184 A1 | 12/2010 | Xiao |
| 2011/0059752 A1 | 3/2011 | Garin et al. |
| 2011/0103338 A1 | 5/2011 | Astely et al. |
| 2011/0124347 A1 | 5/2011 | Chen et al. |
| 2011/0188438 A1 | 8/2011 | Lee et al. |
| 2011/0237270 A1 | 9/2011 | Noh et al. |
| 2011/0317641 A1 | 12/2011 | Noh et al. |
| 2012/0027110 A1 | 2/2012 | Han et al. |
| 2012/0046047 A1 | 2/2012 | Popovic et al. |
| 2012/0057498 A1 | 3/2012 | Han et al. |
| 2012/0120842 A1 | 5/2012 | Kim et al. |
| 2012/0120903 A1 | 5/2012 | Kim et al. |
| 2012/0120917 A1 | 5/2012 | Shimomura et al. |
| 2012/0188129 A1* | 7/2012 | Ameti et al. ............... 342/451 |
| 2012/0189041 A1 | 7/2012 | Ko et al. |
| 2012/0229337 A1* | 9/2012 | Parker ...................... 342/378 |
| 2012/0263247 A1 | 10/2012 | Bhattad et al. |
| 2014/0071897 A1 | 3/2014 | Palanki et al. |

FOREIGN PATENT DOCUMENTS

| | | |
|---|---|---|
| CN | 1595836 A | 3/2005 |
| CN | 1628488 A | 6/2005 |
| CN | 1826538 A | 8/2006 |
| CN | 101048994 A | 10/2007 |
| EP | 1041746 A | 10/2000 |
| EP | 1148755 A1 | 10/2001 |
| EP | 1355450 A1 | 10/2003 |
| EP | 1396730 A1 | 3/2004 |
| EP | 1887823 A1 | 2/2008 |
| EP | 1898542 A1 | 3/2008 |
| JP | 2003204573 A | 7/2003 |
| JP | 2003520532 A | 7/2003 |
| JP | 2004101254 A | 4/2004 |
| JP | 2006003187 A | 1/2006 |
| JP | 2007089113 A | 4/2007 |
| JP | 2007533968 A | 11/2007 |
| JP | 2008002866 A | 1/2008 |
| JP | 2008236382 A | 10/2008 |
| JP | 2008236383 A | 10/2008 |
| JP | 2009052948 A | 3/2009 |
| JP | 2010500794 A | 1/2010 |
| JP | 2010525633 A | 7/2010 |
| KR | 100824044 B1 | 4/2008 |
| RU | 2120183 C1 | 10/1998 |
| RU | 2179371 C1 | 2/2002 |
| RU | 2233033 C2 | 7/2004 |
| TW | I223534 B | 11/2004 |
| TW | 200733614 | 9/2007 |
| WO | 94/27381 A1 | 11/1994 |
| WO | 0035117 A2 | 6/2000 |
| WO | WO0154422 A2 | 7/2001 |
| WO | 02/71095 | 9/2002 |
| WO | 03055272 A1 | 7/2003 |
| WO | WO2004104621 | 12/2004 |
| WO | 2005041602 A1 | 5/2005 |
| WO | WO2005081012 A1 | 9/2005 |
| WO | WO2006109538 A1 | 10/2006 |
| WO | 2007127886 A2 | 11/2007 |
| WO | 2008073706 A1 | 6/2008 |
| WO | WO2008127185 A1 | 10/2008 |
| WO | 2008137607 | 11/2008 |
| WO | 2008157841 | 12/2008 |
| WO | 2009149104 A2 | 12/2009 |
| WO | 2010056453 A1 | 5/2010 |

OTHER PUBLICATIONS

Partial International Search Report—PCT/US2011/042722—ISA/EPO—Oct. 14, 2011.
Patwari et al., "Relative Location Estimation in Wireless Sensor Networks", IEEE Transactions on Signal Processing, vol. 51, No. 8, Aug. 2003.
"Stage 2 functional specification of User Equipment (UE) positioning in UTRAN" (Release 9) Technical Specification 3GPP TS 25.305 V9.0.0 (Dec. 2009).
"Functional description, Location Services (LCS), Stage 2", (Release 1999) Functional Description, 3GPP TS 03.71 V8.9.0 (Jun. 2004).
International Search Report and Written Opinion—PCT/US2011/042722—ISA/EPO—Feb. 23, 2013, pp. 1-18.

(56) References Cited

OTHER PUBLICATIONS

3GPP TR 36.942 V8.1.0 (Dec. 2008), 3rd Generation Partnership Project: Technical Specification Group Radio Access Network; Evolved Universal Terrestrial Radio Access (E-UTRA); Radio Frequency (RF) system scenarios; (Release 8), Dec. 2008.
3GPP TS 25.215 V8.2.0 (Sep. 2008), 3rd Generation Partnership Project; Technical Specification Group Radio Access Network: Physical layer—Measurements (MD) (Re ease 8), Sep. 2008.
3GPP TS 25.305 V8.0.0 (Dec. 2007), 3rd Generation Partnership Project; Technical Specification Group Radio Access Network; Stage 2 functional specification of User Equipment (LiE) positioning in UTRAN (Release 8), Dec. 2007.
Evaluation of 1P-fir Positioning Techniques Using Common Simulation Parameters, Source: Ericsson, TSG-RAN Working Group 1 Meeting 8, Ad Hoc 17, TSGR1#8(99)988, Oct. 12-15, 1999, Manhattan, USA.
Evaluation of Positioning Measurement Systems, Source-, Ericsson, T1P1.5 8-110, May 15, 1998.
Evaluation parameters for positioning studies, Source: Qualcomm Europe, 3GPP TSG-RAN WG1 #56, R1-090853, Feb. 9-13, 2009, Athens, Greece.
Further positioning evaluations, Source: Qualcomm Europe, 3GPP TSG-RAN WG1 #56, R1-090—Feb. 9-13, 2009, Athens, Greece.
Greenstein, et al., "A New Path—Gam/Delay—Spread Propagation Model for Digital Cellular Channels", IEEE Transactions on Vehicular Technology, vol. 46, No. 2, op. 477-485, May 1997.
Motorola: "Impact of Supporting "Blank" Subframes" 3GPP TSG RAN Plenary Meeting No. 42 Dec. 5, 2008, XP002589696Athens, Greece Retrieved from the Internet:URL:http://www.3gpp.org/ftp/tsg_ran/tsg_ran/TSGR_42/ docs/ [retrieved on Jun. 28, 2010].
PHY layer specification impact of positioning improvements, Source: quatcomm Europe, 3GPP TSG-RAN WG1 #56, R1-090852, Feb. 9-13, 2009, Athens, Greece.
Positioning Support for LTE, 3GPP TSG RAN#42, RP-080995, Dec. 2-5, 2008, Athens, Greece.
Qiang Wu et al: "cdma2000 Highly Detectable Pilot" Communications Workshops, 2008. ICC Workshops 08. IEEE International Conference on, IEEE, Piscataway, NJ, USA, May 19, 2008, pp. 16-20, XP031265196 ISBN: 978-1-4244-2052-0 p. 1, left-hand column, line 8-p. 1, right-hand column, line 31.
Qualcomm Europe: Impact of Blank Subframes on Intrafrequency Measurements' GPP TSG-RAN WG4 No. 49 Nov. 6, 2008, XP002589698Prague, CZ Retrieved from the Internet:URL:http://www.3gpp.org/ftp/tsg_ran/wg4_radio/TSGR4_49/Documents/.
Qualcomm Europe: "Way forward on forward compatible subframes for Rel-8" 3GPP TSG RAN Plenary Meeting No. 42 Dec. 5, 2008, XP002589697Athens, Greece Retrieved from the Internet:URL:http://www.3gpp.org/ftp/tsgran/tsg_ran/TSGR_42/docs/.
Qualcomm Europoe "on OTDOA in LTE" 3GPP Draft R1-090353, 3rd Generation Partnership Porject (3GPP) Mobile Competence Centre, 650, Rout Des Lucioles F-06921 Sophia-Antipolis Cedex France No Ljubljana Jan. 8, 2009.
Recapitulation of the IPDL positioning method, Source: Encsson, TSG-RAN Working Group 1 meeting #4 TSGR1#4 (99)346, Apr. 18-20, 1999, Shin-Yokohama, Japan.
Time Aligned iP-DL positioning technique, Source: Motorola, TSG-RAN Working Group 1, Ah Hoc 17, TSGR1#: 9 b79, Meeting 7, Aug. 30-Sep. 3, 1999, Hannover, Germany.
Ward P W: "A Design Technique to Remove the Correlation Ambiguity in Binary Offset Carrier (BOC) Spread Spectrum Signals" Proceedings of the Ion National Technical Meeting, The Institute of Navigation, US, Jan. 26, 2004, pp. 886-896, XP001207302 the whole document.
Y,T, Chan and K. Ho, "A Simple and Efficient Estimator for Hyperbolic Location", IEEE Trans. Signal Processing, vol. 42, No. 5, pp. 1905-1915, Aug. 1994.
Torrieri, D. J., "Statistical Theory of Passive Location Systems", IEEE Transactions on Aerospace and Electronic Systems, Vol. AES-20, No. 2, Mar. 1984, pp. 183-198.
Ward, P. W., "A Design Technique to Remove the Correlation Ambiguity in Binary Offset Carrier (BOC) Spread Spectrum Signals", ION NTM 2004, Jan. 26-28, 2004, San Diego, CA, pp. 886-896.
Huawei: "Consideration on positioning support for LTE Rel-9," 3GPP TSG RAN WG1 #56bis, Mar. 23, 2009, R1-091257, p. 6.
Motorola: "Frame Structure and Signaling to Support Relay Operation," 3GPP TSG RAN1 #55bis, Jan. 12, 2009, R1-090331, p. 3.
European Search Report—EP14164182—Search Authority—Munich—May 9, 2014 (102479EPD1).
European Search Report—EP14164183—Search Authority—Munich—May 5, 2014 (102479EPD2).
Nardi S., et al., "GPS estimation algorithm using stochastic modeling", Decision and Control, 1998, Proceedings of the 37TH IEEE Conference on Tampa, FL, USA, Dec. 16-18, 1998, Piscataway, NJ, USA,IEEE, US, vol. 4, Dec. 16, 1998, pp. 4498-4502, XP010643396, DOI: 10.1109/ CDC.1998.762029, ISBN: 978-0/7803-4394-8.
Pachter M., et al., "An Efficient GPS Position Determination Algorithm", Navigation, Institute of Navigation, Fairfax, VA, US, vol. 50, No. 2, Sep. 1, 2003, pp. 131-142, XP056004432, ISSN: 0028-1522.
Sato G., et al., "Improvement of the Positioning Accuracy of a Software-Based GPS Receiver Using a 32-Bit Embedded Microprocessor", IEEE Transactions on Consumer Electronics, IEEE Service Center, New York, NY, US, vol. 46, No. 3, Aug. 1, 2000, pp. 521-530, ISSN: 0098-3063, XP001142876, DOI: 10.1109/30.883405.
3GPP TS 03.71 V8.9.0 (2004-06), 33rd Generation Partnership Project; Technical Specification Group Services and System Aspects; Location Services (LCS); Functional description; Stage 2; (Release 1999), Jun. 2004.
3GPP TS 25.305 V9.0.0 (2009-12), 3rd Generation Partnership Project; Technical Specification Group Radio Access Network; Stage 2 functional specification of User Equipment (UE) positioning in UTRAN; (Release 9), Dec. 2009.

* cited by examiner

DETERMINATION OF POSITIONS OF WIRELESS TRANSCEIVERS TO BE ADDED TO A WIRELESS COMMUNICATION NETWORK

CROSS-REFERENCE TO PROVISIONAL APPLICATIONS

This application claims priority under 35 USC §119 (e) from U.S. Provisional Application No. 61/360,832 filed Jul. 1, 2010 and entitled "Femto Location Determination", which is assigned to the assignee hereof and which is incorporated herein by reference in its entirety.

This application claims priority under 35 USC §119 (e) from U.S. Provisional Application No. 61/471,625 filed Apr. 4, 2011 and entitled "LOCATION OF WIRELESS TRANSCEIVERS USING DIFFERENCES BETWEEN ARRIVAL TIMES OF SIGNALS TRANSMITTED FROM UNKNOWN POSITIONS", which is assigned to the assignee hereof and which is incorporated herein by reference in its entirety.

CROSS-REFERENCE TO RELATED APPLICATIONS

This application is also related to U.S. Patent Publication 2010/0074180, U.S. application Ser. No. 12/561,844 published on Mar. 25, 2010 and entitled "Synchronizing A Base Station In A Wireless Communication System" which is assigned to the assignee hereof and which is incorporated herein by reference in its entirety.

This application is further related to U.S. Patent Publication 2010/0172311, U.S. application Ser. No. 12/651,838 published on Jan. 4, 2010 and entitled "Hearability Improvements For Reference Signals" which is assigned to the assignee hereof and which is incorporated herein by reference in its entirety.

This application is also related to U.S. Patent Publication 2010/0279707, U.S. application Ser. No. 12/606,037 published on Nov. 4, 2010 and entitled "TIME OF ARRIVAL (TOA) ESTIMATION FOR POSITIONING IN A WIRELESS COMMUNICATION NETWORK" which is assigned to the assignee hereof and which is incorporated herein by reference in its entirety.

FIELD

This patent application relates to apparatuses and methods to determine positions of new wireless transceivers to be added to a wireless communication network.

BACKGROUND

In a conventional wireless communication network, base stations (called "macro base stations", or "macros" for short), at which cell towers are normally located, are typically set up after a lot of planning, and have known positions. However, in indoor locales, signals from macro base stations are typically weaker or subject to multipath. To address such issues, wireless service can be provided in an indoor environment (e.g. within a building or inside a mine) by use of base stations that are designed to have low power (called "femto base station" or simply "femto") relative to a macro base station (normally located outdoors).

Accordingly, a femto base station (also called an Access Point Base Station, femtocell, Home NodeB (HNB), Home Evolved NodeB (HeNB), or femto for short) is an indoor base station. Like a normal (or macro) base station, a femto connects cell phone voice and data to the cell phone network, but it serves a smaller area. Femtos are normally deployed by users themselves, e.g. in a home or in an office building. Use of a femto base station benefits a wireless service provider because it offloads cell tower traffic. Subscribers benefit from superior signal strength, due to the proximity of the unit, especially in environment where a cellular signal from normal base stations is weak or not available.

Femtos are normally connected using a wired connection to a wireless communication network e.g., over the public Internet through a backhaul line, such as a digital subscriber line (DSL) or cable modem connection. One issue with locating a femto in an indoor environment may be that whenever a femto is installed, the geographic location of that femto may not be immediately known to a network operator of a wireless service provider. Moreover, users may move femtos within their homes, or may carry the femtos with them e.g., when relocating or traveling. The geographic locations, where users have installed their femtos, need to be known to an operator in order to meet various regulatory mandates and business interests.

Conventional methods can determine geographic coordinates of a measuring station using observed time difference of arrival (OTDOA) values to compute position, when the femto can receive signals from macro base stations. Normally, each OTDOA value may be computed as a difference between two time measurements, namely a time of arrival (TOA) of a signal that is transmitted by a macro base station at a known position in a vicinity ("neighbor base station") of the measuring station, and another TOA of another signal from another macro base station also having a known position ("reference base station").

The above-described OTDOA values normally include two time components as follows (a) one time component arises from the difference in distance between two macro base stations (also called "Geometric Time Difference" or GTD) and (b) another time component arises from a synchronization offset between the macro base stations (also called "Relative Time Difference" or RTD). Hence, OTDOA can be expressed as: OTDOA=GTD+RTD. Note that location information is present only in the GTD, i.e. not in the RTD. Thus, GTD can be expressed as: GTD=OTDOA-RTD. In order to calculate the position of a station that made the measurements, the following need to be known: (a) OTDOA values obtained from TOA measurements performed at a femto, (b) the coordinates of the neighbor base station(s) and the reference base station(s), and (c) the synchronization offset between the base stations (RTDs).

RTDs may be computed in an asynchronous network by use of devices that are called Location Measurement Units (LMUs), which may be specifically deployed in the network to measure RTDs between pairs of base stations at known positions. Each LMU may determine OTDOA values in the above-described manner, and then use its known distance to the base stations to compute RTD as follows RTD=OTDOA-GTD wherein OTDOA is measured by the LMU, and the GTD is known because base station positions and LMU positions are known. In a synchronous network, transmissions from base stations may be synchronized to a common clock (e.g, Global Positioning System (GPS) time, or Global Navigation Satellite System (GNSS) time), and therefore, RTDs may be known. For example, when all transmission frames of a base station are synchronized to the same time, RTDs are zero.

To summarize the above description, coordinates of a measuring station can be determined by use of (1) OTDOA measurements made at that measuring station using transmissions from macro base stations, (2) RTDs between the macro base stations and (3) coordinates of the macro base stations.

However, signals from macro base stations may not be measurable by a newly-installed femto, using a conventional OTDOA method for several reasons. In order to calculate a location using the OTDOA method, signals from at least three macro base stations that have known locations must be received, and their RTDs must be made known to the newly-installed femto, by some means. Since femtos are typically deployed indoors, signal reception from three macro base stations can generally not be assumed, in particular not in environments where poor macro cell coverage is the cause for deployment of that newly-installed femto. In an indoor environment, the signal reception from GPS/GNSS satellites is also usually limited or of such poor quality as to make it difficult to determine the geographic coordinates of an indoor femto using a satellite-signal based position determining method.

SUMMARY

In several aspects of the described embodiments, a method and system determine positions of wireless transceivers to be added to a wireless communication network (also called "non-reference wireless transceivers") as follows. A computer obtains a plurality of time difference of arrival (TDOA) values, which include a plurality of unknown-unknown TDOA values, and a plurality of unknown-known TDOA values. Each unknown-unknown TDOA value identifies a difference between a pair of measurements made (e.g. by a non-reference wireless transceiver located) at one unknown position. The measurements in the pair are of times of arrival (TOA) of wireless signals transmitted from additional unknown positions (e.g. by a corresponding pair of non-reference wireless transceivers).

Each unknown-known TDOA value identifies a difference between another pair of measurements at said non-reference wireless transceiver, with one measurement in said another pair being of time of arrival of a wireless signal transmitted from the one unknown position (e.g. by one of the non-reference wireless transceivers) and another measurement in said another pair being of time of arrival of an additional wireless signal transmitted from a known position (e.g. by a reference wireless transceiver included in the wireless communication network). The computer solves a set of equations simultaneously, based on at least (a) the plurality of TDOA values and (b) a plurality of known positions (e.g. of reference wireless transceivers in the wireless communication network), thereby to identify at least the unknown positions (e.g. of the non-reference wireless transceivers). The computer stores in a memory, identifications of the unknown positions obtained by solving the set of equations simultaneously.

In many aspects of the described embodiments, a non-reference wireless transceiver joins a wireless communication network as follows. The non-reference wireless transceiver measures a plurality of wireless signals that can be sensed, to obtain a plurality of measurements, and sends the measurements to a computer over a backhaul link (either over a wire or alternatively wirelessly). Thereafter, the non-reference wireless transceiver receives from the computer over the backhaul link, its position and optionally a time offset for its internal clock. After storing the received information locally, the non-reference wireless transceiver joins the wireless communication network, e.g. starts providing wireless connections between the wireless communication network and one or more mobile stations in its vicinity.

Optionally, a non-reference wireless transceiver may use the measurements it makes, to identify a strongest wireless transceiver (reference and/or non-reference) and return the identification(s) to the computer. The computer may use the identification(s) appropriately. For example, a non-reference wireless transceiver identified as being strongest may be requested (by a command) to turn off transmission of its downlink signal to enable better measurements at the non-reference wireless transceiver that supplied the identification. As another example, a reference wireless transceiver identified as being the strongest may be used to generate a rough position of the wireless transceiver that supplied the identification, for use as a starting point of iterations for solving a system of equations simultaneously.

In several aspects of the described embodiments, an apparatus adds to a wireless communication network, a plurality of non-reference wireless transceivers which have unknown positions and clocks of unknown synchronization relative to one another. The apparatus includes means for obtaining a plurality of time difference of arrival (TDOA) values comprising a plurality of unknown-unknown TDOA values, and a plurality of unknown-known TDOA values. The apparatus also includes means, responsive to at least (a) the plurality of TDOA values and (b) a plurality of known positions of reference wireless transceivers in the wireless communication network, for solving a set of equations simultaneously, to identify at least the unknown positions of said non-reference wireless transceivers; and means, responsive to identifications of said unknown positions obtained by the means for solving, for authorizing at least one of the non-reference wireless transceivers to join the wireless communication network.

In several aspects of the described embodiments, a non-transitory computer readable storage medium includes instructions, which, when executed by a machine, cause a processor (which includes the machine) to perform operations. Such instructions comprise instructions to obtain a plurality of time difference of arrival (TDOA) values comprising a plurality of unknown-unknown TDOA values, and a plurality of unknown-known TDOA values. Such instructions further comprise instructions, responsive to at least (a) the plurality of TDOA values and (b) a plurality of known positions of reference wireless transceivers in the wireless communication network, to solve a set of equations simultaneously, to identify at least the unknown positions of said non-reference wireless transceivers. Such instructions further comprise instructions, responsive to identifications of said unknown positions obtained by execution of said instructions to solve, to authorize at least one of the non-reference wireless transceivers to join the wireless communication network.

In several aspects of the described embodiments, a wireless transceiver includes a clock to be synchronized to a wireless communication network, a network listening module to generate measurements relative to said clock to be synchronized, of a plurality of times of arrival of wireless signals from unknown position and having unknown timing and of another plurality of times of arrival of signals from known positions and having known timing, a processor coupled to the network listening module to receive said measurements, a memory coupled to the processor, wherein the memory comprises machine instructions to said processor to compute a plurality of time difference of arrival (TDOA) values, each TDOA value being computed as a difference between a pair of measurements among said plurality of measurements, and a local area network (LAN) circuit coupled to the memory to receive therefrom the plurality of TDOA values. In some aspects of the described embodiments, the wireless transceiver includes a downlink transmitter of a wireless signal that is configured to turn off in response to a request received on the LAN circuit.

In several aspects of the described embodiments, a non-transitory storage medium includes instructions, which, when executed by a machine, cause a processor to perform operations. Such instructions comprise instructions to generate a plurality of measurements, by measuring relative to said clock to be synchronized, a plurality of times of arrival of signals from a plurality of non-reference wireless transceivers of unknown position and unknown timing and another plurality of times of arrival of signals from another plurality of reference wireless transceivers of known position and known timing. Such instructions comprise instructions to compute a plurality of time difference of arrival (TDOA) values, each TDOA value being computed as a difference between a pair of measurements among said plurality of measurements. Such instructions comprise instructions to transmit over a backhaul link, the plurality of TDOA values.

It is to be understood that several other aspects of the described embodiments will become readily apparent to those skilled in the art from the description herein, wherein it is shown and described various aspects by way of illustration. The drawings and detailed description are to be regarded as illustrative in nature and not as restrictive.

DETAILED DESCRIPTION

In several aspects of the described embodiments, an apparatus and method compute the geographic positions (and optionally time offsets of internal time base) of low power wireless transceivers that are placed in an indoor environment, and that need to be added to a wireless communication network, as follows. Each such transceiver, prior to its position being known, is also referred to herein as a non-reference wireless transceiver (in contrast to a reference wireless transceiver that has a known position).

Each non-reference wireless transceiver (e.g. transceiver 150BI in FIG. 1A) may perform, while located at an unknown position $z_{Bi}$, a number of measurements $\hat{\tau}_{i,1}, \ldots, \hat{\tau}_{i,j}, \ldots \hat{\tau}_{i,N}$ of times of arrival (TOA) of signals transmitted by other wireless transceivers relative to its internal time base (e.g. internal time base of transceiver 150BI). Each non-reference wireless transceiver (e.g. transceiver 150BI) may make TOA measurements using a module that is typically used to measure signal strengths of neighboring base stations in order to set its down-link transmit power (sometimes also referred to as Network Listening Module (NLM)).

Figure 1A:
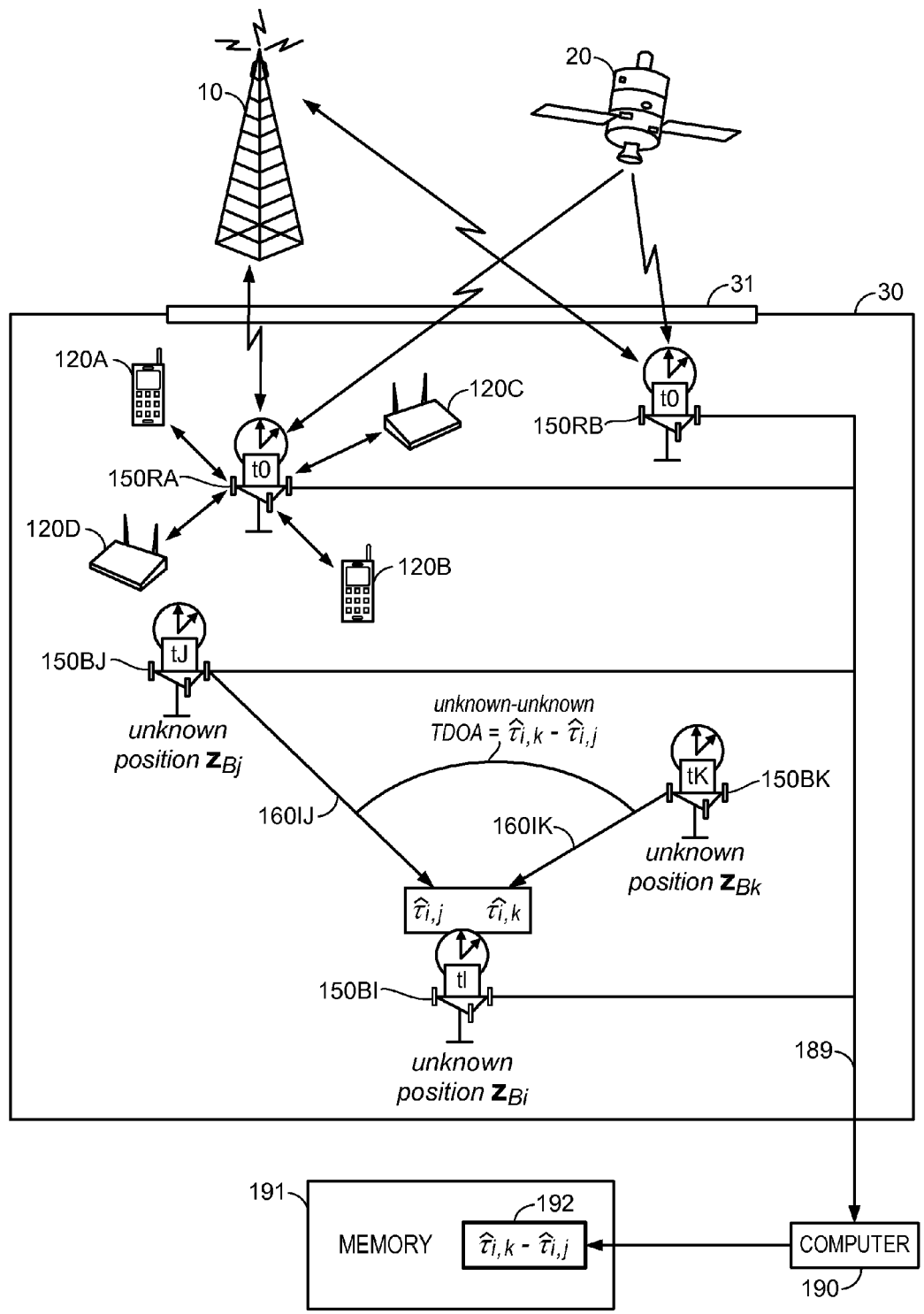
FIGS. 1A-1E illustrate, in a layout diagram, a system of wireless transceivers 150BI, 150BJ, 150BK positioned at unknown locations inside a building 30, wireless transceivers 150RA, and 150RB present at known locations inside building 30, with each of the wireless transceivers being connected via a wired connection 189 (e.g. cable or DSL) to a computer 190 that estimates the unknown locations (and optionally unknown transmit times), in several aspects of the described embodiments.

In some aspects of the described embodiments, the just-described module may be included in radio frequency (RF) circuitry in transceiver 150BI as a means for generating measurements although as will be apparent to the skilled artisan other such means may be used in transceiver 150BI to generate measurements of the type described herein. Each non-reference wireless transceiver (e.g. transceiver 150BI) may (but is not required to) be located indoors, e.g. in a building 30 (FIG. 1A). The RF circuitry in each transceiver 150BI may also be used a means for wirelessly transmitting signals within building 30, i.e. over-the-air signaling.

Figure 2:
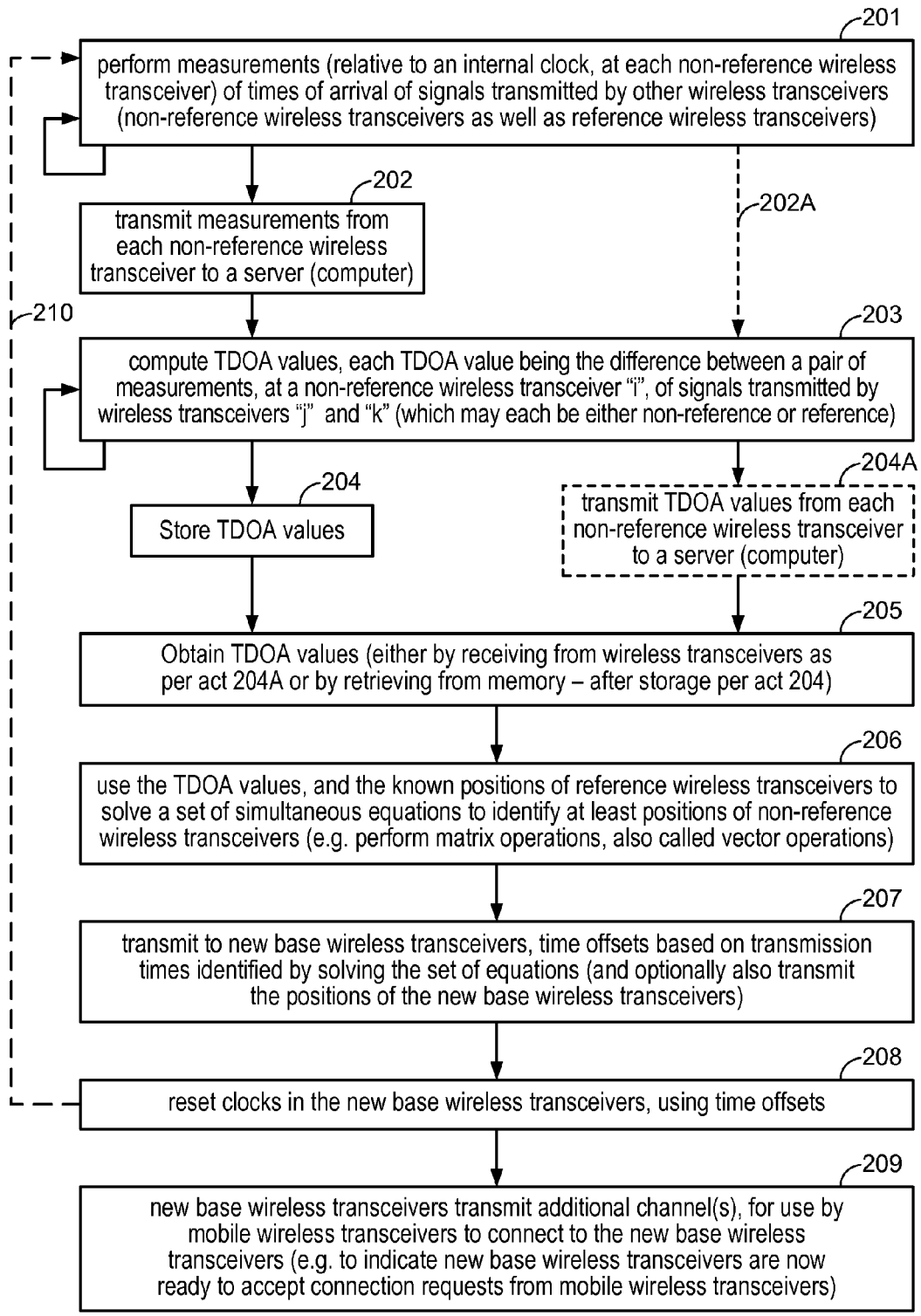
FIG. 2 illustrates, in a high-level flow chart, various acts performed by the transceivers and/or computer in the system of FIGS. 1A-1E, in some aspects of the described embodiments.

As per act 201 in FIG. 2, each non-reference wireless transceiver 150BI performs the TOA measurements for signals from any wireless transceivers, which may be either non-reference wireless transceivers such as transceivers 150BJ and 150BK in FIG. 1A or wireless transceivers that may be already included in a wireless communication network and having known or already determined positions (also called "reference wireless transceivers"), such as transceivers 150RA and 150RB in FIG. 1A. Reference wireless transceiver 150RA in FIG. 1A is illustrated as being used to provide wireless connectivity to multiple mobile stations 120A-120D, e.g. cellular phones 120A, 120B, a personal information manager (PIM) 120C and a personal digital assistant (PDA) 120D. FIG. 1A illustrates a TOA measurement $\hat{\tau}_{i,j}$ of a signal 160IJ transmitted by a non-reference wireless transceiver 150BJ at an unknown position $z_{Bj}$, and received by another non-reference wireless transceiver 150BI at another unknown position $z_{Bi}$. FIG. 1A also illustrates another TOA measurement $\hat{\tau}_{i,k}$ of another signal 160IK from another non-reference wireless transceiver 150BK also received at non-reference wireless transceiver 150BI.

In some aspects of the described embodiments, such measurements $\hat{\tau}_{i,j}$ and measurement $\hat{\tau}_{i,k}$ may be directly transmitted (as per act 202 in FIG. 2) to a location server, such as computer 190 (FIG. 1A), via a backhaul link 189. Depending on the embodiment, backhaul link 189 may be either a wired link (e.g. a coaxial cable or optical fiber) or alternatively a wireless link. In some aspects of the described embodiments, each transceiver 150BI includes local-area-network (LAN) circuit 904 shown in FIG. 9 (e.g. Ethernet PHY, Ethernet Switch and Internet Protocol (IP) Router) coupled to backhaul link 189 (e.g. cable 908 in FIG. 9) in the normal manner. Therefore, in some aspects of the described embodiments, the LAN circuit 904 is used in transceiver 150BI as a means for transmitting and means for receiving data (such as TDOA values or TOA measurements) and/or commands to/from backhaul link 189, although as will be apparent to the skilled artisan other such means may be used in transceiver 150BI to transmit/receive data and/or commands of the type described herein to/from computer 190 (e.g. over the Internet). In embodiments wherein backhaul link 189 is a wireless link, the LAN circuit 904 described above is replaced with wireless circuitry to implement an Internet connection, e.g. in conformance with an industry-standard wireless protocol such as 3G, WiMax, 4G and Wifi, and/or over a microwave link and/or through a satellite dish.

Depending on the aspect of the described embodiments, computer 190 that constitutes a location server may be one or more of: a Serving Mobile Location Center (SMLC), an evolved SMLC (eSMLC), a Gateway Mobile Location Center (GMLC), a Position Determination Entity (PDE), a Standalone SMLC (SAS), a Secure User Plane Location (SUPL) Location Platform (SLP), etc. Computer 190 also includes LAN circuitry coupled to backhaul link 189, e.g. via a router. Therefore, in some aspects of the described embodiments, the LAN circuitry is used in computer 190 as a means for transmitting, means for receiving and means for obtaining data (such as TDOA values or TOA measurements) and/or commands to/from backhaul link 189, although as will be apparent to the skilled artisan other such means may be used in computer 190 to transmit, receive and obtain data and/or commands of the type described herein.

Computer 190 may be coupled (e.g. via backhaul link 189) to the above-described wireless communications network, and therefore receives similar measurements from reference wireless transceivers 150RA and 150RB. However, in other aspects of the described embodiments, as illustrated by branch 202A in FIG. 2, act 202 is skipped. Hence, computer 190 may obtain TDOA values (as per act 205 in FIG. 2) either by receiving the locally-computed values directly from wireless transceivers as per act 204A, or by receiving TOA measurements made by the wireless transmitters as per act 202 and then calculating the TDOA values in act 203, performed centrally, followed by storing the TDOA values in memory 192 as per act 204.

In some aspects of the described embodiments, the above-described locally-computed values are generated by an arithmetic logic unit (ALU) included in a processor in each transceiver 150BI, and therefore the ALU is used as a means for computing the TDOA values. In several aspects of the described embodiments, a half-subtractor included in the ALU is used as a means for subtracting measurements from one another. Also, in certain aspects of the described embodiments, the ALU is used as a means for solving a set of equations simultaneously and also as a means for re-solving. Identifications of unknown positions obtained by the means for solving and/or means for re-solving are stored in a memory 192 of computer 190, and thereafter used to authorize one or more non-reference wireless transceivers to join the wireless network.

Moreover, in some aspects of the described embodiments, the processor is used as a means for authorizing a new wireless transceiver to join the above-described wireless communications network (thereby adding the new wireless transceiver to the network). Therefore, in some aspects of the described embodiments, a processor and/or its ALU may be used in transceiver 150BI as one or more means as described herein, although as will be apparent to the skilled artisan other means may be used in transceiver 150BI to perform various functions described herein.

As illustrated by act 203 in FIG. 2, a time difference of arrival (TDOA) value is computed from a pair of TOA measurements. Specifically, a pair of TOA measurements of signals transmitted by a corresponding pair of non-reference wireless transceivers are subtracted from one another, to obtain one type of TDOA values, also referred to herein as unknown-unknown TDOA values. One example of such a pair of measurements $\hat{\tau}_{i,j}$ and $\hat{\tau}_{i,k}$ described above are of signals from non-reference wireless transceivers 150BJ and 150BK respectively, and a difference thereof namely $\hat{\tau}_{i,k}-\hat{\tau}_{i,j}$ constitutes an unknown-unknown TDOA value (see FIG. 1A) in accordance with the described embodiments. Therefore, each unknown-unknown TDOA value identifies a difference between a pair of measurements of time of arrival of wireless signals.

Alternatively, instead of calculating TDOA values $\hat{\tau}_{i,k}-\hat{\tau}_{i,j}$ by subtraction of TOAs $\hat{\tau}_{i,j}$ and $\hat{\tau}_{i,k}$, the TDOAs may also be measured directly by the wireless transceiver 150BI by performing cross-correlation operations between received signals 1601J and 1601K. The resulting TDOAs are then transmitted via backhaul link 189 to computer 190.

In aspects of the described embodiments wherein act 202 is performed, computer 190 receives and subtracts the two TOA measurements in act 203, to obtain an unknown-unknown TDOA value $\hat{\tau}_{i,k}-\hat{\tau}_{i,j}$ and centrally stores this value (in act 204) at a location 192 in a computer's memory 191. Alternatively, if the branch 202A was taken, non-reference wireless transceiver 150BI itself locally subtracts the two TOA measurements in act 203 (using an ALU therein), to obtain unknown-unknown TDOA value $\hat{\tau}_{i,k}-\hat{\tau}_{i,j}$ and transmits this value (with IDs of transceivers) as per act 204A to computer 190 over backhaul link 189, and computer 190 stores the received value centrally as per act 204, e.g. at location 192 in memory 191 (see FIG. 1A).

Figure 1B:
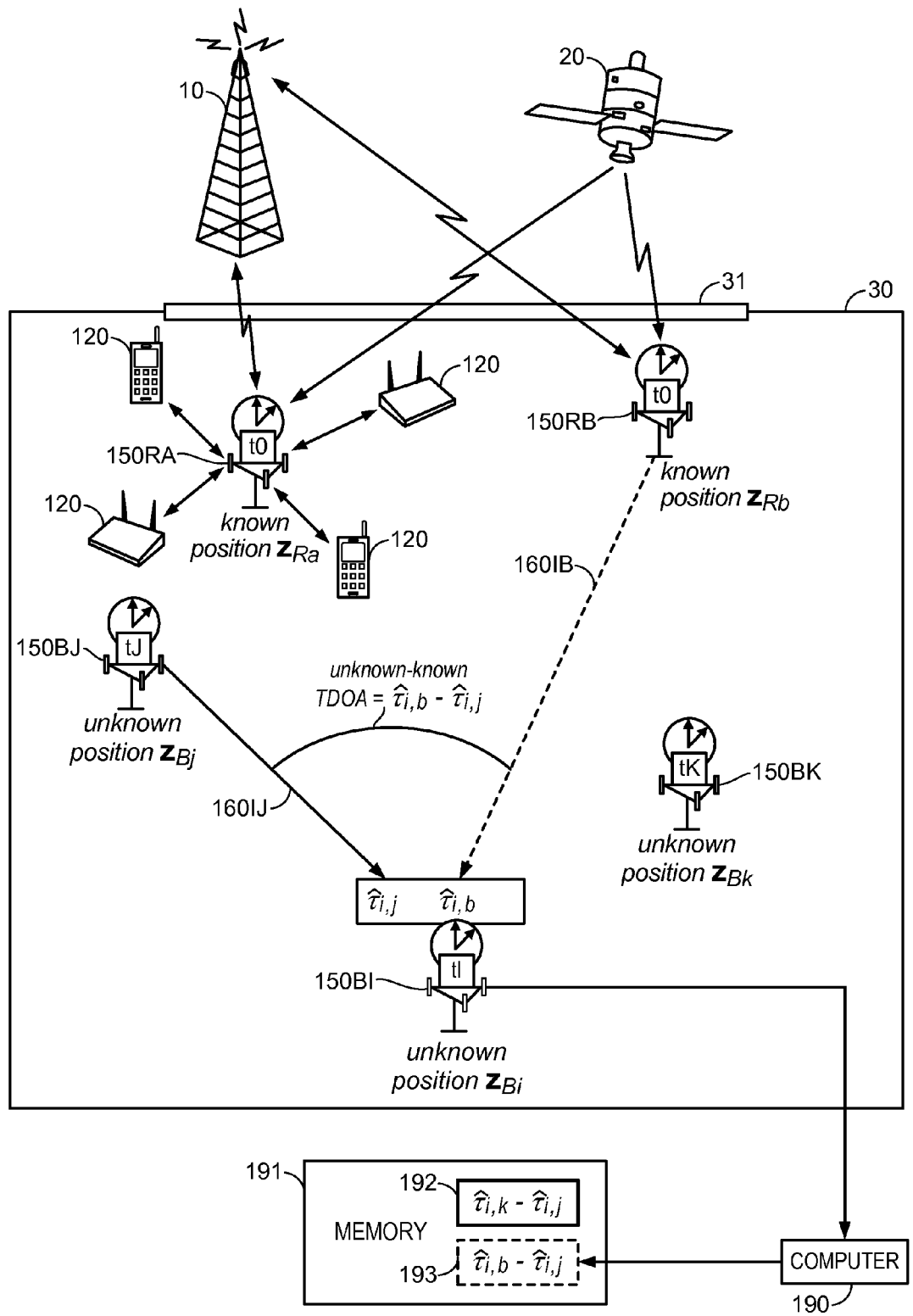

The above-described acts 201, 202 and 203 (including branch 202A) are repeated as often as necessary, depending on the configuration. For example, an additional TOA measurement $\hat{\tau}_{i,b}$ may be performed by non-reference wireless transceiver 150BI (as per act 201 in FIG. 2) as shown in FIG. 1B, on arrival of signal 1601B from reference wireless transceiver 150RB having a known position $z_{Rb}$. Note that position $z_{Rb}$ may be known, for example, by use of signals from satellites 20 received by reference wireless transceiver 150RB through a window 31 of building 30 (or alternatively by signals from macro base stations 10).

For simplicity, FIG. 1A to 1E show one macro base station 10 and one satellite 20. It is understood that in order to calculate a position of e.g., reference wireless transceiver 150RB using signals from macro base stations or satellites (e.g., GPS satellites), at least three such macro base stations or four such satellites may be needed. Therefore, base station 10 and satellite 20 may represent a set of base stations and satellites, respectively, whose number is sufficient to determine the location of a reference wireless tranceiver via conventional means.

Thereafter, another type of TDOA value, also referred to herein as unknown-known TDOA value may be computed (as per act 203 in FIG. 2), as the difference between the pair of measurements $\hat{\tau}_{i,j}$ and $\hat{\tau}_{i,b}$ and this value may be stored in another location 193 in memory 191 by computer 190, as illustrated in FIG. 1B. In the example illustrated in FIG. 1C, there are four wireless transceivers 150BJ, 150RA, 150RB and 150BK inside building 30 whose signals can be sensed by non-reference wireless transceiver 150BI also inside building 30. Therefore, non-reference wireless transceiver 150BI makes a total of four TOA measurement $\hat{\tau}_{i,j}$, $\hat{\tau}_{i,a}$, $\hat{\tau}_{i,b}$, and $\hat{\tau}_{i,k}$ as the arrival times of respective signals 1601J, 1601A, 1601B and 1601K. Accordingly, as illustrated in FIG. 1C, the following six TDOA values 171 are computed and stored in memory 191: one unknown-unknown TDOA value $\hat{\tau}_{i,k}-\hat{\tau}_{i,j}$, four unknown-known TDOA values namely $\hat{\tau}_{i,a}-\hat{\tau}_{i,j}$, $\hat{\tau}_{i,b}-\hat{\tau}_{i,j}$, $\hat{\tau}_{i,k}-\hat{\tau}_{i,a}$, and $\hat{\tau}_{i,k}-\hat{\tau}_{i,b}$, and one known-known TDOA value $\hat{\tau}_{i,b}-\hat{\tau}_{i,a}$.

Figure 1C:
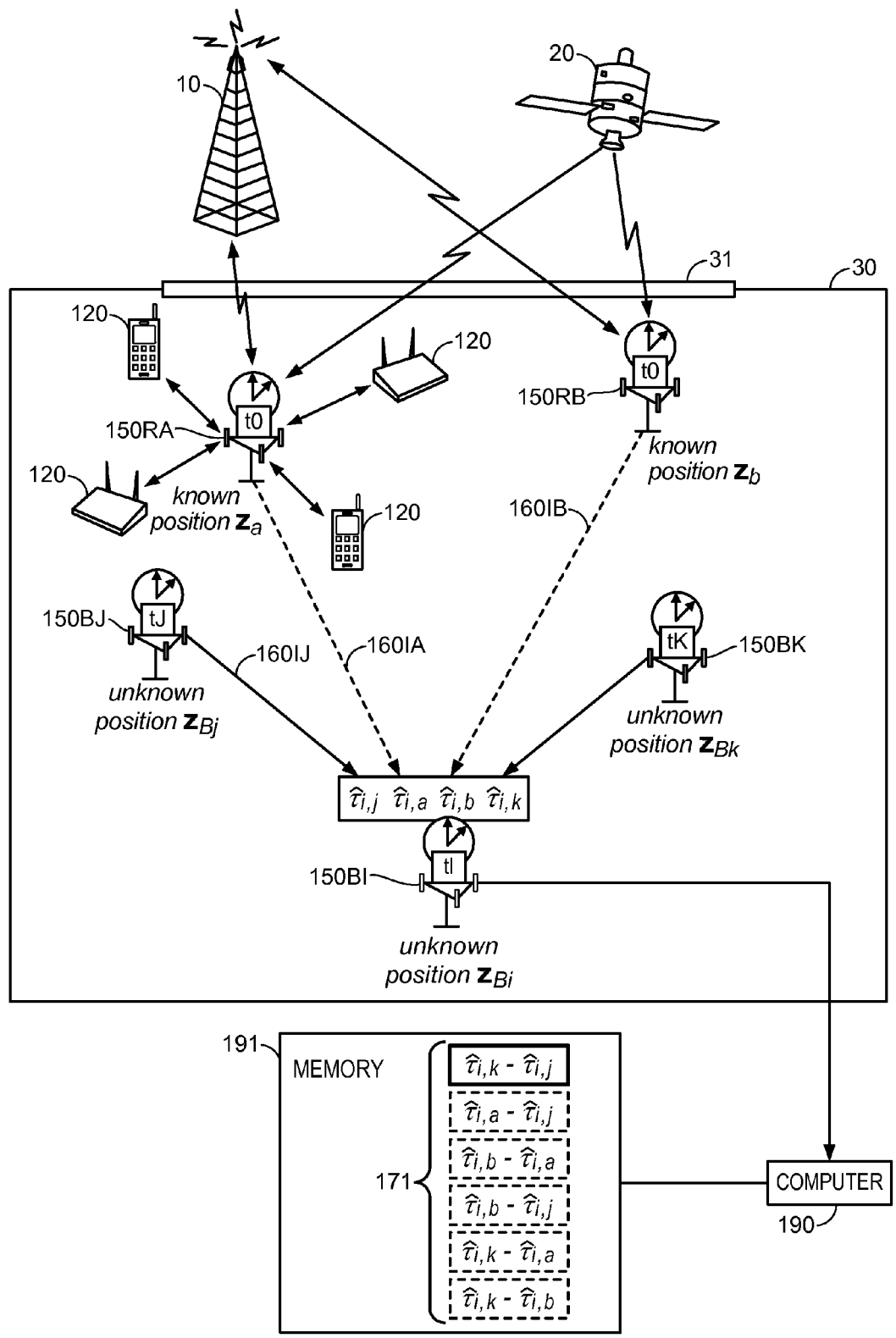

Although, memory 191 in FIG. 1C contains six TDOA values 171, only three of them are linearly independent, and thereore, provide useful information. For example, the TDOA $\hat{\tau}_{i,k}-\hat{\tau}_{i,j}$ may be obtained by the sum of two other TDOA values, namely $\hat{\tau}_{i,b}-\hat{\tau}_{i,j}$ and $\hat{\tau}_{i,k}-\hat{\tau}_{i,b}$ since $(\hat{\tau}_{i,b}-\hat{\tau}_{i,j})+(\hat{\tau}_{i,k}-\hat{\tau}_{i,b})=\hat{\tau}_{i,k}-\hat{\tau}_{i,j}$, and therefore, the TDOA $\hat{\tau}_{i,k}-\hat{\tau}_{i,j}$ provides no additional information. Computer 190 may at act 206 in FIG. 2 select the set of linearly independent TDOA values in memory 191 before solving a set of simultaneous equations. This selection may be based on available quality of the TOA and/or TDOA measurements. For example, when performing TOA or TDOA measurements at a wireless transceiver, the wireless transceiver may in addition estimate a quality of the measurement. This quality may be a standard deviation or other measure, such as signal-to-noise ratio. When selecting the linearly independent TDOA values, those values with better quality (e.g., lower standard deviation or higher signal-to-noise ratio) may be selected.

Alternatively, a wireless transceiver such as wireless transceiver 150BI in FIG. 1C may only send linearly independent TDOA values to computer 190, or computer 190 may only calculate linearly independent TDOA values before storing them in memory 191. Linearly independent TDOA values could be obtained either at wireless transeiver 150BI or at computer 190 by selecting one reference TOA measurement, e.g., $\hat{\tau}_{i,j}$ in FIG. 1C and subtracting the other TOA measurements $\hat{\tau}_{i,a}$, $\hat{\tau}_{i,b}$, and $\hat{\tau}_{i,k}$ from it.

Figure 1D:
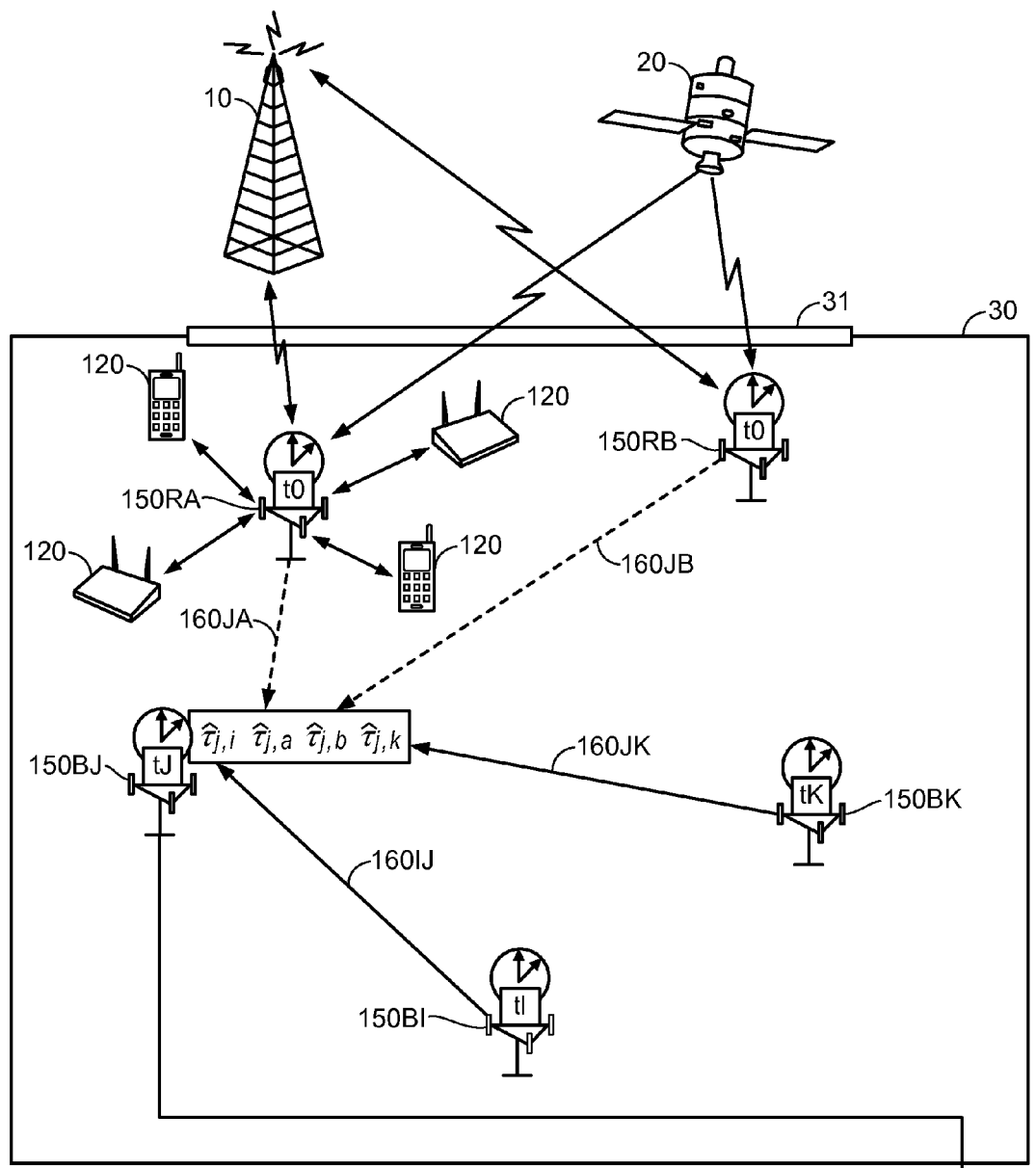
Figure 1D:
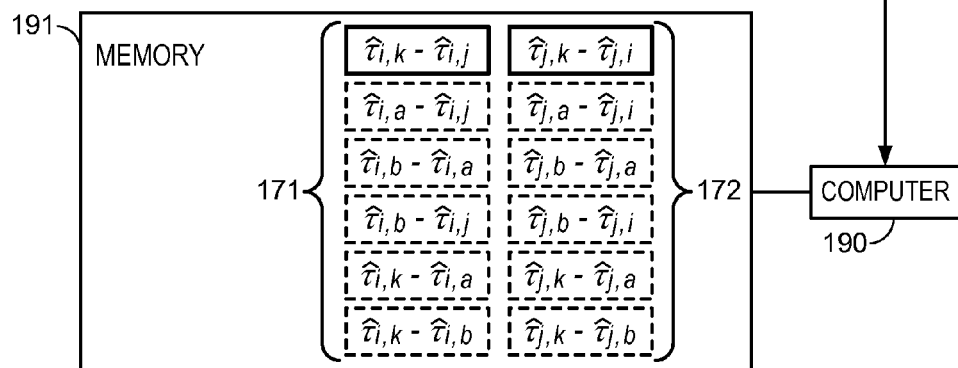
Figure 1E:
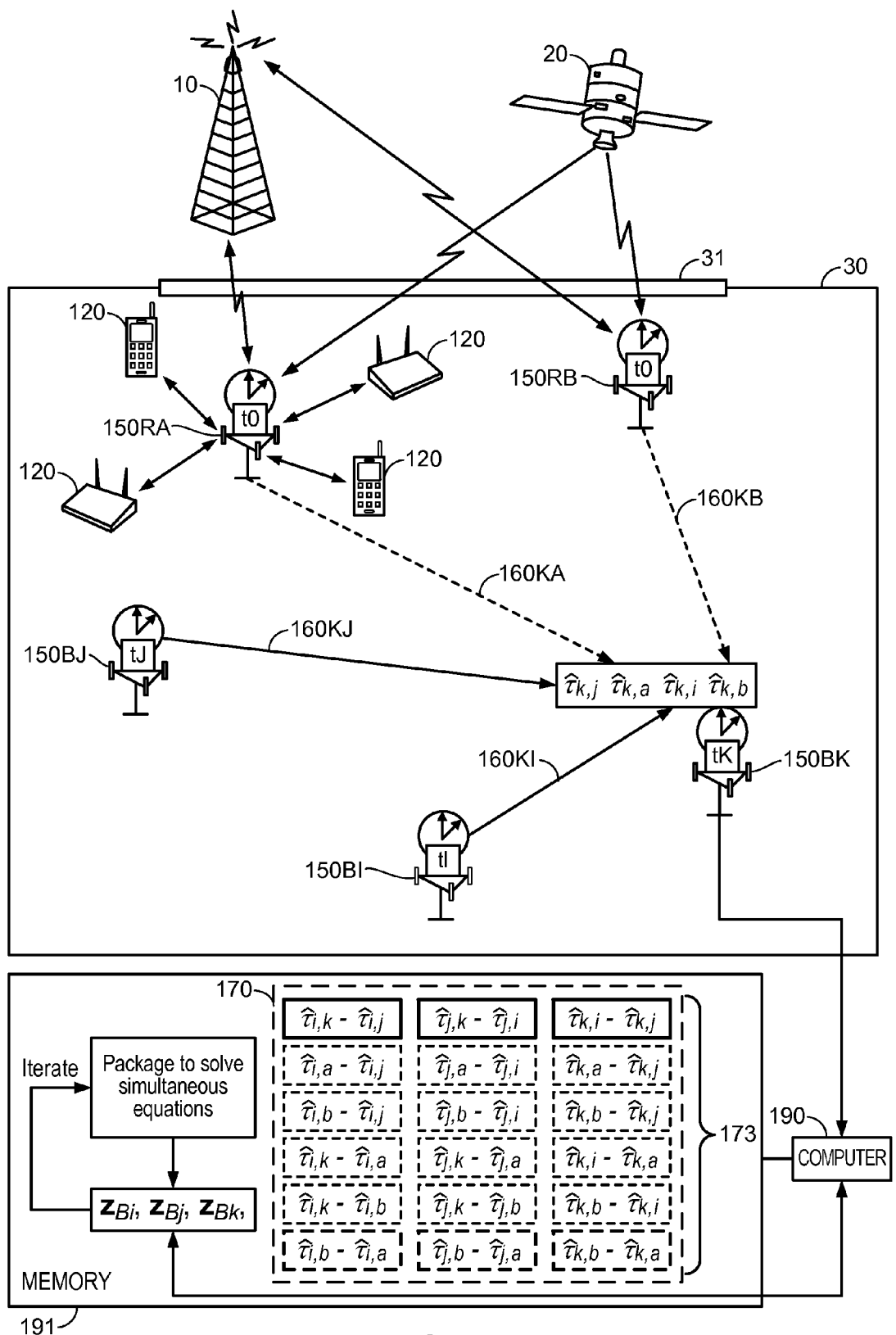

The above described acts 201-203 are thereafter repeated by another non-reference wireless transceiver 150BJ, yielding another six TDOA values 172, as illustrated in FIG. 1D, from which only a subset may be linearly independent. Moreover, the above described acts 201-203 may also be repeated by yet another non-reference wireless transceiver 150BK, yielding another six TDOA values 173, as illustrated in FIG. 1E, where again only a subset of them may be linearly independent.

Hence, a total of eighteen TDOA values 170 are present in memory 191 after TOA measurements made by each of the three non-reference wireless transceivers 150BI, 150BJ, and 150BK are used to compute the respective TDOA values. All these eighteen TDOA values 170 or a linearly independent subset of the eighteen TDOA values 170 are thereafter used in act 206 (FIG. 2) by computer 190 executing instructions in a software package, to solve simultaneous equations to determine the coordinates of the three unknown positions $z_{Bi}$, $z_{Bj}$, $z_{Bk}$. In executing the software package, computer 190 performs one or more matrix operations (also called vector operations) to solve a set of equations simultaneously. After solving the equations, computer 190 stores the positions of non-reference wireless transceivers (e.g. non-reference wireless transceivers 150BI, 150BJ and 150BK) in memory 191, for use in the normal manner.

In optional aspects of the described embodiments, non-reference wireless transceivers 150BI, 150BJ, and 150BK have respective clocks tI, tJ and tK of unknown synchronization in addition to having unknown positions $z_{Bi}$, $z_{Bj}$, $z_{Bk}$. Therefore, transceivers 150BI, 150BJ, and 150K transmit wireless signals that are clocked at unknown time offsets relative to one another and also relative to a common clock to which reference wireless transceivers 150RA and 150RB are synchronized. Hence, in such aspects of the described embodiments, equations may be solved by computer 190, to additionally identify time offsets of the internal clocks tI, tJ and tK, or the RTDs between them. Thereafter, depending on the aspect of the described embodiments, the time offsets obtained by computer 190 may be transmitted to the non-reference wireless transceivers 150BI, 150BJ and 150BK as per act 207.

Therefore, wireless transceivers 150BI, 150BJ and 150BK transmit a plurality of TDOA values measured at unknown positions to computer 190 and then wireless transceivers 150BI, 150BJ and 150BK receive back from computer 190, a time offset that depends at least partially on the plurality of TDOA values and a common clock used in the wireless network. Wireless transceivers 150BI, 150BJ and 150BK may then reset their respective internal clocks as per act 208 thereby to synchronize to the common clock. Note that in several aspects of the described embodiments, wireless transceivers 150BI, 150BJ and 150BK are new base wireless transceivers in the process of being set up to accept connection requests from mobile wireless transceivers 120 (e.g. a cell phone). Note that base wireless transceivers 150BI, 150BJ and 150BK are typically stationary, and may be connected to backhaul link 189 as described herein. During set up, positions of new base wireless transceivers 150BI, 150BJ and 150BK are determined as described herein, before being used to provide connections to mobile wireless transceivers (such as cell phones).

The transceivers 150BI, 150BJ and 150BK may advance or delay their internal clocks at act 208 based on the estimates of the times tI, tJ and tK, or the RTDs between them, and therefore, effectively synchronizing the communications network. For example, transceivers 150BI, 150BJ and 150BK may adjust their clocks in such a way, that the RTDs in the whole network are zero, or any other fixed value.

After the just-described resetting of internal clocks, the non-reference wireless transceivers 150BI, 150BJ and 150BK may repeat the above-described measurements of times of arrival, and thereafter the TDOA values may be re-computed. Accordingly computer 190 obtains re-computed TDOA values, wherein each re-computed TDOA value identifies a difference between a pair of repeated measurements that are made by one of transceivers 150BI, 150BJ and 150BK whose internal clocks are synchronized. This is followed by the computer 190 again solving (i.e. re-solving) simultaneous equations now to only re-calculate the unknown positions of the non-reference wireless transceivers 150BI, 150BJ and 150BK, based on the re-computed TDOA values and known positions of reference transceivers 150RA, 150RB. Only the unknown positions are re-calculated at this stage because the RTDs are now known (e.g., are zero). The server computer 190 then stores the re-calculated positions in memory 191, for use in future, in the normal manner.

In certain aspects of the described embodiments, computer 190 may use the positions stored in memory 191 to decide whether or not to authorize each non-reference wireless transceiver to join the wireless communication network (e.g. as a femto base station) as per act 209. In some aspects of the described embodiments, computer 190 also transmits to each non-reference wireless transceiver, its position (e.g. retrieved from memory 191) for use therein, e.g. when its position is requested by certain network elements, the femto base station may transmit its position to the requested entity, e.g., in case a mobile station connected to the femto base station may be making an emergency call.

Figure 7A:
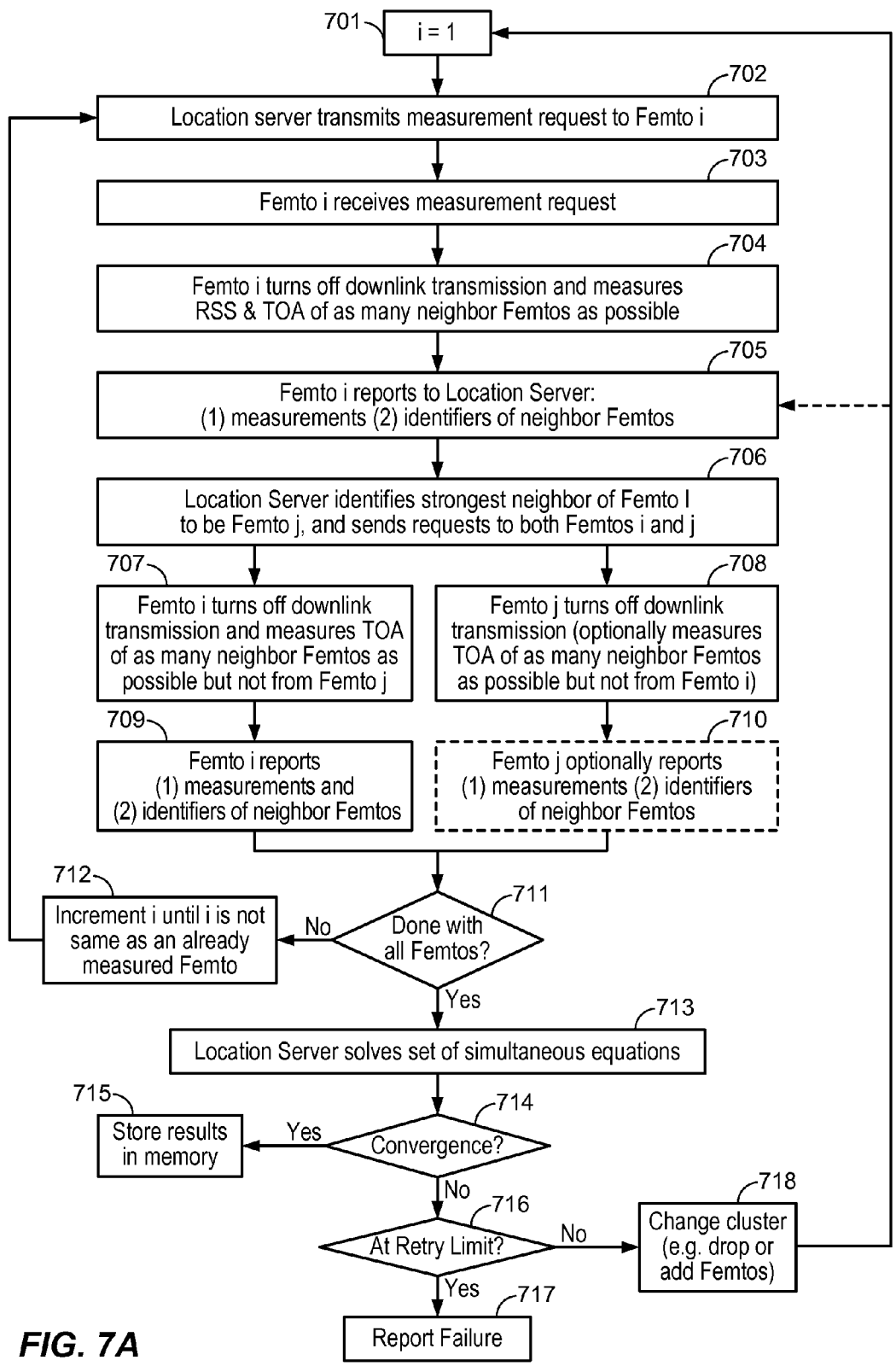
FIG. 7A illustrates, in a high-level flow chart, a method performed by a system of the type shown in FIG. 1A, to improve accuracy in a femto i making measurements, by turning off downlink transmission from a neighboring femto j identified as a strongest neighbor, in certain aspects of the described embodiments.
Figure 7B:
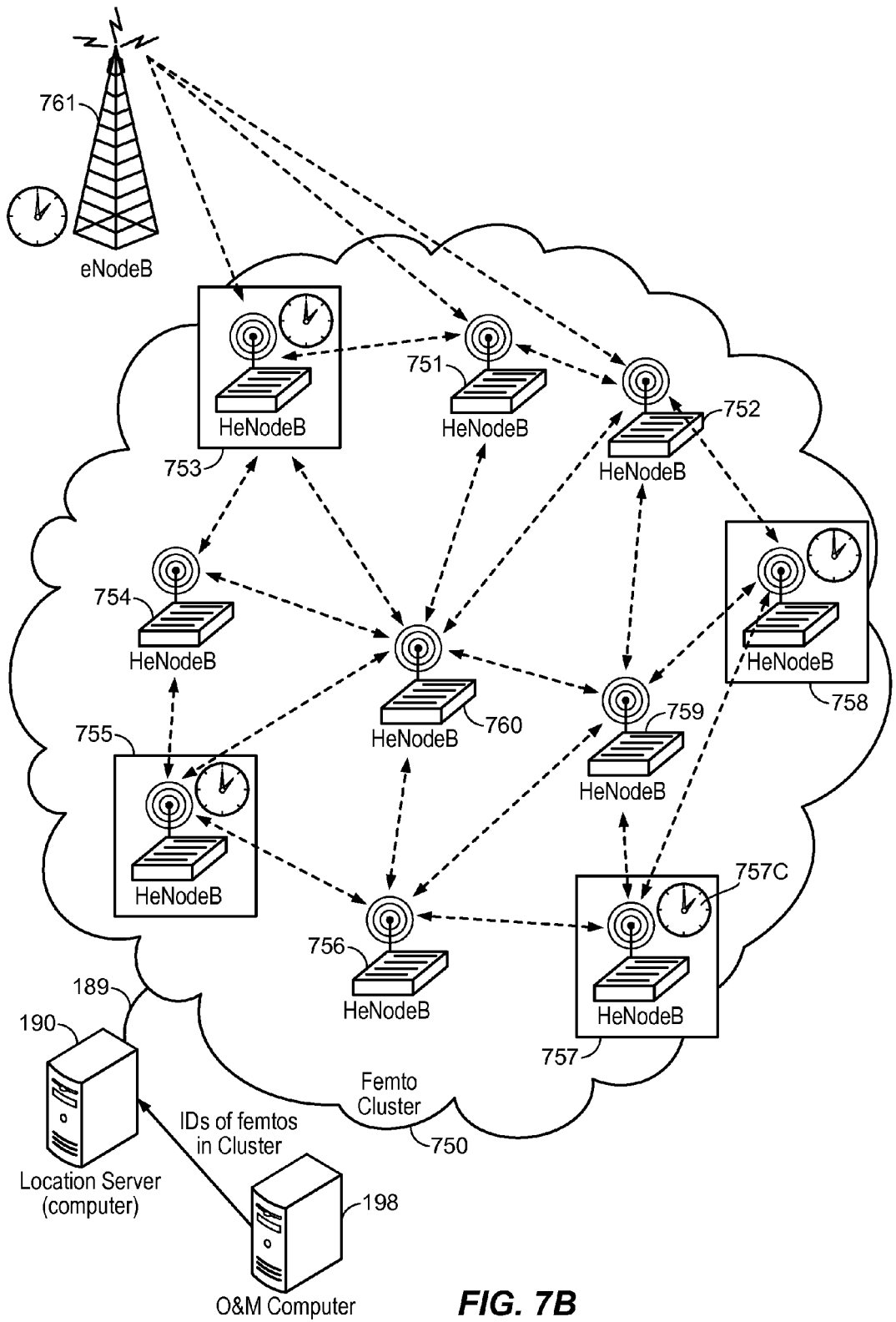
FIGS. 7B-7G illustrate, in layout diagrams, signals used in TDOA measurements, in a series of steps performed by the method of FIG. 7A, in some aspects of the described embodiments.

A wireless transceiver may receive and store in its own local memory for future use, that wireless transceiver's geographic position as determined and supplied by computer 190, e.g. via backhaul link 189. For example, wireless transceivers 150BI, 150BJ and 150BK may report their stored locations to another network entity upon request, for example, to an operations and maintenance (O&M) computer 198 (FIG. 7B). Hence, identified positions of non-reference wireless transceivers are used in the normal manner, e.g. to comply with governmental regulations related to operation of wireless transceivers in licensed areas. In one such example, a position of a non-reference wireless transceiver that is identified as described herein is used to authorize the non-reference wireless transceiver to join the wireless communications network, e.g. after its position is approved as authentic, by an operator of O&M computer 198.

As another example, when a user equipment (such as a mobile phone or a laptop) is connected to and communicating with a wireless transceiver to initiate an emergency call, the location of the wireless transceiver may be used to supply to emergency personnel, an estimate of the user equipment's position. In certain aspects of the described embodiments, the location of a wireless transceiver 150BI may be used as location estimate for a user equipment (UE) connected (with a wire or wirelessly) to this wireless transceiver 150BI. Therefore, such an identified position is also used when originating an emergency phone call from that wireless transceiver 150BI (e.g. a call connected from a mobile station's wireless transceiver to the emergency phone number 911 in the US).

To summarize, time difference of arrival (TDOA) values of at least two types are computed as follows: (a) an unknown-unknown TDOA value is computed as a difference between TOA measurements by a non-reference wireless transceiver at an unknown position, of signals transmitted by two non-reference wireless transceivers both also located at unknown positions, and (b) an unknown-known TDOA value is computed as a difference between a TOA measurement of a signal transmitted by a non-reference wireless transceiver from an unknown position, and another TOA measurement of another signal transmitted by a reference wireless transceiver from a known position. Two or more types of TDOA values are used together to solve simultaneous equations, in order to identify the coordinates of unknown positions (and optionally time offsets of internal clocks) of the non-reference wireless transceivers.

In several aspects of the described embodiments, the TOA measurements are performed by non-reference wireless transceivers using internal clocks of unknown synchronization. In such aspects of the described embodiments, solving the simultaneous equations additionally yields synchronization offsets of the internal clocks of the non-reference wireless transceivers. Hence, Relative Time Differences (RTDs) are not used in solving simultaneous equations, and instead RTDs are obtained as additional unknowns from solving the simultaneous equations (e.g. in case of asynchronous networks).

In certain aspects of the described embodiments, TDOA values are computed locally within each wireless transceiver that performs two or more TOA measurements, and the locally-computed TDOA values are transmitted to a computer (also called "server"). In other aspects of the described embodiments, the computer receives TOA measurements from wireless transceivers and the computer itself computes the TDOA values, i.e. the TDOA values are centrally computed. Therefore, depending on the aspect of the described embodiments, a computer may obtain TDOA values either by receiving locally-computed values directly from wireless transceivers, or by receiving TOA measurements made by wireless transceivers and centrally calculating TDOA values before solving simultaneous equations.

In a network of femtos, placed e.g., inside a building 30 (FIG. 1A), some of the femtos may be placed at favorable locations such as close to windows where reception of GPS/GNSS or macro cell signals may be possible. Therefore, the location of some femtos in the network may be determined by conventional means, such as standalone GPS/GNSS, Assisted GPS/GNSS, OTDOA/Advanced Forward Link Trilateration (AFLT) methods, etc. In principle, these techniques employ handset based location technologies inside the femto (i.e., the femto is treated as a mobile station from the location determination and architecture point of view). Such positioned femtos via conventional means may act as reference femtos in certain aspects of the described embodiments.

Other femtos in the network may be deployed deep indoors with rather poor or no signal reception from GPS/GNSS satellites or macro base stations. However, those femtos may receive broadcast signals from neighbor femtos. Femtos may use a transmitter (such as a downlink transmitter) to transmit a broadcast signal (e.g., pilot, synchronization, common broadcast signal, etc.) which is received by neighbor femtos when acting as mobile stations and can be used for OTDOA/AFLT measurements. However, since the location of the femtos which transmit the signal for OTDOA/AFLT measurements at the receiving femto may also be unknown, conventional trilateration techniques may not be feasible (i.e., those techniques require the location of the transmitters to be known).

In a conventional positioning approach the femtos may be located based on transmitters at known locations (e.g., macro base stations or GPS/GNSS satellites). Using a conventional positioning approach, the femtos deep indoors may not receive sufficient GPS/GNSS or macro base station signals to allow location determination of these femtos via conventional means. In accordance with the described embodiments, femtos may be placed inside a building 30, e.g. in an area that is 30 meters×30 meters in size and surrounded by walls that do not allow the femtos to receive macro base station signals of strength sufficient to form a communications link.

In some aspects of this described embodiments, new femtos 150BI, 150BJ and 150BK (FIG. 1A) having unknown positions (e.g. within building 30) may measure the difference in times of arrival of signals (e.g. pilot) not only from transmitters at known locations (e.g., macro base stations or femtos 150RA and 150RB whose location has already been determined by conventional means), but also from transmitters at unknown locations (i.e., femtos 150BI, 150BJ and 150BK whose locations cannot be determined via conventional means). With all the TDOA measurements in a network may be made between transmitters at known and unknown locations, all the unknown femto locations may be determined at once (i.e. simultaneously) based on this set of TDOA measurements, as described in detail herein.

All the femto measurements may be transmitted to a central location server 190, to determine the locations of all unknown femto locations in the cluster or area. Femtos (i.e. wireless transceivers) in a large network may be grouped into several clusters, with location determination being performed for each cluster independent of another cluster.

For a conventional OTDOA based solution, the time offsets (at which broadcast signals are transmitted by femtos) are also required in order to compute unknown locations. This is usually achieved by synchronizing the transmit times to a common clock or time base (e.g., GPS time). However, as described above, GPS signal reception may not be possible at some femto locations, and therefore, not only the location of the femto cannot be determined, also the femto transmit time cannot be synchronized with conventional means.

In conventional OTDOA solutions, location measurement units (LMUs) in the network may measure the transmit times. However, this approach exploits the fact that in conventional OTDOA the location of the transmitters (base stations) and the LMUs are known. In an indoors environment, some transmitters are femtos that may be deployed out of reach of macro base stations and/or satellite signals, and therefore, this LMU approach may not be applicable.

Instead, in some aspects of this described embodiments, unknown transmit times of femtos may be automatically calculated by computer 190, in addition to calculating locations as part of a navigation solution, as described in detail below. Assuming the macro base stations (or some femtos whose locations can be determined via conventional means (e.g., GPS)) are synchronized, this approach may allow transmissions from all femtos in the network to be synchronized to the same time base, because the transmit times of the femtos are also determined as part of the navigation solution, which can then be used to synchronize the femto transmit times to the macro network. Essentially, the transmit times of the femtos may be adjusted based on the estimated transmit times to make the RTDs equal to zero. Therefore, in several aspects of such a described embodiment, computer 190 not only solves the femto location problem, but also the femto synchronization problem.

The femto location (and transmit time) solution may also be improved by computer 190 performing the location/time calculation of the femtos at regular intervals and using multiple sets of measurements from the same cluster, to compute an averaged position/time for each non-reference femto. Use of repeated measurements at regular intervals is effective in some aspects of the described embodiments, based on the fact that femtos are relatively stationary and longer measurement/averaging times are possible, as compared to e.g., mobile station location determination.

Once the location and transmit times of the non-reference (i.e., with unknown location) femtos has been determined using a method of the type described herein, the location of all these non-reference femtos can be updated in a femto location database in computer 190, and these femtos (now having known locations and transmit times) can then be used as new reference femtos. Any subsequent new TDOA measurements can be used to further refine the location of the femtos, e.g. use of more reference femtos at known locations reduces the number of unknowns to be solved for in the simultaneous set of equations, and therefore, may improve the accuracy of the estimates. Whenever new femtos are deployed in the area, previously positioned femtos may be used as new reference femtos for locating the newly deployed femtos.

Various aspects of such described embodiments herein are not specific to femto positioning. Hence, it is to be understood that locations of any type of wireless devices (e.g. mobile stations) in a network can be estimated given that these devices receive and transmit some broadcast or other wireless signal and can make TOA or TDOA measurements.

Figure 4A:
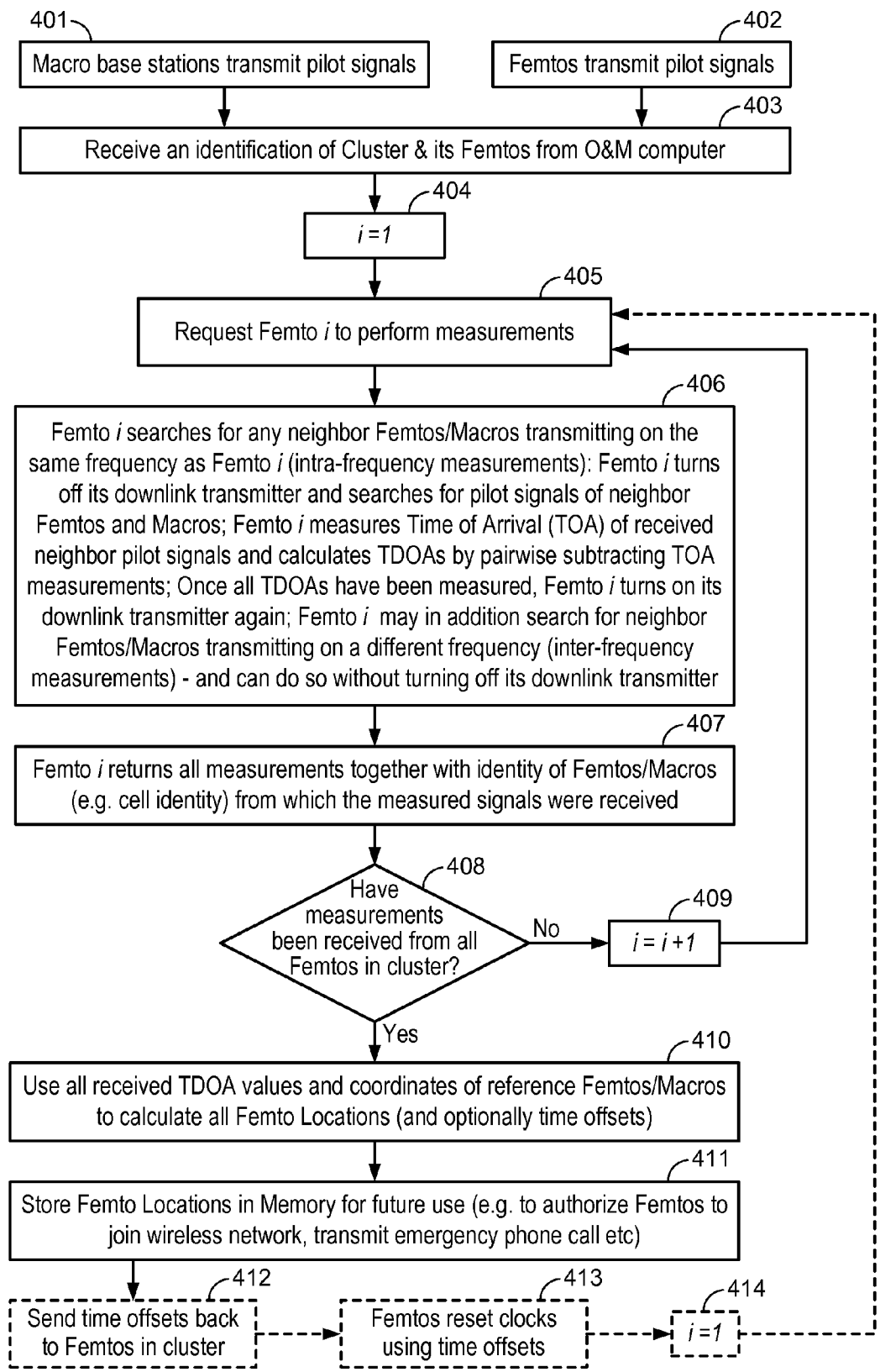
FIG. 4A illustrates, in an intermediate-level flow chart, various acts performed by a system of femtos in femto network 150 and/or computer 190 of the type shown in FIGS. 4B and 4C, in some aspects of the described embodiments.

In several aspects of the described embodiments, a wireless communication network includes several macro base stations (e.g. station 10 in FIG. 1A) that transmit pilot signals as per act 401 in FIG. 4A. In addition, the just-described wireless communication network also includes several femtos 150 (see FIG. 4B) that also transmit pilot signals, as per act 402 in FIG. 4A. In the just-described wireless communication network, macro base stations 10 have their internal clocks synchronized to a common time base, e.g. synchronized to GPS time and/or any other time which may also be received via backhaul link 189. However, depending on the aspect of the described embodiments, femtos 150 may not need to be synchronized initially, before the method of FIG. 2 is performed. Some of femtos 150 may have known positions and timing (e.g. if GPS signals can be received at the femtos), and such femtos constitute reference femtos (e.g. see reference wireless transceivers 150RA and 150RB described above). Others of femtos 150 have unknown positions and/or transmit times (e.g. see non-reference wireless transceivers 150BI-150BK described above), and these unknowns are calculated by computer 190 as follows.

Figure 4B:
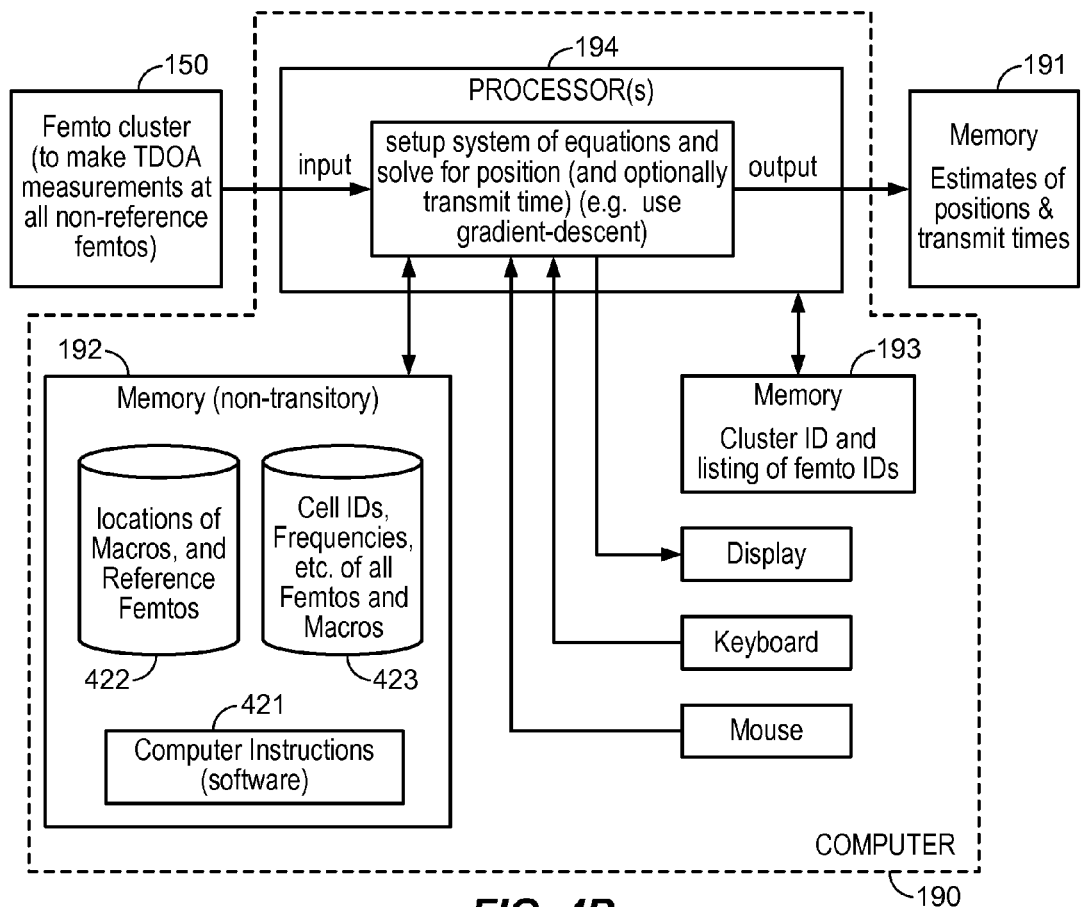
FIGS. 4B and 4C illustrate, in two high-level block diagrams that are alternatives to one another, transfer of measurements from a femto network 150 to a computer 190 that uses the measurements to calculate and store in a memory, locations and optionally transmit times of non-reference femtos, in certain aspects of the described embodiments.

Specifically, in act 403, computer 190 receives from an O&M computer 198 (see FIG. 7B), an identification of a cluster and a listing of identifiers of all femtos that are included within that cluster. A cluster may be formed by O&M computer 198 in any manner such that femtos in the cluster are sufficiently close to be able to receive and measure the pilot signals of one another. As illustrated in FIG. 4B, computer 190 is a location server that may include one or more processor(s) 194 to perform various acts shown in FIG. 4A by executing computer instructions 421 that may be stored (e.g. in binary form) in a non-transitory memory 192, such as a hard disk or a static RAM. Also stored in non-transitory memory 192 may be locations 422 of macros and reference femtos that are known, as well as other information 423 that does not change frequently such as cell identifiers, frequencies etc. of all femtos and macros in the wireless communication network. Computer 190 may include additional memories such as memory 193 that hold the above-described cluster identification and femto IDs listing.

Referring back to FIG. 4A, in response to receipt of the cluster and listing, computer 190 begins a process of polling each femto in the cluster to obtain its measurements. Specifically, in act 404, computer 190 sets the value of a loop counter i to 1 and then goes to act 405. In act 405, computer 190 may use backhaul link 189 to transmit a command to request femto i (which may be the first identified femto in the listing in certain aspects of the described embodiments) to initiate performance of measurements (e.g. TOA or TDOA) of any signals that are being received. Depending on the embodiment, computer 190 additionally transmits to a femto i at the unknown position, a listing of wireless transceivers whose signals are to be measured to generate the time difference of arrival (TDOA) values.

In response to the command received from backhaul link 189, femto i performs an operation 406, as follows. Specifically, femto i searches for any neighbor femtos and/or macros that are transmitting on the same frequency as itself, in order to perform intra-frequency measurements. Specifically, to do so, femto i turns off its downlink transmitter (which constitutes a means for downlink transmission) and searches for pilot signals of neighbor femtos and macros; e.g. femto i measures Time of Arrival (TOA) of received neighbor pilot signals and calculates TDOAs by pairwise subtracting TOA measurements. In some aspects of the described embodiments, femto i which is located at an unknown position, receives with the command from backhaul link 189, a listing of wireless transceivers whose signals are to be used to generate time difference of arrival (TDOA) values. This listing may include other assistance data information which may be used by femto i to perform the measurements, such as information on the pilot signal configuration (e.g., used codes, etc.). Therefore, at this stage femto i searches for pilot signals from the wireless transceivers that are identified in the listing received from backhaul link 189.

As noted elsewhere, an alternative is for femto i to measure TDOA itself, by performing cross-correlation operations between received signals. In some aspects of the described embodiments, femto i performs coherent accumulation of a pilot signal measurement over an appropriate time period, followed by non-coherent accumulations of several coherent accumulation results. For example, in a communication network according to the 3GPP Long Term Evolution (LTE) standard, the pilot signal may be a Positioning Reference Signals (PRS) which may accumulated coherently over one subframe, followed by non-coherent accumulation over several subframes. LTE is described in documents from an organization named "3rd Generation Partnership Project" (3GPP) having the postal address of 3GPP Mobile Competence Centre, c/o ETSI 650, route des Lucioles, 06921 Sophia-Antipolis Cedex, FRANCE and on the Internet at http://www.3gpp.org/.

After TDOAs have been computed and/or measured for all signals (e.g. pilot signals) that can be sensed (e.g. above a preset threshold), femto i turns on its downlink transmitter again. In some aspects of the described embodiments, femto i additionally searches for neighbor femtos/macros transmitting on a different frequency, to perform inter-frequency measurements—and does so without turning off its downlink transmitter.

Then, in act 407, femto i uses backhaul link 189 to return some or all measurements and identities of femtos and/or macros (e.g. cell identities) whose signals have been used to form the respective TDOAs. In some aspects of the described embodiments, femto i is configured to return in act 407 only those TDOA values that are linearly independent of one another (i.e. values that cannot be obtained by adding or subtracting one another). However, in other aspects of the described embodiments femto i returns all measurements regardless of whether or not they are linearly dependent, in which case computer 190 performs a method of the type illustrated in FIG. 6A to remove linearly dependent values.

On receipt of the computed/measured TDOAs computer 190 checks (as per act 408 in FIG. 4A) whether measurements have been received from all femtos in listing for the identified cluster. If not, then control transitions to act 409 wherein the loop counter i is incremented by 1 and control then returns to act 405 (described above). When all femtos in the listing for the identified cluster have reported measurements, the result of act 408 is yes, and control transfers to act 410. In act 410, computer 190 uses all received TDOA values and coordinates of reference femtos and/or macros in a set of simultaneous equations, to calculate all femto locations (and optionally time offsets). Next, computer 190 stores in a memory 191 (see FIG. 4B) the calculated positions and time offsets, as per act 411. Depending on the aspect of the invention, computer 190 may be any server-type computer such as a Sun Fire X2270 M2 server available from ORACLE Corporation, including 96 GB of random access memory (RAM), and a Xeon processor 5600 available from INTEL Corporation.

Depending on the aspect of the described embodiments, femto locations stored in memory 191 may be used in future in the normal manner (e.g. to authorize the femtos to join a wireless network, and/or to place an emergency phone call etc). In some aspects of the described embodiments, time offsets in memory 191 are sent to femtos 150 as per act 412, and femtos 150 in turn reset their internal clocks using these time offsets (in act 413), thereby to result in a synchronous network. Thereafter, computer 190 may repeat the above-described measurement process, now for a synchronous network (in view of act 413), e.g. by initializing the loop count to 1 as per act 414 and returning to act 405 (described above). Note that at this stage, there may be more equations than needed (assuming time base does not need to be calculated for each non-reference wireless transceiver), and therefore, improved location estimates for the non-reference femtos could be obtained, as also illustrated further down below with reference to FIG. 3C and FIG. 3D.

Figure 4C:
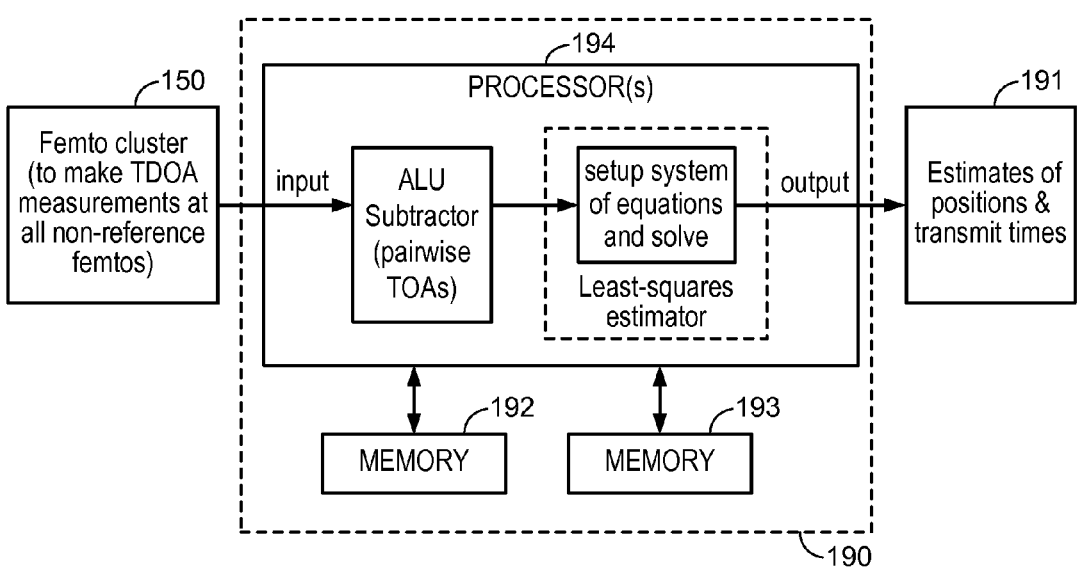

Although in the above description of FIG. 4A, TDOAs have been described as being transmitted by femtos 150 to computer 190, in other aspects of the described embodiments, TOAs are transmitted instead. Hence, in such aspects of the described embodiments, computer 190 uses a subtractor 197 in an arithmetic logic unit (ALU) in processor 194 to perform pair-wise subtraction of the received TOAs, to obtain TDOAs as illustrated in FIG. 4C. The TDOA values that are now obtained are then processed as described above and hence, the rest of the blocks in FIG. 4C (although not fully shown) are same as FIG. 4B.

Figure 5A:
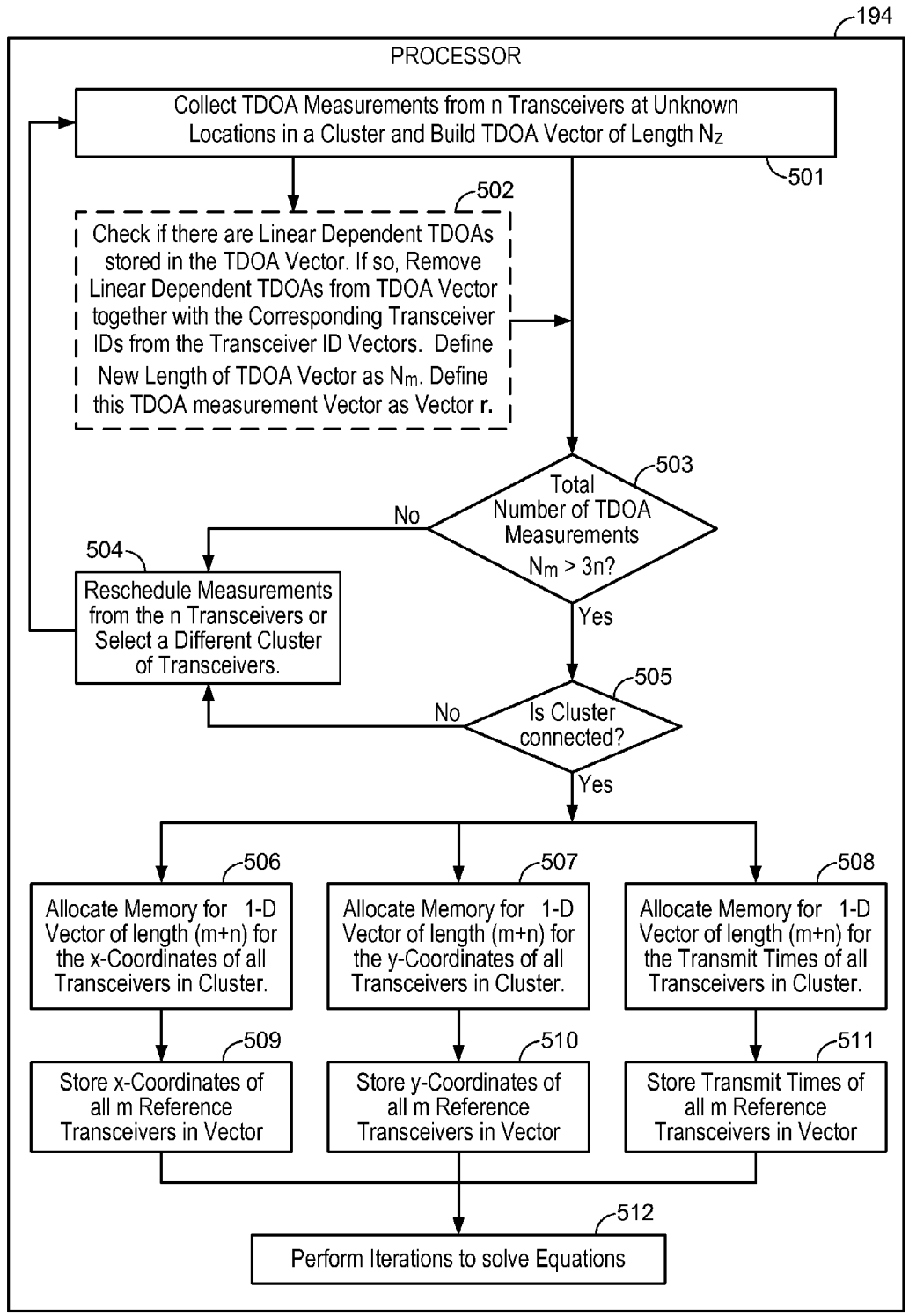
FIG. 5A illustrates, in a low-level flow chart, acts performed by computer 190 to assemble a matrix for use in solving a set of simultaneous equations, in certain aspects of the described embodiments.
Figure 5B:
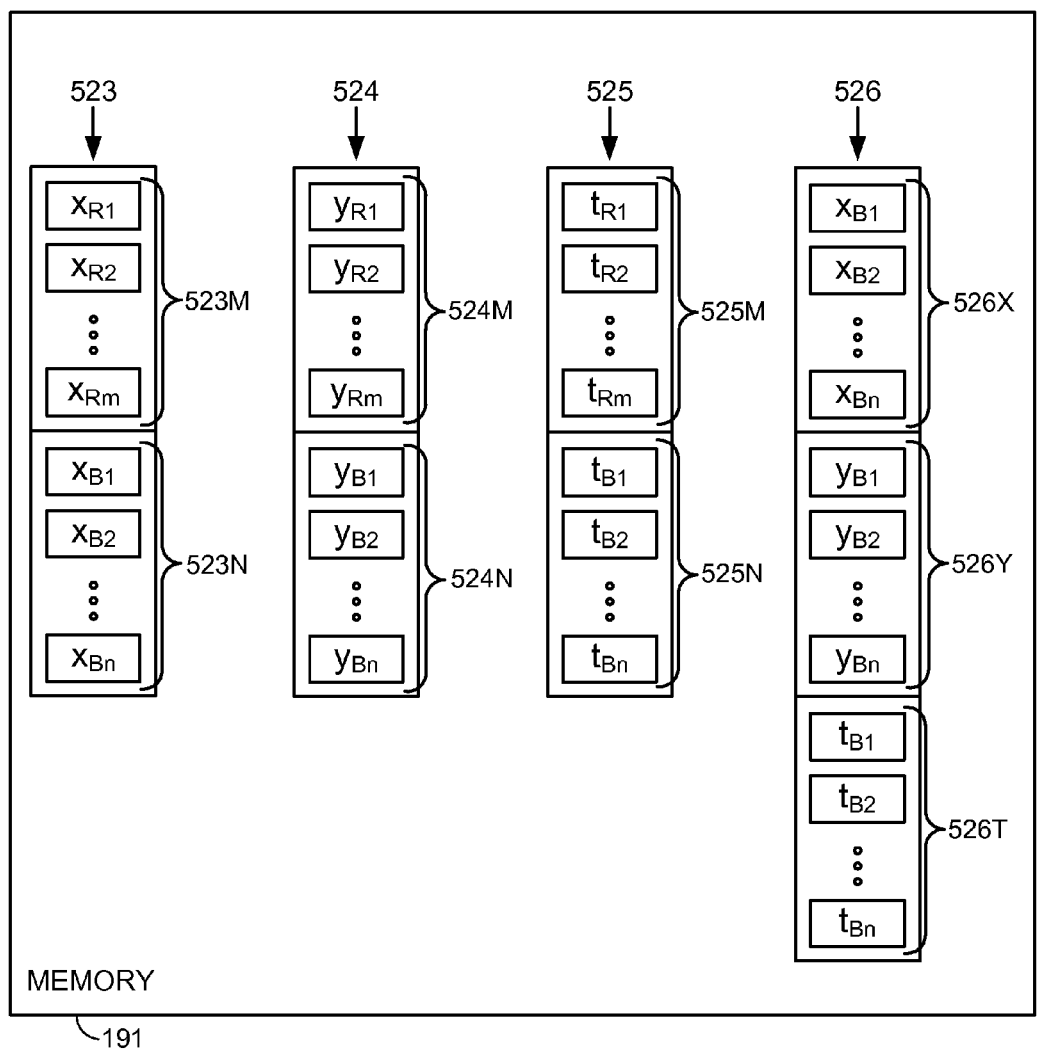
FIG. 5B illustrates, in a block diagram of memory 191 in FIG. 1A, three vectors for x-coordinates, y-coordinates and transmit times for all wireless transceivers included in a cluster; also shown is as a vector xyt for unknown parameters (x-coordinates, y-coordinates and transmit times of non-reference transceivers) that are being calculated.
Figure 5C:
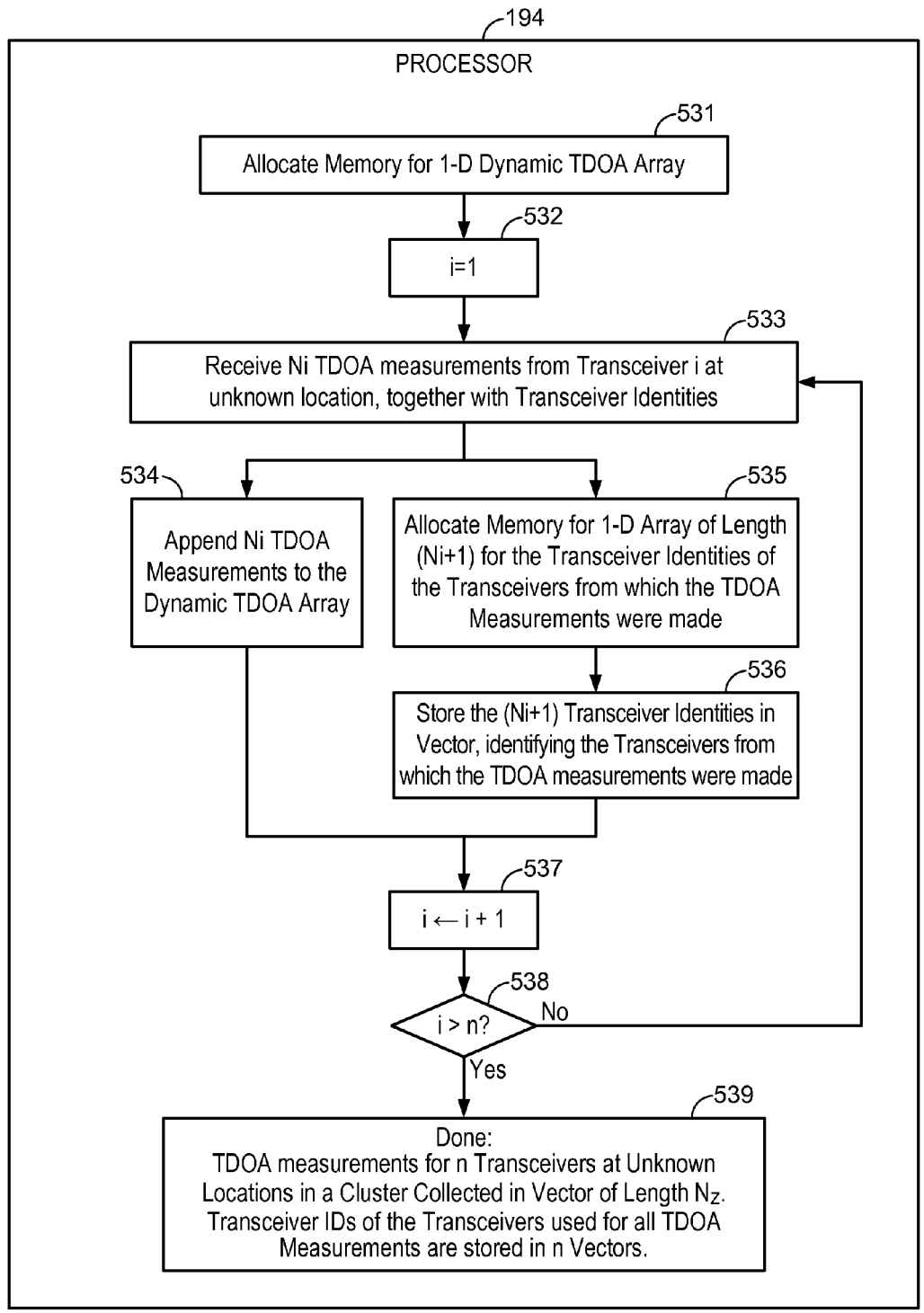
FIG. 5C illustrates, in a low-level flow chart, acts performed by computer 190 to receive and store a list of TDOA measurements and a corresponding list of identities of transceivers that transmit the signals used in the measurements, in some aspects of the described embodiments.
Figure 5D:
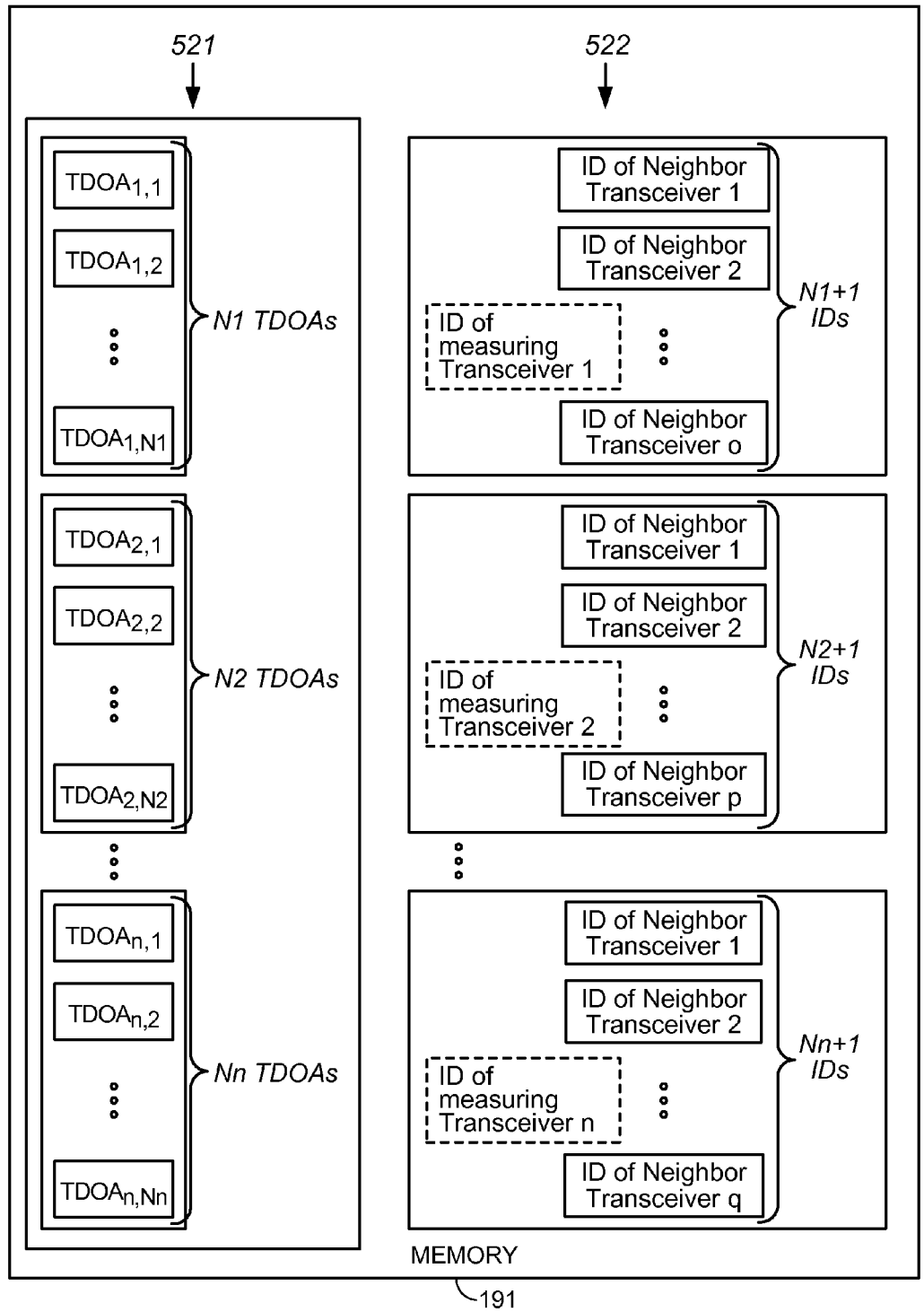
FIG. 5D illustrates, in a block diagram of memory 191 in FIG. 1A, the lists of measurements and identities prepared by computer 190 as shown in FIG. 5C.

In some aspects of the described embodiments, processor 194 is programmed by software 421 to perform a method that is illustrated in FIG. 5A. Specifically, in an act 501, processor 194 collect measurements of TDOA from n wireless transceivers that are located at unknown locations in a cluster as described above in reference to FIG. 4A, and then processor 194 builds a one-dimensional vector 521 of length Nz to hold the TDOAs, as illustrated in FIG. 5D. Length Nz is a summation of the number of linearly-independent measurements in vector 521, from each of the "n" non-reference wireless transceivers in the cluster, namely the summation of N1, N2, ... Nn.

In FIG. 5D, vector 521 holds Nz TDOAs, namely $TDOA_{1,1}$ $TDOA_{1,2}$ ... $TDOA_{1,N1}$ for measurements from the first non-reference wireless transceiver, $TDOA_{2,1}$ $TDOA_{2,2}$ ... $TDOA_{2,N2}$ for measurements from the second non-reference wireless transceiver, and so on. Hence, in vector 521, the first index identifies which transceiver made the measurement and the $2^{nd}$ index identifies how many total measurements were made. If among three measurements from a transceiver, a third TDOA measurement can be obtained as a sum of a first measurement and a second measurement, then the third measurement is excluded from vector 521, for being linearly dependent. Vector 521 is a dynamic vector with a length that changes depending on the number of measurements received from each wireless transceiver.

In addition to vector 521, processor 194 may also prepare and maintain another vector 522 (see FIG. 5D) to hold identifiers of transceivers from which signals were received at each transceiver. For example, the first value in vector 521 namely $TDOA_{1,1}$ is obtained by computing the difference between signals from neighbor transceiver with "ID of neighbor transceiver 1" and measuring transceiver with "ID of measuring transceiver 1". The list of transceivers in vector 522 is organized in the same order (i.e. same sequence) as the list of TDOA measurements in vector 521. Note that there are Ni+1 entries in vector 522 for each set of Ni entries for a given transceiver i in vector 521, because each measurement in vector 521 requires two transmitters in vector 522.

Referring to FIG. 5A, after act 501 is performed, an act 502 may be performed if the femtos 150 are permitted to send linearly dependent measurements. Specifically, in act 502, processor 194 checks if there are Linear Dependent TDOAs stored in the TDOA Vector 521. If so, Linear Dependent TDOAs are removed from TDOA Vector 521, together with the corresponding Transceiver IDs from Transceiver ID Vector 522 (see FIG. 5D). Therefore, TDOA Vector 521 now has the length $N_m$. At the end of both acts 501 and 502, processor 194 uses this TDOA measurement vector 521 to initialize a vector r and thereafter goes to act 503. In act 503, processor 194 checks if the Total Number of TDOA Measurements Nm>3n, wherein n is the number of transceivers and 3n is the number of unknowns (three unknowns per transceiver, namely x-coordinate, y-coordinate and time base). Note, the description considers two-dimensional location estimates, i.e., x-coordinate and y-coordinate. For three-dimensional location (x-coordinate, y-coordinate, z-coordinate), the number of unknowns would be four, and the number of TDOA measurements collected must then be greater 4n accordingly. If the result in act 503 is no, then this result indicates that there are not enough equations to calculate the number of unknowns, and hence processor 194 goes to act 504. In act 504, processor 194 reschedule measurements from the n Transceivers or decides to select a different cluster (by enlarging or reducing the area of the cluster, more or fewer transceivers may be included in the cluster). After act 503, processor 194 returns to act 501 described above.

If the result in act 503 is yes, then processor 194 goes to act 505 to check if the cluster forms a connected graph, i.e. if all of the transceivers identified as belonging to the cluster are reachable from any one of the transceivers. As noted above, a connectivity graph is illustrated in FIG. 3B, showing connections between femtos. If there is no signal (i.e. measurement) between a specific femto and any one of all other femtos in the cluster, the cluster does not form a connected graph. Hence, if the answer is no in act 505, processor 194 goes to act 504 (described above).

If the result of act 505 is yes, then this result indicates that a set of equations can be prepared and solved. Hence, processor 194 allocates memory for each of three vectors, as per acts 506, 507 and 508 respectively (two vectors 523 and 524 for the x and y coordinates respectively, and a third vector 525 for the time of transmission) and thereafter stores the three vectors in the allocated memory as per acts 509, 510 and 511. The three vectors 523-525 are all one-dimensional vectors, of length m+n, wherein m is the number of reference transceivers and n is the number of non-reference transceivers. The m elements 523M, 524M and 525M in each of the three vectors for the reference transceivers are initialized based on known values 422 (FIG. 4B) stored in memory 192. The n elements 523N, 524N and 525N in each of the three vectors for the non-reference wireless transceivers (e.g. transceivers 150BI, 150BJ and 150BK in FIG. 1A) are initialized to non-zero values, which are roughly estimated e.g. position and/or time known to be less accurate than required for normal operation of a transceiver in a wireless communication network.

In some aspects of the described embodiments, processor 194 forms another one-dimensional vector 526, also referred to herein as vector xyt, of length 3n to hold all unknown values (including the elements 523N, 524N, and 525N of vectors 523, 524 and 525 that respectively form elements 526X, 526Y and 526T of vector 526). Thereafter, in act 512, processor 194 uses one or more of vectors 523-526 in solving simultaneous equations, e.g. using a software package. When the process of solving simultaneous equations converges, vector 526 holds the calculated values, of positions and transmit times for the non-reference wireless transceivers (e.g. transceivers 150BI, 150BJ and 150BK in FIG. 1A).

Figure 5E:
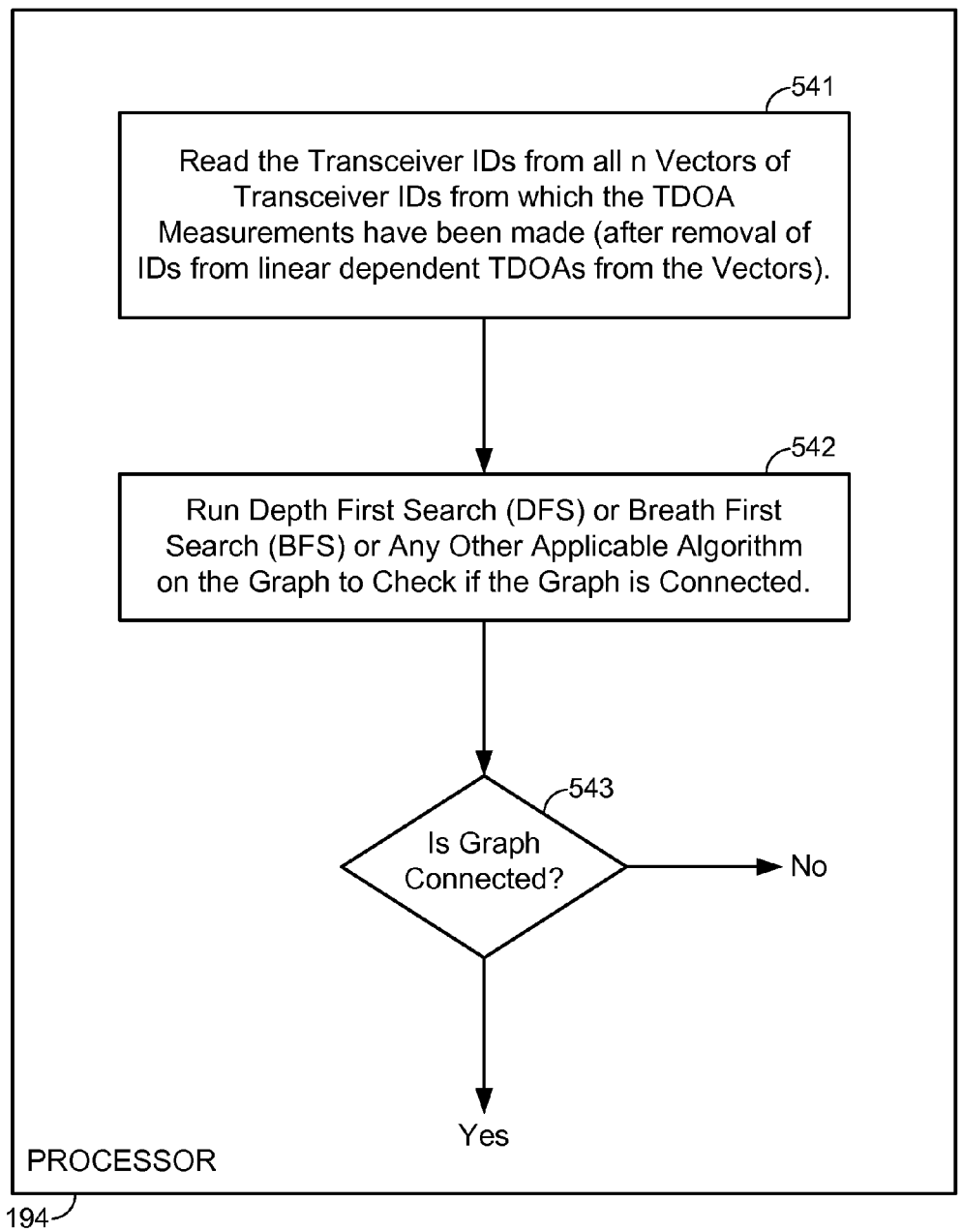
FIG. 5E illustrates, in a low-level flow chart, acts performed by computer 190 to check for connectivity of all femtos in a cluster, in certain aspects of the described embodiments.
Figure 5F:
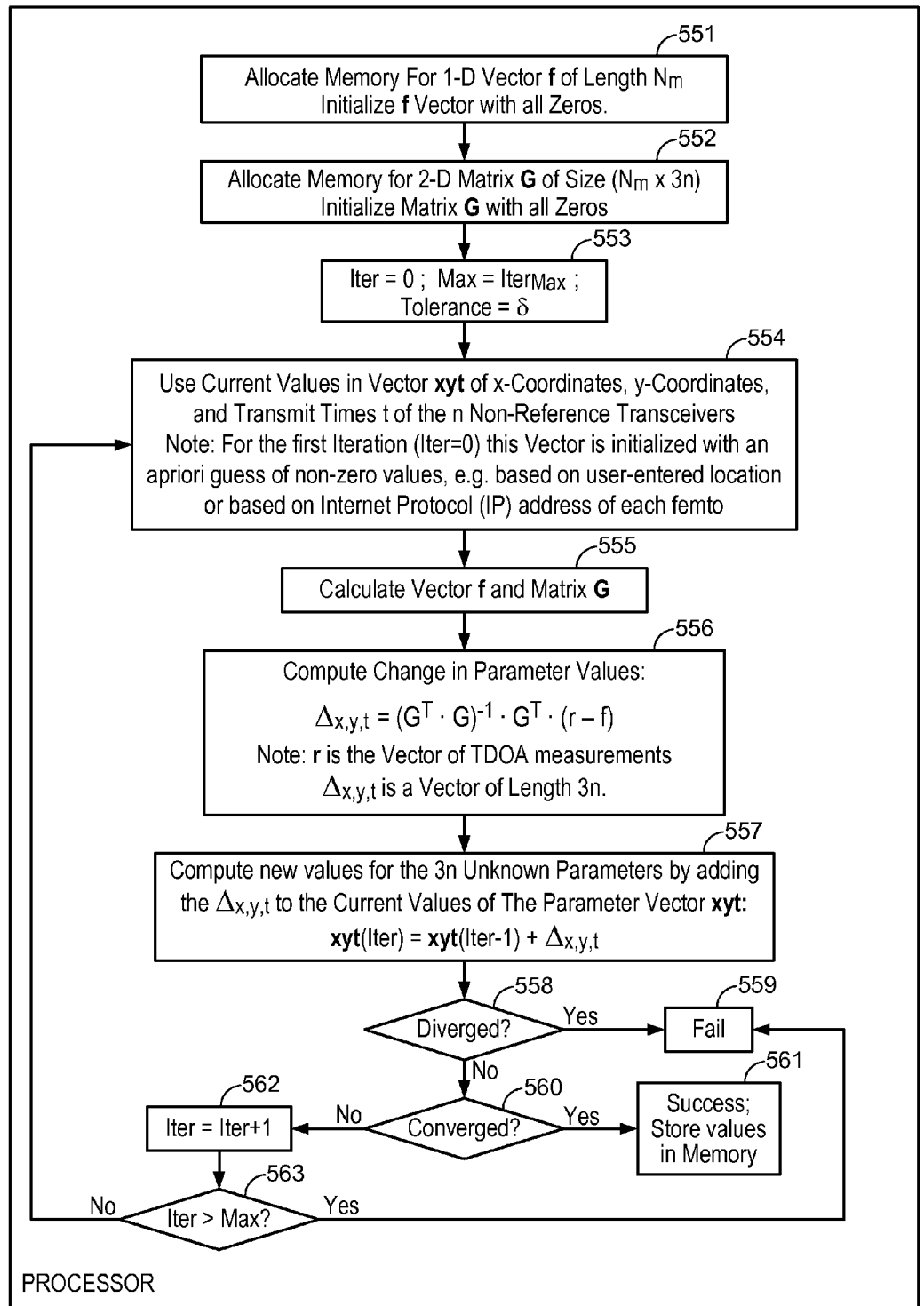
FIG. 5F illustrates, in a low-level flow chart, acts performed by computer 190 in an iterative loop to solve a set of simultaneous equations by gradient minimization, in certain aspects of the described embodiments.

Note that the specific manner in which the various acts of FIG. 5A are performed depends on the aspect of the described embodiments. In some aspects of the described embodiments, act 501 in FIG. 5A is performed as illustrated in FIG. 5C, described below, although as readily apparent in view of this disclosure act 501 is implemented differently in other aspects of the described embodiments. Moreover, in certain aspects of the described embodiments, act 505 in FIG. 5A is performed as illustrated in FIG. 5E, described below, although as readily apparent in view of this disclosure act 505 is implemented differently in other aspects of the described embodiments. Furthermore, in certain aspects of the described embodiments, act 512 in FIG. 5A is performed as illustrated in FIG. 5F, described below, although as readily apparent in view of this disclosure act 512 is implemented differently in other aspects of the described embodiments.

In some aspects of the described embodiments, processor 194 performs a method of the type illustrated in FIG. 5C. Specifically, in an act 531, processor 194 allocates memory for a one-dimensional dynamic array 521 (FIG. 5D). Note that the initially-allocated amount of memory for array 521 changes (i.e. increases), as measurements are received. The initial amount may be determined in any manner, e.g. based on the number of transceivers. Next, in act 532, processor 194 initializes a loop count i to 1 and goes to act 533. In act 533, processor 194 receives Ni TDOA measurements from a non-reference wireless transceiver i which is positioned at an unknown location, together with identities (IDs) of transceivers, from which the measurements were made.

Thereafter, processor 194 performs acts 534-536 as follows. In act 534, processor 194 appends the Ni TDOA measurements that were received in act 533, to dynamic TDOA vector 521. In act 535, processor 194 allocates memory for a one-dimensional array of length Ni+1, to be used to hold the identities (IDs) of transceivers which were also received in act 533. Next, processor 194 stores the transceiver identities (IDs) in an act 536. After acts 534-536 are performed, processor 194 increments the loop counter i by the value 1, and then goes to act 538.

In act 538, processor 194 checks whether loop counter i exceeds the number n, which is the number of non-reference transceivers. If the answer is no, then control returns back to act 533 (described above). If the answer is yes, then control transfers to act 539, and in this act processor 194 simply stores various values, as follows. Processor 194 stores in the dynamic vector 521 of length Nz (FIG. 5D), the TDOA measurements received from the n transceivers that have unknown locations in the cluster. Processor 194 additionally stores in the n vectors 522, the transceiver IDs of the transceivers used for all TDOA Measurements in vector 521.

In some aspects of the described embodiments, processor 194 performs a method of the type illustrated in FIG. 5E. Specifically, in an act 541, processor 194 reads the transceiver identifiers (IDs) from all n vectors 522 (FIG. 5D) from which TDOA measurements have been made (after removal of IDs related to linear dependent TDOAs). Next, in act 542, processor 194 runs a search through the vectors 522 to check if the remaining identifiers (that have not been removed) form a connected graph. Conceptually such a graph can be formed by representing transceivers as vertices and links (measurements) between transceivers as edges. Any graph traversal method may be used to check the connectivity of vectors 522, such as depth first search (DFS) or a breadth first search (BFS). For additional graph traversal algorithms, see for example, Knuth, Donald E. (1997), "The Art of Computer Programming", Vol. 1, 3rd Ed., Addison-Wesley, Boston which is hereby incorporated by reference herein in its entirety. Next, in act 543 (FIG. 5E), processor 194 checks on an outcome of graph traversal, to find out whether the graph is connected, and if yes the answer is yes in act 505 (FIG. 5A) and if not the answer is no in act 505.

In some aspects of the described embodiments, processor 194 performs a method of the type illustrated in FIG. 5F. Specifically, in an act 551, processor 194 allocates memory in memory 191 for a one-dimensional vector f of length $N_m$, and initializes vector f with all zeros. Thereafter, in act 552, processor 194 allocates memory in memory 191 for a two-dimensional matrix G of size $N_m \times 3n$, and initializes matrix G with all zeros. FIG. 5I illustrates the one-dimensional vector f and the two-dimensional matrix G in some aspects of the described embodiments.

Thereafter, in act 553, processor 194 sets up the loop counter Iter, e.g. by initializing it to 0 and setting a maximum limit on retrys when there is no convergence in solving the simultaneous equations e.g. to 20 retrys. Also in act 553, processor 194 sets a tolerance value δ to be used to check for convergence and stop iteration. Tolerance δ may be selected based on accuracy requirements on positioning of femtos, e.g. to comply with governmental regulations and/or requirements of an operator of the wireless communication network. For example, tolerance value δ is sent in some aspects of the described embodiments to the value 0.25 m.

Thereafter, in an act 554, processor 194 loads into its memory 192, the current values of vector xyt of the parameters: x-Coordinates, y-Coordinates, and Transmit Times t of each of the n non-reference wireless transceivers (hence, there are 3n unknowns). In the next act 555 of the iterative loop to solve simultaneous equations, processor 194 computes estimates of TDOAs, using currently known coordinates, namely the values of vector xyt, and thereafter stores the computed TDOA values in a vector f. For the first Iteration (Iter=0), this vector xyt is initialized with an apriori guess of non-zero values for the 3n unknowns, in some aspects of the described embodiments. Non-zero values are needed in certain aspects of the described embodiments that use matrix operations, such as an inversion operation (because a zero valued matrix or a zero valued vector cannot be inverted).

When initial guesses are too far-off from true values, the method of FIG. 5F may fail to converge to a solution for the 3n unknown parameters. For this reason, a "rough" estimate is initially made, of the 3n unknown parameters in vector xyt, e.g. based on a user-entered locations or based on Internet Protocol (IP) addresses of the n non-reference wireless transceivers. In some aspects of the described embodiments, a non-reference wireless transceiver i is initialized in vector xyt to a position that is offset by 1 meter in each of two coordinates, from a known position of a reference wireless transceiver j that is found to have the strongest signal at this non-reference wireless transceiver i.

For example, non-reference wireless transceiver 150BJ in FIG. 1D may receive wireless signals from two reference wireless tranceivers 150RA and 150RB with a signal strengths of −90 dBm and −110 dBm, respectively. In this example, the signal from transceiver 150RA is identified by a processor within transceiver 150BJ as the strongest signal among the two received signals from reference wireless transceivers 150RA and 150RB, because the received signal strength of −90 dBm from transceiver 150RA is greater than the received signal strength of −110 dBm from transceiver 150RB. Therefore, the position of non-reference wireless transceiver 150BJ in this example may be initialized to be offset by 1 meter in each of the two coordinates from a known position of reference wireless transceiver 150RA. The exemplary unit of the received signal strength above is dBm, which is an abbreviation for the power ratio in decibels (dB) of the measured power referenced to one milliwatt.

If another non-reference wireless transceiver k also happens to find that the strongest signal it receives is also from the same reference wireless transceiver j then its position in vector xyt is initialized to another position that is offset by 2 meters in each of two coordinates, from the known position of reference wireless transceiver j. For example, non-reference wireless transceiver 150BI in FIG. 1C may receive signals from two reference wireless tranceivers 150RA and 150RB with a signal strengths of −105 dBm and −120 dBm, respectively. In this example, the signal from transceiver 150RA is again identified by a processor within transceiver 150BI as the strongest signal among the two received signals from reference wireless transceivers 150RA and 150RB, because the received signal strength of −105 dBm from transceiver 150RA is greater than the received signal strength of −120 dBm from transceiver 150RB. Therefore, the position of non-reference wireless transceiver 150BI in this example may be initialized to be offset by 2 meter in each of the two coordinates from reference wireless transceiver 150RA.

As another example, a non-reference wireless transceiver i may be initialized to a position half-way between a pair of reference wireless transceivers j and k that are found to have the strongest signals (received signal strength, or RSS) at the non-reference wireless transceiver i whose position is being roughly estimated to initialize its 3 unknown parameters in vector xyt. In some aspects of the described embodiments, specific values used in initialization of vector xyt are not precisely accurate, although more accurate values result in a higher probability of convergence, within fewer iterations. For example, the vector xyt may be initialized with just random values within a certain range (e.g., the maximum and minimum range corresponding to the area covered by the location of the reference transmitters; the transmit times in vector xyt may also be initialized with arbitrary numbers within a range that is based on a maximum time difference between transmit signal frames of any two transmitters within the area).

As another example, non-reference wireless transceivers may be initialized to positions randomly distributed around the center location of reference wireless transceivers. If there are m reference wireless transceivers in a cluster, a center location of all m reference transceivers may be determined. The positions of the n non-reference wireless transceivers in the considered cluster may then be initialized randomly within a circle or any other area centered at the determined center location of the m reference transceivers. The size of the area around the center location may be determined by the farthest away reference transceiver from the determined center location of the m reference transceivers. The transmit times of the n non-reference transceivers may be initialized with arbitrary random numbers (e.g. selected within a predetermined range).

Also in act 555, processor 194 calculates a matrix G which is a partial derivative of the vector f (e.g. in some aspects of the described embodiments along each of two position coordinate axes, the x axis and the y axis, and the transmit times). Thereafter, in act 556, processor 194 computes a difference r−f, between the TDOA measurements (in vector 521 of FIG. 5D which holds vector r) and the estimates of TDOA using the currently known coordinates and transmit times (in vector f). Also in act 556, processor 194 multiplies the difference r−f with a scaling factor based on an inverse of matrix G (a partial derivative with respect to each of the three parameters, x, y and t), to obtain an indication of the change in values $\Delta_{xyt}$. Note that vector $\Delta_{xyt}$ is a one-dimensional vector of length 3n. The difference r−f is related to matrix G and vector $\Delta_{xyt}$ as follows:

$$r-f=G\cdot\Delta_{xyt}$$

Hence, to solve for $\Delta_{xyt}$ (so it can be added to parameter vector xyt, in order to obtain new values thereof) it is necessary to invert matrix G. For a quadratic set of equations, the inverse is the matrix $G^{-1}$ although some aspects of the described embodiments use a non-quadratic set of equations for which the inverse is $(G^T\cdot G)^{-1}\cdot G^T$. Therefore, matrix $(G^T\cdot G)^{-1}\cdot G^T$ is computed in act 556 in some aspects of the described embodiments and the resulting matrix is then multiplied (using a matrix multiplication operation) with the difference vector r−f thereby to obtain change vector $\Delta_{xyt}$ as follows:

$$\Delta_{xyt}=(G^T\cdot G)^{-1}\cdot G^T\cdot(r-f)$$

Thereafter, in act 557, processor 194 computes new values for the 3n unknown parameters, by adding the newly-calculated change vector $\Delta_{xyt}$ to the current values for these 3n unknown parameters in vector xyt, thereby to yield new values for these 3n unknown parameters in vector xyt, as follows:

$$xyt(\text{Iter})=xyt(\text{Iter}-1)+\Delta_{xyt}$$

Note that the above equation is based on a least squares method described below in reference to equation (17), and obtained by using Taylor series to linearize a cost function by retaining only the zero-th and first order terms.

Thereafter, in act 558, processor 194 checks if the solution is diverging, e.g. by checking if $\Delta_{xyt}$ of the current iteration is greater than $\Delta_{xyt}$ of the prior iteration and if so goes to act 559 to handle a failure to converge. In act 559, processor 194 may reschedule measurements, e.g. using a larger or smaller cluster, and/or repeat the measurements while silencing transmission(s) by one or more neighboring transceivers etc. Processor 194 may also use new initial values for vector xyt and repeat the method in FIG. 5F with act 551, but now with different apriori guesses of the values in vector xyt. In act 558 if the answer is no, then processor 194 goes to act 560 to check for convergence, e.g. by checking if $\Delta_{xyt}$ of the current iteration (expressed in units of meter; i.e., the units of time are converted to units of meter by multiplying the time with the propagation speed of radio waves (e.g., speed of light)) is less than a tolerance δ (e.g. set to a common value 0.25 meter in act 553 as noted above).

In some aspects of the described embodiments, each of the 3n values in $\Delta_{xyt}$ is compared to tolerance δ and act 560 determines convergence to be true only when none of the 3n values exceeds tolerance δ. If such a condition is satisfied in act 560, then processor 194 goes to act 561 to handle a success, e.g. store the current values of the 3n unknowns in vector xyt in a database in non-transitory memory 192 for future use and/or transmit vector xyt to O&M computer 198. If the answer in act 560 is no, then the loop counter iter is incremented in act 562, followed by act 563 of checking if a predetermined maximum limit is reached by the loop counter iter. If act 563 indicates that the maximum has been reached, processor 194 goes to act 559 (described above), and alternatively goes to act 554 to perform a next iteration.

Figure 5G:
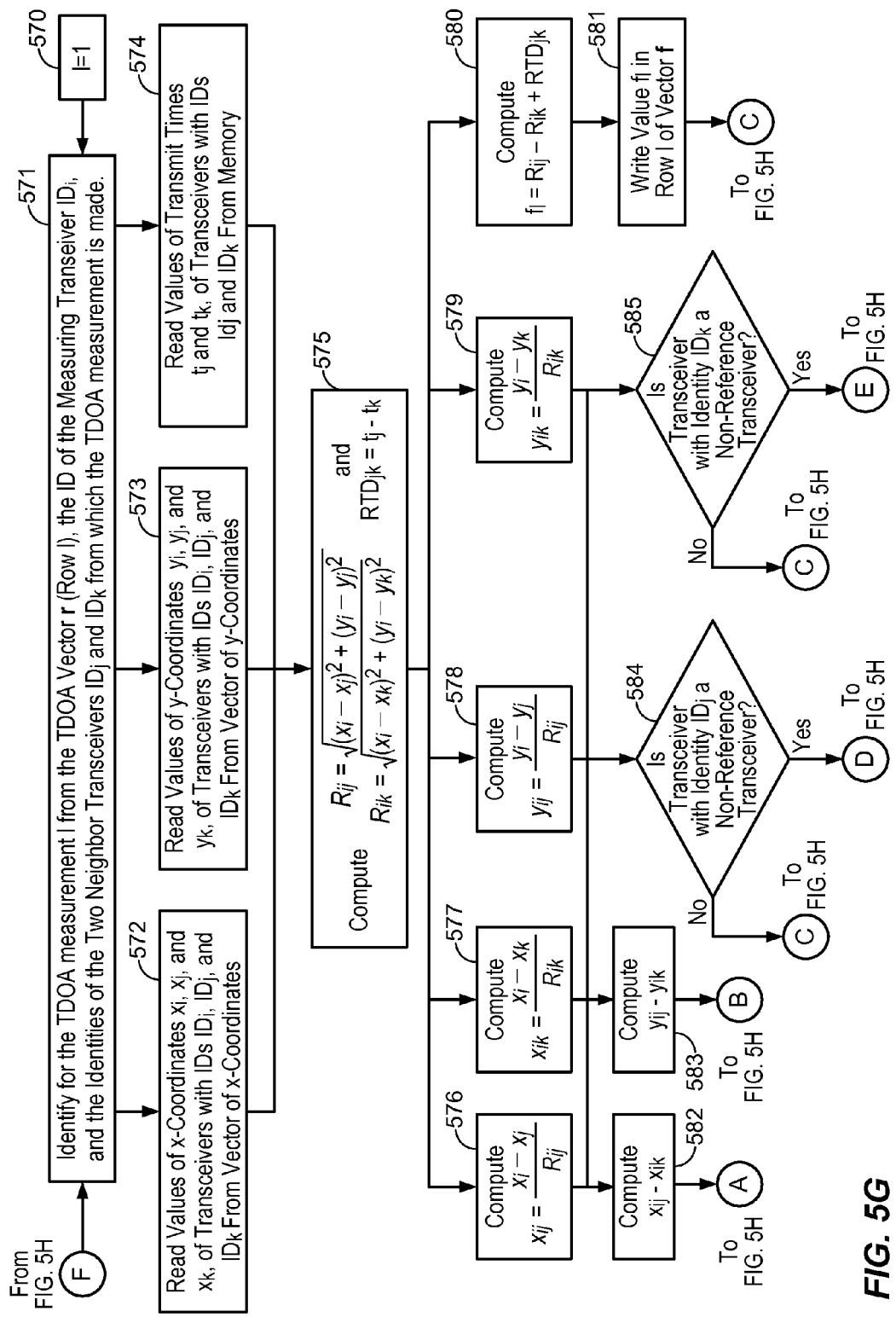
FIGS. 5G and 5H together illustrate, in a low-level flow chart, acts performed by computer 190 to prepare a vector f of estimates (for x and y coordinates and transmit times) and a matrix G representing a partial derivative of vector f with respect to the x and y coordinates and transmit times, for use in the iterative looping method of FIG. 5F.
Figure 5H:
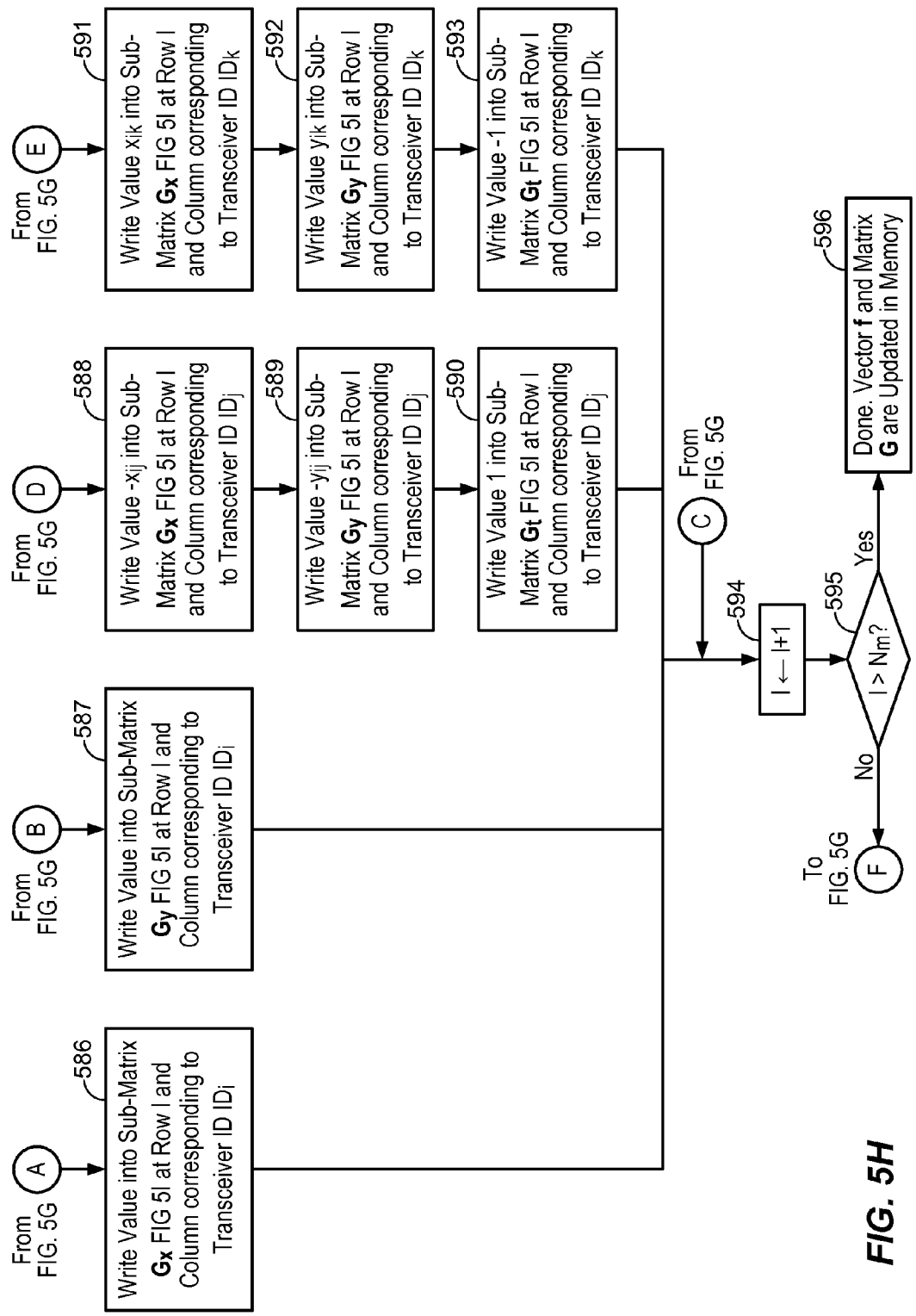
Figure 5I:
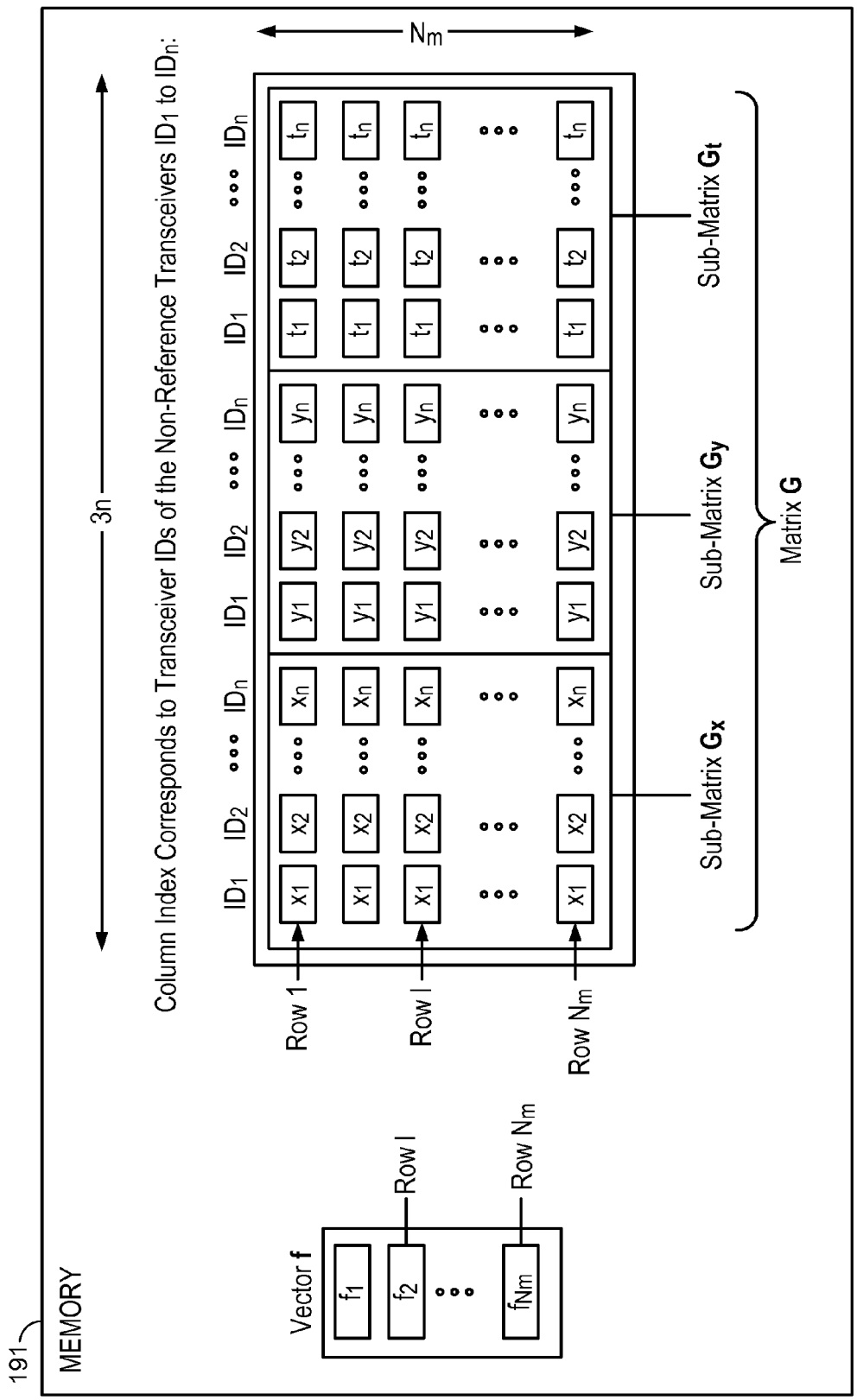
FIG. 5I illustrates, in a block diagram of memory 191 in FIG. 1A, the estimates vector f and the partial derivative matrix G used in the methods of FIGS. 5F and 5G.

In some aspects of the described embodiments, processor 194 performs a method of the type illustrated in FIGS. 5G and 5H to implement act 555 in FIG. 5F, although other methods may be performed in other aspects of the described embodiments. Specifically, in an act 570, a loop counter I is initialized to 1, and then processor 194 goes to act 571. In act 571, for a TDOA measurement I in vector 521 (FIG. 5D) which holds vector r (from a Row I therein), processor 194 uses vector 522 to retrieve an identifier (ID) of a measuring transceiver IDi, and also identities of its two neighbor transceivers IDj and IDk from which the TDOA measurement I is made. Next, in acts 572-574, processor 194 reads the values of the x-coordinates $(x_i, x_j, x_k)$, y-coordinates $(y_i, y_j, y_k)$, and transmit times $(t_j, t_k)$, of the just-identified three transceivers IDi, IDj and IDk. Thereafter, in act 575, processor 194 uses these values to compute the following distances of transceiver IDi, to its two neighbor transceivers IDj and IDk:

$$R_{i,j}=\sqrt{(x_i-x_j)^2+(y_i-y_j)^2}$$

$$R_{i,k}=\sqrt{(x_i-x_k)^2+(y_i-y_k)^2}$$

In act 575, processor 194 additionally computes the time difference $RTD_{j,k}=t_j-t_k$.

Next, in acts 576 and 577, processor 194 computes the first derivative of the distance of the x coordinate between transceiver IDi and its two neighbor transceivers IDj and IDk, as follows:

$$x_{ij} = \frac{x_i - x_j}{R_{ij}}$$

$$x_{ik} = \frac{x_i - x_k}{R_{ik}}$$

Thereafter, in act 582, processor 194 computes the difference between these two derivatives, namely $x_{ij} - x_{ik}$ as the derivative of the TDOA estimate with respect to the x-coordinate. Next, in act 586, this value is stored into matrix G illustrated in FIG. 5I, at an appropriate location therein for the x-coordinate, and corresponding to row I, and transceiver identifier IDi.

Similarly in acts 578 and 579, processor 194 computes the first derivative of the distance of the y coordinate between transceiver IDi and its two neighbor transceivers IDj and IDk, as follows:

$$y_{ij} = \frac{y_i - y_j}{R_{ij}}$$

$$y_{ik} = \frac{y_i - y_k}{R_{ik}}$$

Thereafter, in act 583, processor 194 computes the difference between these two derivatives, namely $y_{ij} - y_{ik}$ as the derivative of the TDOA estimate with respect to the y-coordinate. Next, in act 587, this value is stored into matrix G illustrated in FIG. 5I, at an appropriate location therein, for the y-coordinate, and corresponding to row I, and transceiver identifier IDi.

Thereafter in acts 584 and 585, processor 194 checks to see if the neighbor transceivers IDj and IDk are non-reference transceivers. If the answer is yes, corresponding acts are performed, to update matrix G using the respective first derivatives of the x and y coordinates. Specifically, values $-x_{ij}$ and $-y_{ij}$ are written into matrix G in a column for transceiver identifier IDj at the row I in respective acts 588 and 589 if the answer in act 584 is yes. Additionally, in act 590, the value 1 is written into matrix G in the column for transceiver identifier IDj at row I as the first derivative of time. Moreover, values $x_{i,k}$ and $y_{i,k}$ are written into matrix G in a column for transceiver identifier IDk at the row I in respective acts 591 and 592 if the answer in act 585 is yes. Additionally, in act 593, the value −1 is written into matrix G in the column for transceiver identifier IDk at the row I as the first derivative of time.

Moreover, in act 580, processor 194 computes a TDOA estimate $f_I$ based on current values of distances $R_{ij}$ and $R_{ik}$ and time difference $RTD_{jk}$ and in act 581 the newly-computed estimate is written into vector f in the row I.

After matrix G and vector f are both updated as described above, processor 194 increments loop counter I in act 594 and then goes to act 595. In act 595, processor 194 checks if the loop counter has reached the limit $N_m$ (which is the size of the TDOA vector 521). If not, processor 194 returns to act 571 (described above), and alternatively goes to act 596. In act 596, processor 194 finishes up, by updating its memory with the latest values of vector f and matrix G, and thus completes act 555 of FIG. 5F.

Figure 6A:
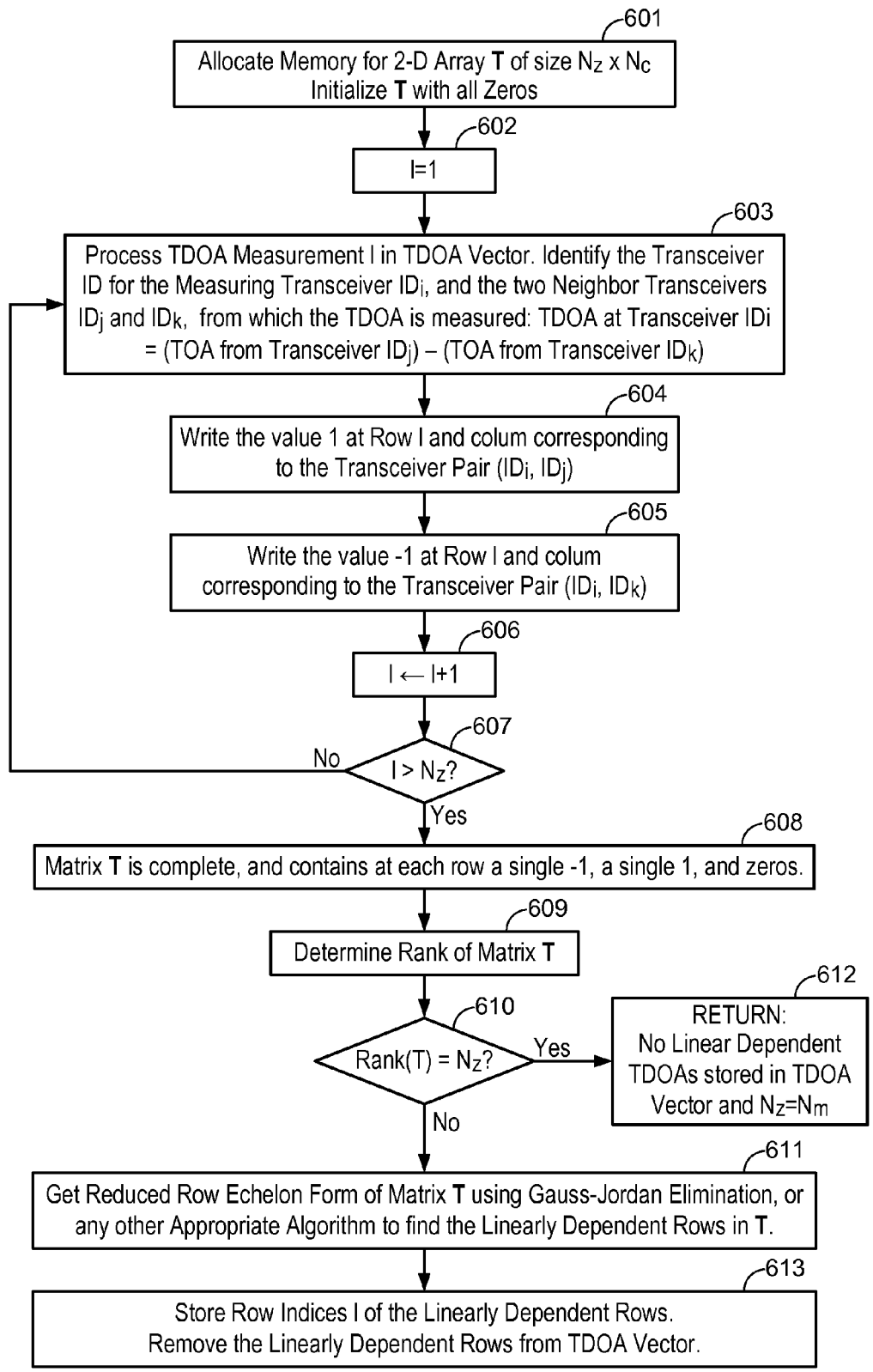
FIG. 6A illustrates, in a low level flow chart, acts performed in some aspects of the described embodiments to remove linearly-dependent TDOA measurements from a set of equations prior to solving them to obtain estimates of x-coordinates, y-coordinates and transmit times of non-reference transceivers.

In some aspects of the described embodiments, processor 194 performs a method of the type illustrated in FIG. 6A to remove linearly dependent TDOA values when forming vector 521 (FIG. 5D) as described above in reference to act 502, although other methods may be performed in other aspects of the described embodiments. Specifically, in an act 601, processor 194 allocates memory for a two-dimensional array T of size $N_z \times N_c$, and initializes the array T with all zeros. $N_z$ is the total number of TDOA measurements that have been collected in vector 521. $N_c$ is the maximum possible number of TOAs, based on all possible links, between m+n transceivers. Note that m×n is the number of links between reference and non-reference transceivers, while n(n−1)/2 is the number of links between non-reference transceivers. Hence, $$N_c = m \times n + \frac{n(n-1)}{2}$$

Figure 6B:
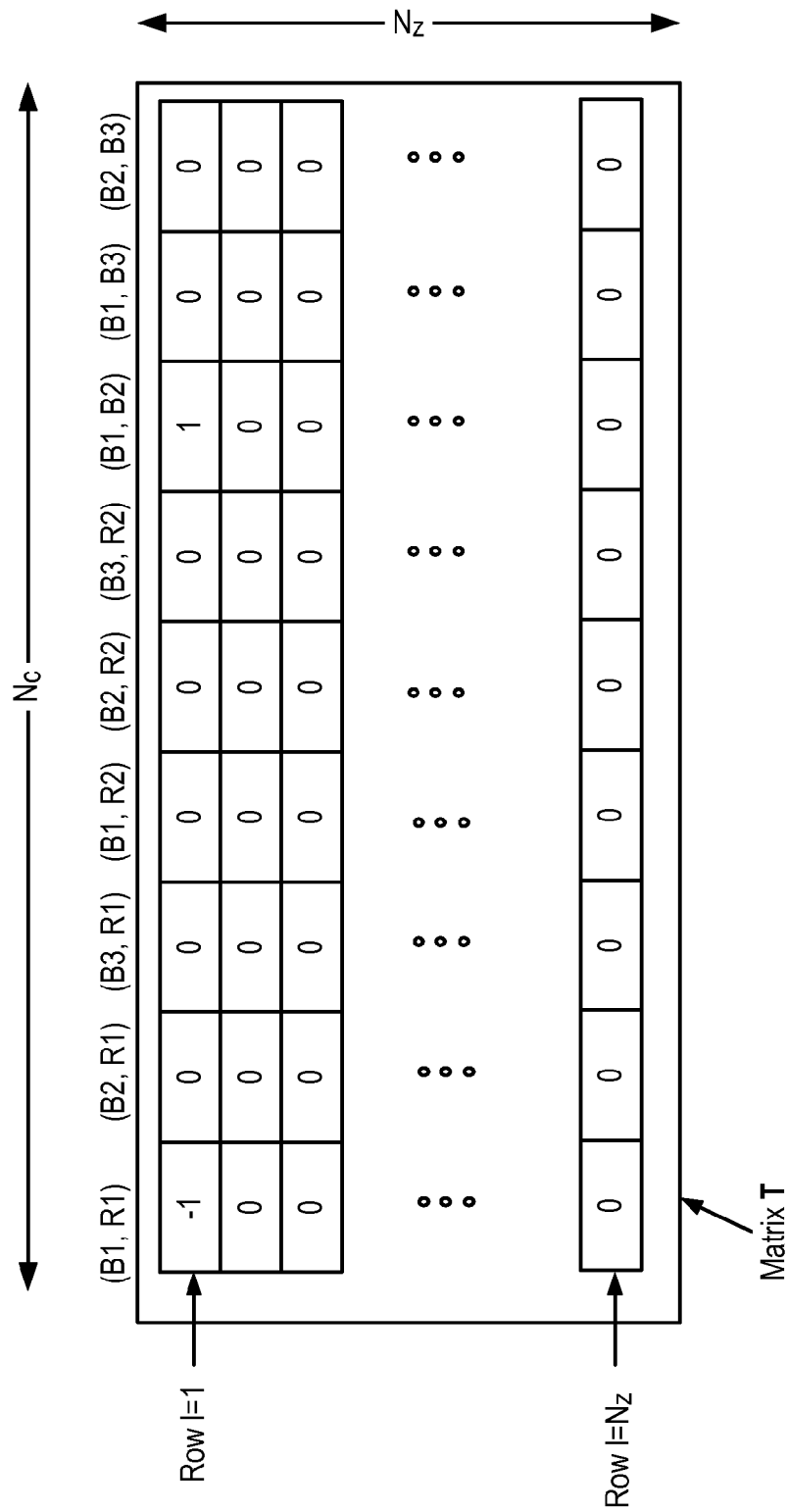
FIG. 6B illustrates, in a block diagram of memory 191 in FIG. 1A, a matrix T that is used by the method of FIG. 6A.

In an illustrative example shown in FIG. 1A, m=2 because there are two reference transceivers 150RA (labeled as R1 in FIG. 6B) and 150RB (labeled as R2 in FIG. 6B). In the example of FIG. 1A, n=3 because there are three non-reference transceivers 150BI, 150BJ and 150BK (labeled as B1, B2 and B3 in FIG. 6B). Hence, there are 2×3=6 links between the reference transceivers and the non-reference transceivers, namely (B1, R1); (B2, R1); (B3, R1); (B1,R2); (B2,R2); (B3,R2).

Moreover, there are (3×2)/2 or 3 links among non-reference transceivers, between one another, namely (B1,B2); (B1,B3); (B2,B3). Hence, in this example, $N_c$=6+3=9. Therefore, in matrix T (see FIG. 6B), row index I runs from 1 to $N_z$ and column index corresponds to the $N_c$ transceiver pairs. Note that the method of FIG. 6A fills the Matrix T with 1 and −1. Hence, after this method has been executed, each Row in Matrix T contains a single 1, a single −1, and zeros. In an example shown in FIG. 6B, a TDOA measurement 1=1 is made at Measuring Transceiver B1, with the two neighbors B2 and R1: (A) TOA1 at measuring transceiver B1 for this TDOA is made from B2 and (B) TOA2 at measuring transceiver B1 for this TDOA is made from R1. This TDOA is TOA1-T0A2 in this example.

Referring to FIG. 6A, in act 602, processor 194 initializes a loop counter I to 1. Then, in act 603, processor 194 processes a measurement I in the TDOA vector 521 as follows. Processor 194 identifies the transceiver ID of the measuring transceiver as IDi, and also identifies the two neighbor transceivers IDj and IDk from whose signals the TDOA measurement I was made. Next, in act 604, processor 194 writes the value 1 into row I and the column corresponding to the transceiver pair (IDi, IDj). Next, in act 605, processor 194 writes the value −1 into row I and the column corresponding to the transceiver pair (IDi, IDk). Then in act 606, the loop counter I is incremented followed by checking in act 607 whether the loop counter I exceeds $N_z$ and if not control returns to act 603 (described above). If the answer in act 607 is yes, then the looping is completed in act 608, which may optionally store matrix T in a buffer for further processing. Then in act 609, processor 194 determines the rank of matrix T in any manner well known in the art. Thereafter, in act 610, processor 194 checks whether the rank is equal to $N_z$ and if so then act 612 is performed to return a result that there are no linear dependent TDOAs in vector 521. If in act 610 the result is no, then act 611 is performed to remove one or more linear dependents from vector 521, e.g. by getting a reduced row echelon form of matrix T using Gauss-Jordan Elimination. Then act 613 is performed to store row indices I of the linear dependent rows, followed by removing the linear dependent rows from vector 521.

During measurement of TOAs or TDOAs by a non-reference wireless transceiver as described above, some aspects of the described embodiments operate by silencing one or more of its neighbors, e.g. a neighbor whose wireless signal has the maximum Received Signal Strength (RSS) among all wireless signals that are received (also called "strongest neighbor"). In one such silencing method, a location server computer 190 (FIG. 7B) may respond to a request from O&M computer 198 identifying a listing of femtos in femto cluster 750, by initializing a loop counter i to 1 in an act 701 (FIG. 7A). Note that in FIG. 7B, the arrows within femto cluster 750 indicate pilot signals being transmitted and received by wireless transceivers that may or may not be references. In the example shown in FIG. 7B, reference wireless transceivers 753, 755, 757 and 758 (each shown in a rectangular box with a clock symbol indicating that the reference wireless transceivers are synchronized) transmit pilot signals, and in addition non-reference wireless transceivers 751, 760, 752, 759, 756 and 754 also transmit pilot signals even though their positions and transmit times are not precisely known yet.

Specifically, in FIG. 7B, a box 757B indicates that wireless transceiver 757 is a reference wireless transceiver and its internal clock 757C is synchronized to a common clock in the wireless communication network. In contrast, wireless transceiver 756 does not have a box in FIG.>7B and therefore denotes a new wireless transceiver yet to be added to the wireless communication network. Absence of a box for wireless transceiver 756 indicates that it is located an unknown position and absence of a clock symbol indicates that its internal clock is not synchronized to the common clock.

In some aspects of the described embodiments, all the femtos in femto cluster 750 transmit the pilot signals on the same frequency (i.e. a common frequency that is predetermined). Note that in some aspects of the described embodiments, new wireless transceivers that are yet to be added to the wireless network are configured to transmit pilot signals for use by other wireless transceivers (e.g. stationary) in their vicinity in making measurements of the type described herein (such as TOA and/or TDOA or RSS measurements), but may not yet allow mobile stations to connect to the new wireless transceivers.

In some aspects of the described embodiments signal transmission by a wireless transceiver 900 (FIG. 9) located at a completely unknown position may be prohibited (e.g. prohibited by certain regulatory agency and/or rule or law). In such cases, a very rough initial location of the transceiver may need to be determined first before the wireless transceiver is configured to transmit pilot signals. Such an initial location estimate may be entered by the user (e.g. after being prompted by a user interface displayed on a display 911 in FIG. 9 and responding by typing on a keyboard 912) or entered by a provider (e.g. Internet service provider) of the transceiver 900 based on e.g., country, city or street address level. In some aspects of the described embodiments an initial location estimate may also be obtained by looking up a database that maps a physical location to an IP address that is assigned to transceiver 900 for an Internet connection which usually provides a general idea of location based on the IP address ranges owned by certain service providers.

In some aspects of the described embodiments this initial location estimate may not need to be very precise (e.g., for regulatory matter an initial location estimate based on identification of a country. or state, or city in which the transceiver 900 is located may be enough to allow transmission of pilot signals). Note that a transceiver for which only the initial location estimate is known may be treated as a new wireless transceiver at an unknown position in several described embodiments.

A position of transceiver 900 that is more precise than the initial location estimate (e.g. precise to within a predetermined limit, such as 2 meters or less) may then be determined using the embodiments described herein e.g. by solving simultaneous equations. Such a determined position may be a known position that then can be used to verify the initial location estimate provided (e.g., provided by the user of the transceiver 900 or by a service provider). For example, if the determined precise location is not within an area identified by the initial location (e.g., not within the boundaries of the identified country or city), the wireless transceiver may be commanded to turn off its transmission completely, and may not be allowed to enter the communications network.

Figure 7C:
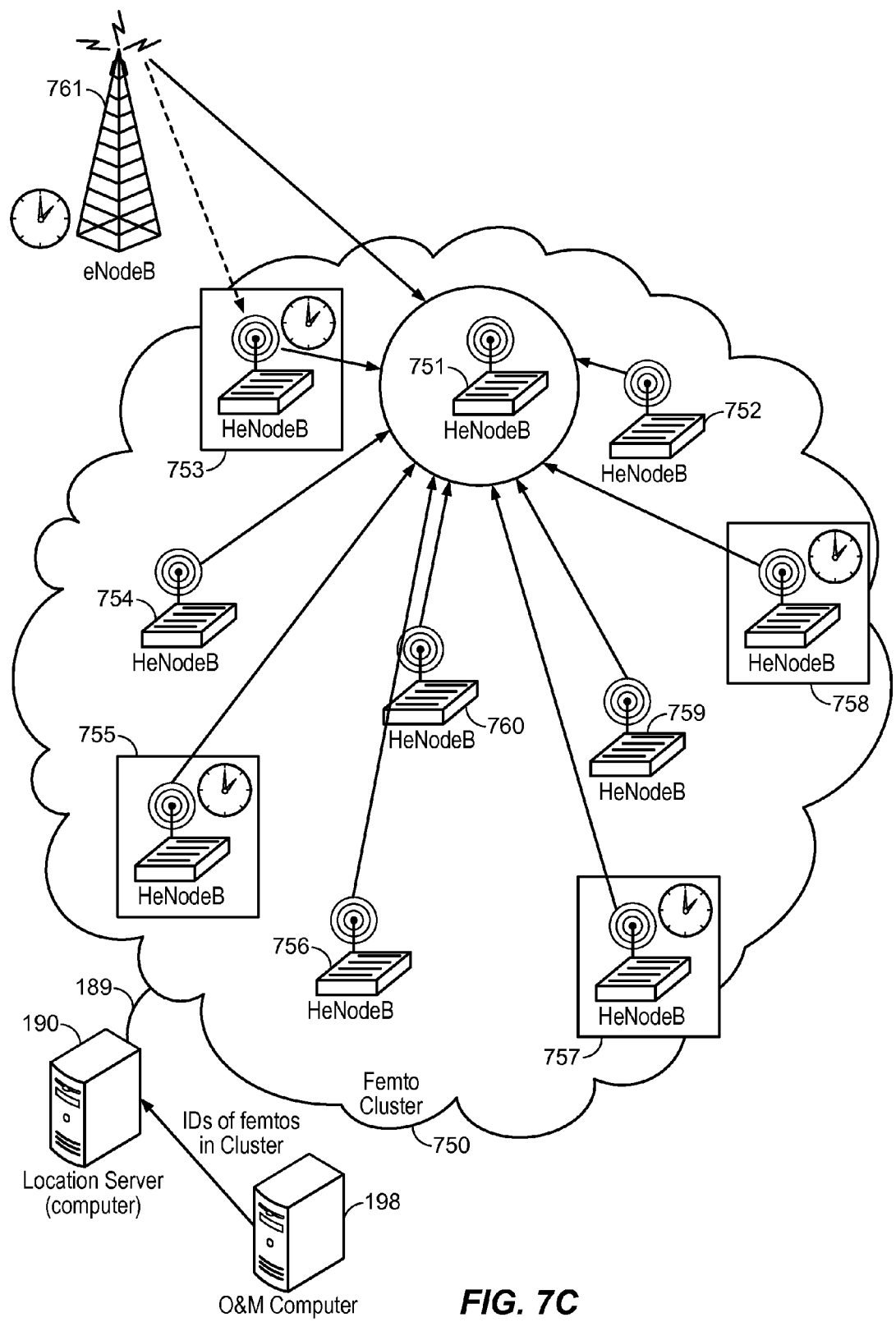

In an act 702, computer 190 transmits a measurement request, in the form of a command to a new femto illustrated in FIG. 7C as femto 751 that is located at an unknown position. Femto 751 is identified by an index i in a femto listing received in the measurement request (from O&M computer 198). Then, in act 703, femto 751 (which happens to be femto i in a current iteration) receives the measurement request, and goes to act 704. In act 704, femto 751 turns off its downlink transmission and measures TOAs and RSS of as many signals as possible, as illustrated in FIG. 7C. Note that in FIG. 7C, all femtos 752-760 transmit pilot signals that can be sensed by all of femtos 751-760, but to improve legibility of FIG. 7C only the pilot signals sensed by femto 751 are shown. Thereafter, in act 705, this femto 751 reports, via backhaul link 189 (FIG. 7C), to the location server computer 190 the measurements as well as identifiers of transceivers 752-761 whose signals were measured. Next, using the measurements in an act 706, location server computer 190 identifies that for femto 751, its strongest neighbor is femto j (e.g. femto 752 in FIG. 7B).

The strongest neighbor is identified in some aspects by sorting on RSS measurements and identifying whichever femto is at the top (in RSS measurement). For example, femto 751 may make the following RSS measurements from neighbor femtos: −101 dBm from femto 753, −111 dBm from femto 754, −115 dBm from femto 755, −120 dBm from femto 756, −95 dBm from femto 760, −131 dBm from femto 757, −119 dBm from femto 759, −101 dBm from femto 758, −90 dBm from femto 752. By searching for the maximum value of the RSS measurements in this list, the value −90 dBm is identified as the maximum value, which corresponds to measured femto 752. Therefore, femto 752 provides the strongest neighbor signal for femto 751 in this example.

Additionally, location server computer 190 now (in act 706) sends requests (in the form of commands) to both femto 751 and its strongest neighbor femto 752. In some aspects of the described embodiments, both femtos 751 and 752 are sent measurement requests, while in other aspects of the described embodiments only femto 751 is sent a measurement request while femto 752 is sent a silence request (e.g. identifying therein a duration of silence). In some aspects of the described embodiments, the silence request is sent before the measurement request, so that femto 752 is silent when femto 751 generates its measurements although in certain aspects of the described embodiments both requests are sent simultaneously. Note, that in some aspects of the described embodiments a measurement request implies also (and therefore operates as) a silence request, because while a femto is making its measurements its downlink transmission is turned off (i.e., the femto does not transmit the pilot signal and is therefore silent during its own measurement period).

Figure 7D:
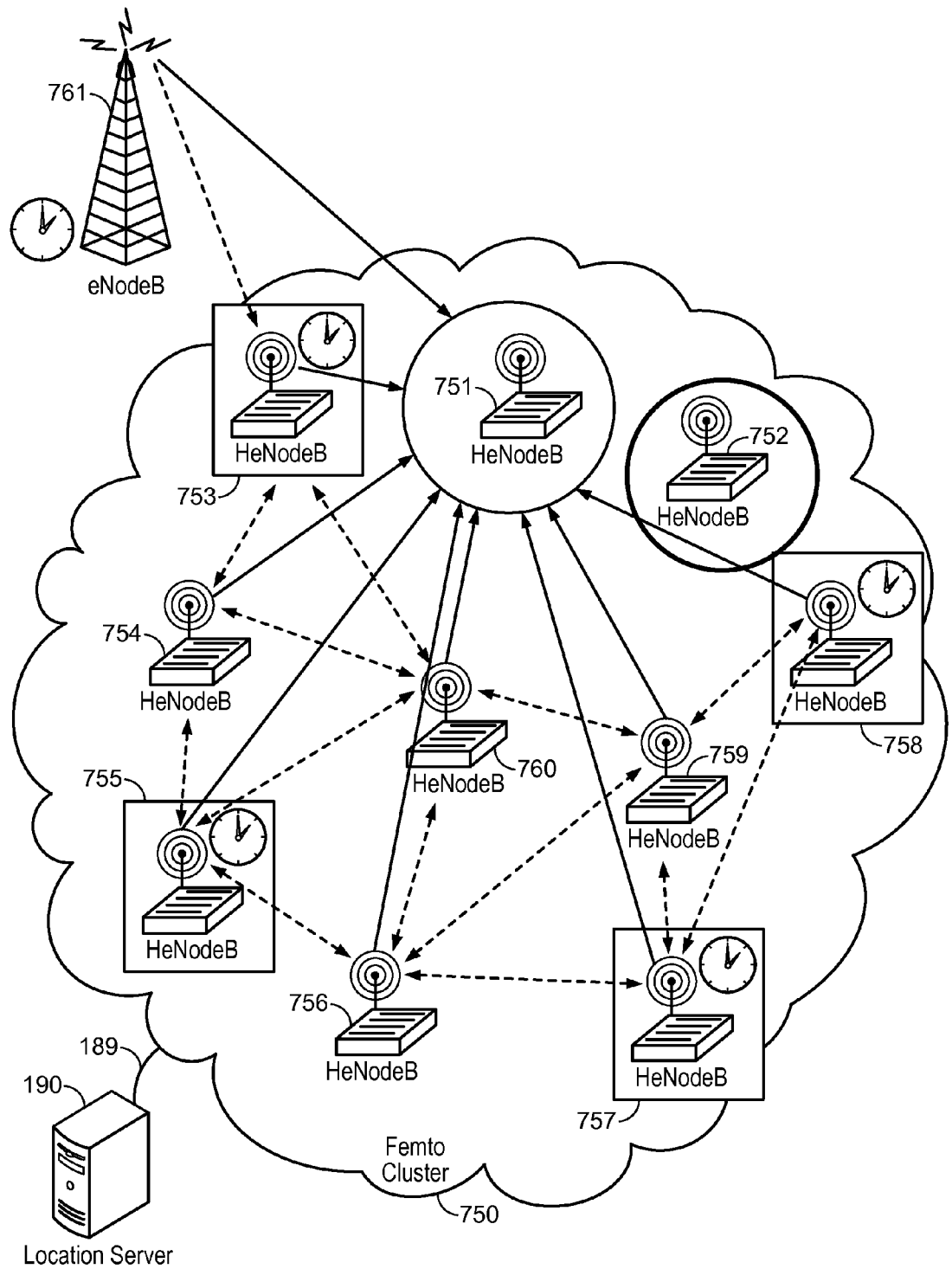

Thereafter, in act 707, femto 751 once again turns off its downlink transmission and once again measures TOAs of as many neighbor femtos as possible. During act 707, femto 752 performs an act 708 to turn off its own downlink transmission (thereby to silence itself) as illustrated in FIG. 7D, in response to the message (e.g. a silence request and/or a measurement request) from location server computer 190. Therefore, in act 707, femto 751 does not receive (and does not measure) any wireless signal from its strongest neighbor femto 752. Hence, femto 751 generates another set of measurements in act 707 while its strongest neighbor femto 752 is silent (over the air). In many aspects of the described embodiments, this second set of measurements (made in act 707) includes (relative to the first set of measurements in act 704) more neighbor femto measurements or better quality of the measurements, because the strong interferer (femto 752 in this example) is not transmitting (in act 708), which allows femto 751 to measure one or more neighbor femtos that are farther away than the farthest femto measured in act 704. For example, in act 704 assume that a signal from femto 758 was too low to be measured by femto 751 due to a strong signal from femto 752, then such a measurement (of the signal from femto 758) becomes possible (and is made) in act 707 during silence by femto 752 (in act 708). Next, in act 709, femto 751 transmits to location server computer 190 via the backhaul link 189, the TOAs and identifiers of the neighbor femtos from which signals were measured.

Figure 7E:
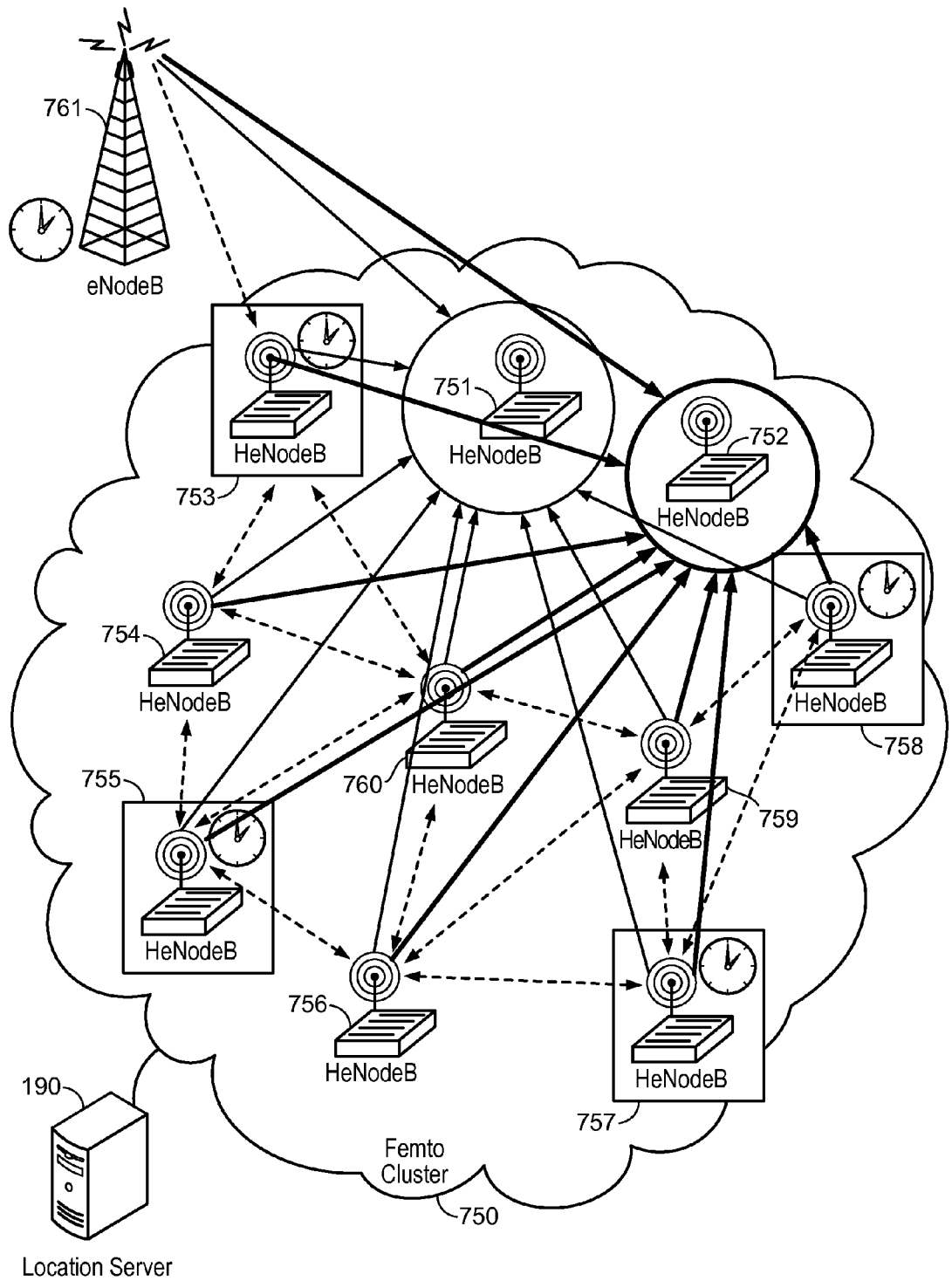

In act 708, if a measurement request was received (instead of a silence only request) femto 752 performs its own TOA measurements as illustrated in FIG. 7E (after turning off its own downlink transmission) of as many wireless signals as it receives (but not for femto 751 which as noted above has turned off its downlink transmission in act 707). Since femto 752 was identified to be a strong interferer to femto 751, femto 751 is usually also a strong interferer for femto 752 in some aspects of the described embodiments. Therefore, when femto 752 performs the TOA measurements, it can do so without receiving the strong interference from femto 751, which also allows femto 752 to receive more (weak) neighbor femto signals to perform the TOA measurements. Then, in act 710, femto 752 may report to computer 190, the measurements it has made and the identifiers of transceivers from which the wireless signals were received.

Figure 7F:
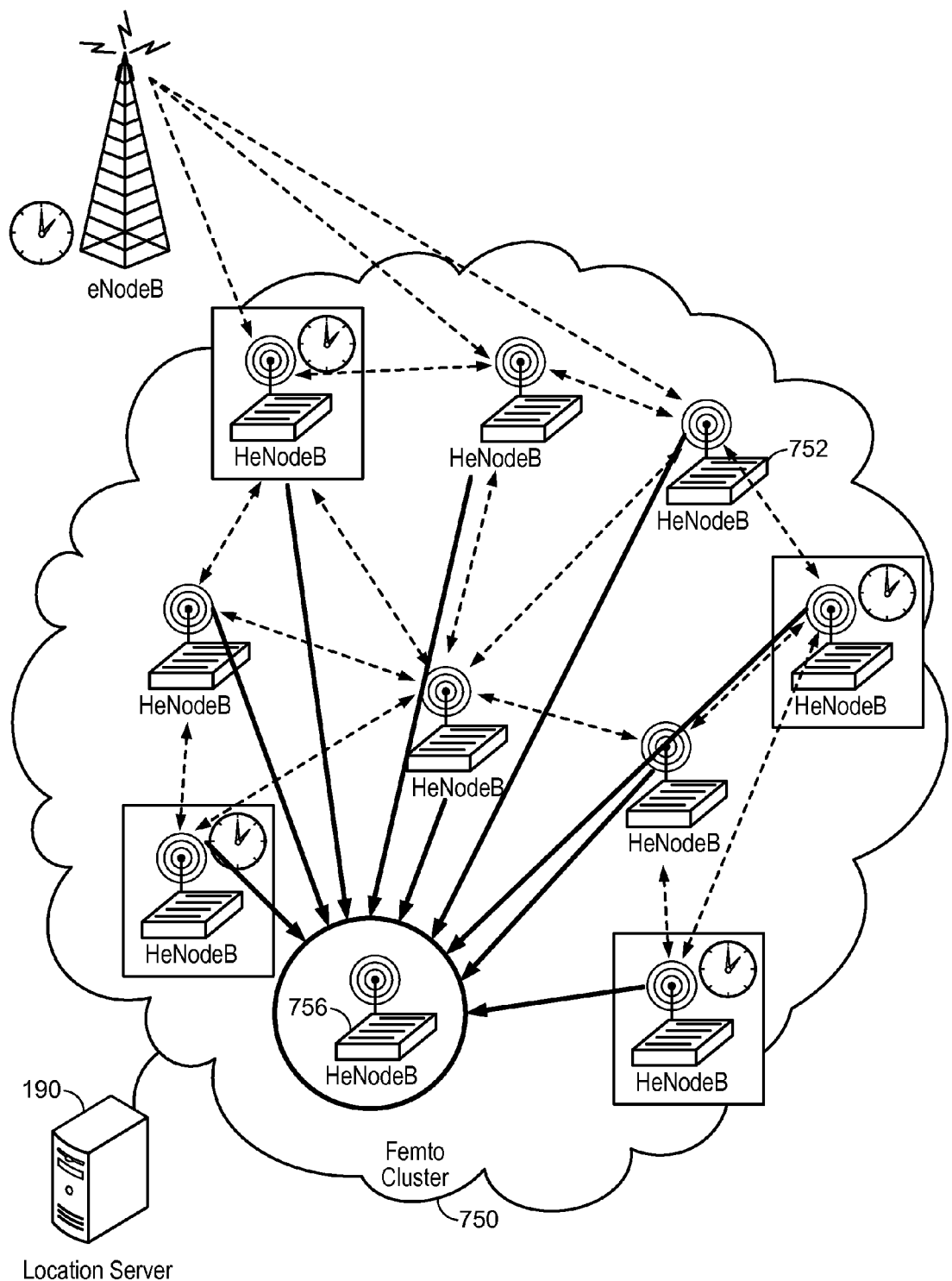

Next, in act 711, computer 190 checks if it's done with (i.e. finished) receiving measurements from all transceivers identified in the listing received in the request (from O&M computer 198). If not, then computer 190 increments the loop counter i. At this stage, if the new loop counter i identifies a transceiver for which measurements have already been received (e.g. if the new loop counter i identifies the strongest neighbor femto 752), then this counter i is again incremented until a wireless transceiver (e.g. femto 756 in FIG. 7F) is identified for which measurements have not yet been obtained. Then computer 190 goes to act 702 to repeat the process (described above). In some aspects of the described embodiments, the loop counter i at step 712 is always increased, even if the loop counter i identifies femto 752 in this example which has already reported measurements. Therefore, in some aspects of the described embodiments, each femto receives a measurement request twice, i.e., with all neighbor femtos transmitting, and with the strongest interferer (i.e. strongest neighbor) silent, and hence each femto correspondingly makes two sets of measurements.

Note that the just-described process is optionally repeated in certain aspects of the described embodiments, by silencing a next-to-strongest interferer in addition to silencing the strongest interferer of a current femto thereby to obtain a third set of measurements. The third set of measurements may be useful when a process of solving simultaneous equations as described above fails to converge (see FIG. 7A, "NO" branch in act 714). Specifically, in these aspects of the described embodiments, computer 190 identifies a next-to-strongest interferer k for having the maximum RSS at current femto i based on measurements made by current femto i while its strongest intereferer j is silent. Thereafter, computer 190 performs act 706 once again (as per branch 719) this time sending requests to all three femtos i, j and k, and therefore femto i makes its third set of measurements while the downlink transmissions of femtos j and k are turned off.

In performing acts 711 and 712, if measurements have been received from all femtos in the listing, then computer 190 goes to act 713 and solves a set of simultaneous equations as described elsewhere herein, followed by checking for convergence in act 714. If convergence is found in act 714, then computer 190 stores the current values of positions and time bases of non-reference transceivers in memory in act 715 for future use, as described herein. If the answer in act 714 is no, then in act 716, computer 190 checks if a retry limit is reached and if so reports failure in act 717 but if not reached performs act 718. As noted above, in an act 718, computer 190 drops or adds femtos to the listing thereby to change the cluster, and then returns to act 701.

Figure 7G:
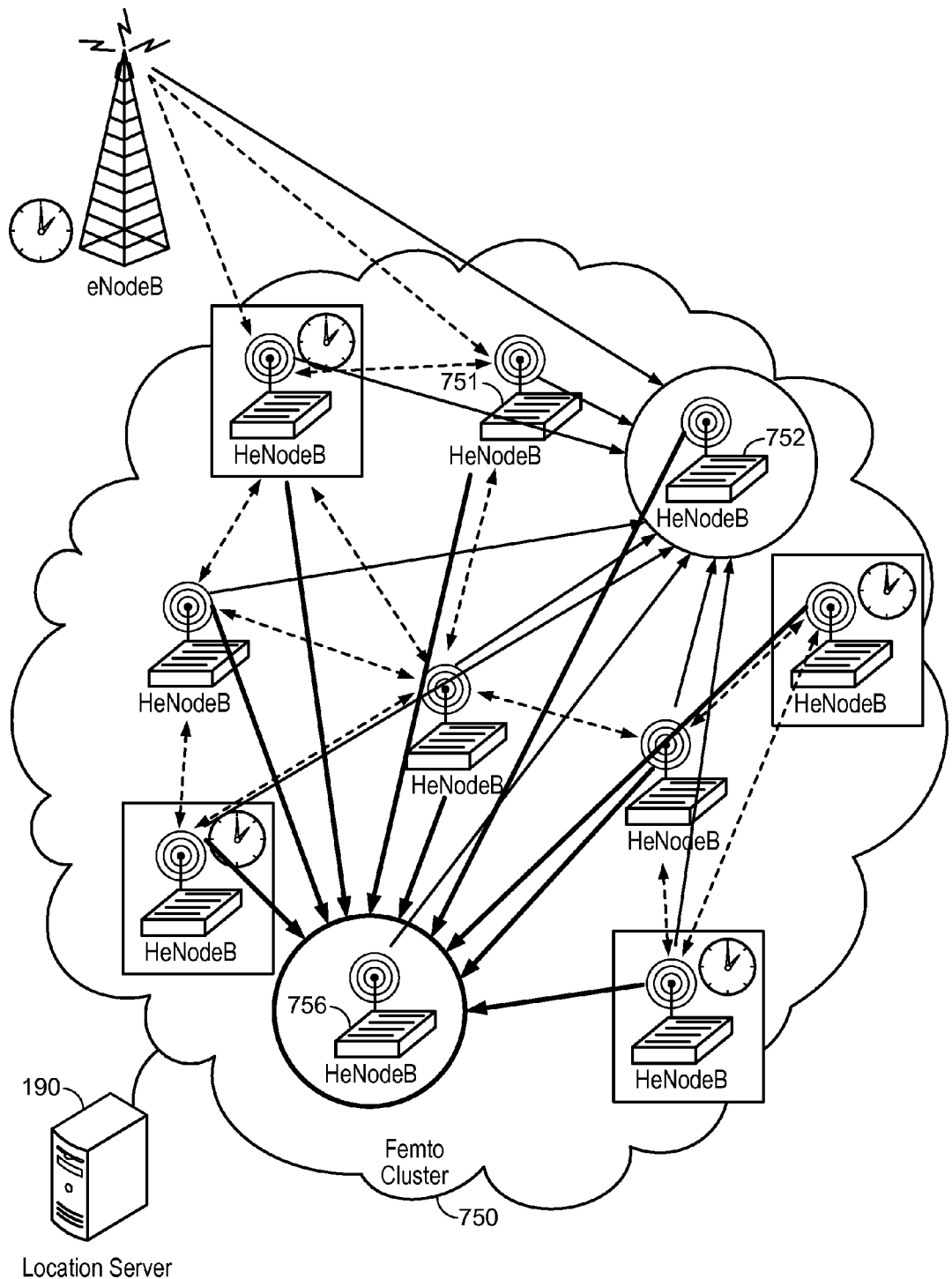

FIG. 7G illustrates a situation wherein femto 752 happens to be the strongest neighbor for femto 756, and therefore femto 752 has been requested (by a command) to perform measurements simultaneously with femto 756. Therefore, femto 752 makes another set of measurements at this stage, which differs from a set of measurements made earlier as described above, due to different femtos being silenced during the two sets of measurements. Specifically, femto 752 initially makes measurements simultaneously with femto 751, and this first set of measurements includes a measurement of a signal from femto 756. Subsequently, femto 752 makes additional measurements simultaneously with femto 756, and this additional set of measurements includes a measurement of a signal from femto 751. Therefore, both sets of measurements are used in computer 190, to solve the set of simultaneous equations, in some aspects of the described embodiments.

In some aspects of the described embodiments, although TOAs are described as being measured in acts 704 and 707 in other aspects of the described embodiments TDOAs are measured in these acts 704 and 707 as described herein. Moreover, although RSS is measured and reported in acts 704 and 705 by femto i, depending on the aspect of the described embodiments RSS may or may not be measured and reported in acts 707 and 709 by femto i. Furthermore, although only the strongest neighbor femto 752 is described as being silenced, in other aspects of the described embodiments two or more of the strongest neighbors are silenced.

In some aspects of the described embodiments described below, a cluster in a network has m reference femtos and n non-reference femtos. The true positions of the reference femtos are known and denoted by $z_R=\{z_{R1}, z_{R2}, \ldots, z_{Ri}, \ldots, z_{Rm}\}$, where $z_{Ri}=[x_{Ri}, y_{Ri}]^T$ in two dimensional (2D) Cartesian coordinate system. The unknown true positions of the non-reference femtos are denoted by $z_B=\{z_{B1}, z_{B2}, \ldots, z_{Bi}, \ldots, z_{Bn}\}$, where $z_{Bi}=[x_{Bi}, y_{Bi}]^T$. A solution of the navigation problem generally returns estimates of the coordinates of the non-reference femtos. Although only two dimensions (i.e. x and y coordinates) are described below for some aspects of the described embodiments, other aspects of the described embodiments use positions in three dimensions (i.e. x, y and z coordinates).

In a network with a total of m+n femtos, the maximum likelihood (ML) estimate $\hat{z}_B$ of the unknown positions $z_B$ is generally given as:

$$\hat{z}_B = \underset{z_i}{\operatorname{argmin}} \sum_{i=1}^{m+n} \sum_{\substack{j \in C(i) \\ i<j}} [d(\hat{z}_i, \hat{z}_j) - d(z_i, z_j)]^2 \quad (1)$$

where
$\hat{z}_B = \{\hat{z}_{B1}, \hat{z}_{B2}, \ldots, \hat{z}_{Bi}, \ldots, \hat{z}_{Bn}\}$ are the estimates of the unknown position coordinates,
$d(z_i, z_j) = d_{i,j}$ is a function which returns the true range (Euclidean distance) between two femtos with true positions given by $z_i$ and $z_j$,
$d(\hat{z}_i, \hat{z}_j) = r_{i,j}$ is an estimate of the actual range between the two femtos, computed using their position estimates $\hat{z}_i$ and $\hat{z}_j$ and C(i) is the set of those femtos that are "connected" to femto i (i.e., can measure signals (TOAs) from femto i).

In a synchronous network, all femtos including those with unknown positions transmit at the same time. Hence, the ML estimator in equation (1) above can be reformulated for the case where time difference of arrival (TDOA) measurements are available as given below:

$$\hat{z}_B = \underset{z_B}{\operatorname{argmin}} \sum_{i=1}^{n} \sum_{\substack{j,k \in C(i) \\ j \ne k}} [(r_{i,j} - r_{i,k}) - (d_{i,j} - d_{i,k})]^2. \quad (2)$$

In case the network is asynchronous, the ML estimator in equation (2) above can be extended to jointly estimate both positions and transmit times using TDOA measurements as given below:

$$\{\hat{z}_B, \hat{t}_B\} = \quad (3)$$
$$\underset{\{z_B, t_B\}}{\operatorname{argmin}} \sum_{i=1}^{n} \sum_{\substack{j,k \in C(i) \\ j \ne k}} [((r_{i,j} - r_{i,k}) + (\hat{t}_j - \hat{t}_k)) - ((d_{i,j} - d_{i,k}) + (t_j - t_k))]^2$$

where $t_B = \{t_{B1}, t_{B2}, \ldots, t_{Bi}, \ldots, t_{Bn}\}$ and $\hat{t}_B = \{\hat{t}_{B1}, \hat{t}_{B2}, \ldots, \hat{t}_{Bi}, \ldots, \hat{t}_{Bn}\}$ are the true and estimated values of transmit times (e.g. expressed in meters) at the non-reference femtos, respectively.

In one or more ML formulations given above, if a femto i is a reference femto with already known position, then $\hat{z}_i = z_i$. The ML estimator in equation (2) above tries to find unknown coordinates of all non-reference femtos such that the sum over all error terms (i.e., the difference between estimated and true range differences) is minimized. If an error-free environment is assumed, a solution of this ML formulation will return the true positions $z_B$. As the range estimates are not error-free in the real world, the navigation solution returns estimates of the true coordinates $z_B$ denoted by $\hat{z}_B = \{\hat{z}_{B1}, \hat{z}_{B2}, \ldots, \hat{z}_{Bi}, \ldots, \hat{z}_{BN}\}$, where $\hat{z}_B = [\hat{x}_{Bi}, \hat{y}_{Bi}]^T$. The ML estimator in (3) estimates transmit times at all non-reference femtos in addition to the position coordinates in an asynchronous network. The true TOA $\tau_{i,j}$ of a signal transmitted by a femto j at time $t_j$ at another femto i is given by $$\tau_{i,j} = t_j + d_{i,j}/c, \quad (4)$$

where the true range $d_{i,j}$ between the two femtos is $$d_{i,j} = \sqrt{(x_i - x_j)^2 + (y_i - y_j)^2} \quad (5)$$

and c is the speed of light.

As a femto can only estimate the TOA of a signal from another femto, this estimate $\hat{\tau}_{i,j}$ differs from the true value by a random error term as given by $$\hat{\tau}_{i,j} = \tau_{i,j} + \epsilon_{i,j}. \quad (6)$$

The error term $\epsilon_{i,j}$ denotes the sum of errors due to all error sources, e.g., receiver noise, interference, multipath, non line-of-sight propagation, internal (local) clock, imperfect a priori knowledge of transmit time and coordinates of the transmitting femto (if it is a reference femto with known position), etc.

If the transmitting femto is a reference femto Rj, the TOA estimate $\hat{\tau}_{Bi,Rj}$ of the signal received at a non-reference femto Bi can be written in terms of the estimated coordinates $[\hat{x}_{Bi}, \hat{y}_{Bi}]$ of the non-reference femto as $$\hat{\tau}_{Bi,Rj} = t_{Rj} + \sqrt{(\hat{x}_{Bi} - x_{Rj})^2 + (\hat{y}_{Bi} - y_{Rj})^2}/c$$

Similarly, the equation for the TOA estimate $\hat{\tau}_{Bi,Bj}$ of the signal from a non-reference femto Bj at non-reference femto Bi can also be written in terms of unknown coordinates of two femtos as given below:

$$\hat{\tau}_{Bi,Bj} = t_{Bj} + \sqrt{(\hat{x}_{Bi} - \hat{x}_{Bj})^2 + (\hat{y}_{Bi} - \hat{y}_{Bj})^2}/c.$$

In some aspects of the described embodiments, TDOA estimates are obtained by subtracting the TOA estimate for one of the transmitting femtos from all other available TOA estimates. Another way to obtain TDOA estimates is to directly estimate differences in TOAs between two transmitting femtos by cross-correlating their respective transmitted signals at the measuring femto.

Since the TDOA measurements are also made from received signals which are transmitted from non-reference femtos (i.e., femtos at unknown locations and with unknown transmit times), the TDOA measurements do not contain absolute location information, because both, the location of the measuring transceiver and the location of the transmitting transceiver is unknown. Therefore, the TDOA measurements are termed Relative Time Difference Of Arrival (RTDOA) in the following.

The equation for RTDOA estimated at a non-reference femto i, which receives signals from another non-reference femto j and a reference femto k is given below:

$$RT\hat{D}OA_{i(j,k)} = \hat{\tau}_{i,j} - \hat{\tau}_{i,k} \quad (7)$$
$$= GTD_{j,k} + RTD_{j,k} + (\varepsilon_{i,j} - \varepsilon_{i,k})$$

The equation above consists of two non-random difference terms; the geometric time difference (GTD) due to the difference in ranges of femto i to femtos j and k and relative time difference (RTD) due to different transmission times at the two femtos in an unsynchronized network. The GTD and RTD terms in equation (7) can be expanded as given below:

$$GTD_{j,k} = \sqrt{(x_i - x_j)^2 + (y_i - y_j)^2}/c - \sqrt{(x_i - x_k)^2 + (y_i - y_k)^2}/c. \quad (8)$$

$$RTD_{j,k} = t_j - t_k. \quad (9)$$

Similar to the RTDOA measurements, the GTD above does not include absolute location information, because both, the location of the measuring transceiver and the location of the transmitting transceiver is unknown, and the GTD can therefore not be used in a conventional manner to obain the location of the non-reference femtos.

If all femtos in the network are synchronized to a common time base, the RTDs in RTDOA equations are zero as all femtos transmit at the same time. On the other hand, the non-zero RTDs need to be estimated in an asynchronous network.

The conventional way of measuring RTDs between pairs of transmitting femtos is to install additional devices called location measurement units (LMUs) at fixed and known locations. The LMUs are used to estimate RTDs between transmitters with known locations, e.g., macro base stations in a cellular deployment. However, as mentioned above, this approach may not be applicable when the location of the transmitters (i.e., femtos) is unknown.

The RTDOA estimate in equation (7) can be corrected by subtracting the RTD term if it is known by some means:

$$\widehat{RTDOA}_{j,k} - RTD_{j,k} = GTD_{j,k} + (\epsilon_{i,j} - \epsilon_{i,k}). \tag{10}$$

Several aspects of this described embodiments focus on positioning femtos in an asynchronous femto network. It's assumed that the transmit times at all reference femtos (with known locations) are already known. Accordingly, in various aspects of this described embodiments, a computer 190 is programmed to solve the problem of joint estimation of unknown coordinates and transmit times of n non-reference femtos with m reference femtos in the network. The set of non-random but unknown parameters to be estimated is $\theta_B = \{z_B, t_B\}$, where $t_B = \{t_{B1}, t_{B2}, \ldots, t_{Bi}, \ldots, t_{Bn}\}$.

Putting $GTD_{j,k} + RTD_{j,k} = f(x_i, y_i, x_j, y_j, x_k, y_k, t_j, t_k)$ and, $\widehat{RTDOA}_{i(j,k)} = r_{i(j,k)}$ equation (7) can be rewritten in a general form as given below:

$$r_{i(j,k)} = f(x_i, y_i, x_j, y_j, x_k, y_k, T_j, T_k) + (\epsilon_{i,k} - \epsilon_{i,j}). \tag{11}$$

If it's assumed that the femto network is fully connected (i.e., all femtos can receive signals from all other femtos for performing RTDOA measurements), then mn range measurements between reference and non-reference femtos and n(n−1)/2 range measurements between non-reference femtos themselves are obtained. Let us define the connectivity between the reference and non-reference femtos by an m×n binary matrix $C_r$ as given below:

$$C_r = \begin{bmatrix} c_{11} & c_{12} & \ldots & c_{1n} \\ c_{21} & c_{22} & \ldots & c_{2n} \\ & & \vdots & \\ c_{m1} & c_{m2} & \ldots & c_{mn} \end{bmatrix}$$

where $C_{ij}=1$ if a reference femto i is connected to a non-reference femto j (i.e., femto i measures the TOA from femto j). Otherwise, $C_{ij}=0$.

The part of the network considering only n non-reference femtos can be represented by a connected graph where a vertex represents a non-reference femto and an undirected edge between two vertices represents connectivity between the corresponding femtos. The connectivity between n non-reference femtos can then be represented by a binary symmetric matrix $C_b$ (adjacency matrix of the connected graph) as given below:

$$C_b = \begin{bmatrix} 0 & c_{12} & \ldots & c_{1n} \\ c_{21} & 0 & \ldots & c_{2n} \\ & & \vdots & \\ c_{n1} & c_{n2} & \ldots & 0 \end{bmatrix},$$

where $C_{ij}=C_{ji}=1$ if the non-reference femtos i and j are connected with each other (an undirected edge exists between corresponding vertices). Otherwise, $C_{ij}=C_{ji}=0$. In case of limited connectivity between non-reference femtos, some of the non-diagonal entries of $C_b$ would be zero. The matrices $C_r$ and $C_b$ that represent connectivity between femtos help us concisely represent the set of available range equations in a connected network. In a realistic scenario, connectivity between all pairs of femtos in a network cannot be ensured. This limited connectivity is taken into account by setting the corresponding entries of the respective matrices to zero. The number of available connections is denoted by N. A fully connected network gives the maximum possible number of connections between m+n femtos, i.e., N=mn+n(n−1)/2.

If all available RTDOA measurements are grouped, the set of equations can be compactly written in matrix notation as given below:

$$r = f(z_i, z_j, z_k, t_j, t_k) + n, \tag{12}$$

where r is a column vector containing (N−1) RTDOA measurements and n is a column vector of length (N−1) containing differences of errors in respective TOA measurements. The indices i, j and k denote any three femtos involved in a RTDOA measurement, with the measurement taken at femto i.

The set of equations in (12) can be also be written in terms of difference operators as given below:

$$r = Td/c + T_t t + T\epsilon, \tag{13}$$

where the matrix T is a full-rank (N−1)×N difference operator with its each row containing (N−1) zeros, a −1 and a 1. Each row of T defines which TOA measurement is subtracted from which to get an RTDOA equation. The matrix $T_t$ is also a full-rank (N−1)×(m+n) matrix with its each row containing (m+n−2) zeros, a −1 and a 1. The column vector d of length N gives true ranges between pairs of connected femtos and the column vector t of length (m+n) contains transmit times at all reference and non-reference femtos in the network.

Any single element (component function) of the vector-function $f(z_i, z_j, z_k, t_j, t_k)$ can be expanded in terms of the variables it depends on as given below:

$$f_i(z_i, z_j, z_k, t_j, t_k) = \sqrt{(x_i - x_j)^2 + (y_i - y_j)^2}/c - \sqrt{(x_i - x_k)^2 + (y_i - y_k)^2}/c + (t_j - t_k)$$

The ML estimator in (3) can be re-formulated as one which tries to find all unknown parameters $\theta_B$ such that a cost function is minimized, as given below $$\hat{\theta}_B = \{\hat{z}_B, \hat{t}_B\} = \underset{\{z_B, t_B\}}{\operatorname{argmin}} [r - f(\theta_B)]^T N^{-1} [r - f(\theta_B)], \tag{14}$$

where $f(z_i, z_j, z_k, t_j, t_k) = f(\theta_B)$ and N is the covariance matrix of noises in the RTDOA estimates.

$$N = E\{(n - E\{n\})(n - E\{n\})^T\} \tag{15}$$
$$= TN_\epsilon T^T,$$

where $N_\epsilon$ is an N×N diagonal covariance matrix with the variances of range estimates $\sigma_i^2$ (i=1, ..., N) on the main diagonal.

The elements of covariance matrix N act as weighting coefficients in the minimization of the cost function in equation (14). In case the covariance matrix $N_\epsilon$ can not be estimated (e.g., due to insufficient number of measurements over time), it can be set equal to an identity matrix of the same size, in certain aspects of the present described embodiments.

As shown above, $f(\theta_B)$ is a non-linear vector-function in the position coordinates of three femtos, i.e., one measuring and two transmitting femtos. In order to minimize the cost function in equation (14), $f(\theta_B)$ can be linearized by Taylor series expansion around an initial estimate $\overline{\theta}_B$ and dropping second and higher order terms. It is assumed that the initial estimates $\overline{\theta}_B$ are close to the actual positions and transmit times $\theta_B$, such that the error due to linear approximation is small.

$$f(\theta_B) \approx f(\overline{\theta}_B) + G \cdot (\theta_B - \overline{\theta}_B), \tag{16}$$

where G is the Jacobian matrix of $f(\theta_B)$ containing first order derivates of all component-functions evaluated at $\overline{\theta}_B$.

As an example, let us consider a row of G that corresponds to the RTDOA equation at non-reference femto Bi which receives signals from another non-reference femto Bj and a reference femto Rk (TOA difference for links Bj→Bi and Rk→Bi), as given below:

$$G_{Bi(Bj,Rk)} = \begin{bmatrix} \frac{\partial}{\partial x_{B1}} f_{Bi(Bj,Rk)} \Big|_{\theta_B = \overline{\theta}_B} \\ \frac{\partial}{\partial y_{B1}} f_{Bi(Bj,Rk)} \Big|_{\theta_B = \overline{\theta}_B} \\ \vdots \\ \frac{\partial}{\partial x_{Bn}} f_{Bi(Bj,Rk)} \Big|_{\theta_B = \overline{\theta}_B} \\ \frac{\partial}{\partial y_{Bn}} f_{Bi(Bj,Rk)} \Big|_{\theta_B = \overline{\theta}_B} \\ \frac{\partial}{\partial t_{B1}} f_{Bi(Bj,Rk)} \Big|_{\theta_B = \overline{\theta}_B} \\ \vdots \\ \frac{\partial}{\partial t_{Bn}} f_{Bi(Bj,Rk)} \Big|_{\theta_B = \overline{\theta}_B} \end{bmatrix}.$$

Since $f_{Bi(Bj,Rk)}$ only depends on $z_{Bi}$, $z_{Bj}$, $t_{Bi}$ and $t_{Bj}$, all except the entries in row $G_{Bi(Bj,Rk)}$ corresponding to the mentioned variables are zero. In other words, $f_{Bi(Bj,Rk)}$ is a function of the set of variables $\{x_{Bi}, y_{Bi}, x_{Bj}, y_{Bj}, t_{Bi}, t_{Bj}\}$. The partial derivatives with respect to all other $x_{Bl}, y_{Bl}, t_{Bl}$ (l≠i, l≠j) can simply be set to zero in $G_{Bi(Bj,Rk)}$. The non-zero entries of $G_{(Bi(Bj,Rk))}$ can be expanded in the dependent variables as given below:

$$\frac{\partial}{\partial x_{Bi}} f_{Bi(Bj,Rk)} \Big|_{\theta_B = \overline{\theta}_B} = (\overline{x}_{Bi} - \overline{x}_{Bj}) / \overline{d}_{Bi,Bj} - (\overline{x}_{Bi} - \overline{x}_{Rk}) / \overline{d}_{Bi,Rk}$$

$$\frac{\partial}{\partial y_{Bi}} f_{Bi(Bj,Rk)} \Big|_{\theta_B = \overline{\theta}_B} = (\overline{y}_{Bi} - \overline{y}_{Bj}) / \overline{d}_{Bi,Bj} - (\overline{y}_{Bi} - \overline{y}_{Rk}) / \overline{d}_{Bi,Rk}$$

$$\frac{\partial}{\partial x_{Bj}} f_{Bi(Bj,Rk)} \Big|_{\theta_B = \overline{\theta}_B} = -(\overline{x}_{Bi} - \overline{x}_{Bj}) / \overline{d}_{Bi,Bj}$$

$$\frac{\partial}{\partial y_{Bj}} f_{Bi(Bj,Rk)} \Big|_{\theta_B = \overline{\theta}_B} = -(\overline{y}_{Bi} - \overline{y}_{Bj}) / \overline{d}_{Bi,Bj}$$

$$\frac{\partial}{\partial t_{Bj}} f_{Bi(Bj,Rk)} \Big|_{\theta_B = \overline{\theta}_B} = 1$$

Simplifying equation (14) after substituting linear expansion of $f(\theta_B)$ from (16), the ML estimate can be written as given below [2]:

$$\hat{\theta}_B = \overline{\theta}_B + (G^T N^{-1} G)^{-1} G^T N^{-1} (r - f(\overline{\theta}_B)). \tag{17}$$

The estimates of desired position and transmit times for all non-reference femtos $\hat{\theta}_B$ are given by equation (17). The solution can be obtained by solving (17) iteratively. For any starting initial estimate $\overline{\theta}_B$, the parameters $\hat{\theta}_B$ are estimated. In the next iteration, the parameter estimates $\hat{\theta}_B$ are computed again after putting $\overline{\theta}_B$ equal to the parameter estimates obtained in the previous iteration. The iterations stop (i.e., the solution converges) when the change in estimated parameter values between two iterations is almost zero or smaller than some tolerance threshold.

In some aspects of the described embodiments, the matrix N in equation (17) is an identity matrix (e.g., in case all RTDOA measurement errors are the same, or simply assumed to be the same), and equation (17) simplifies to:

$$\hat{\theta}_B = \overline{\theta}_B + (G^T G)^{-1} G^T (r - f(\overline{\theta}_B))$$

The total number of unknown parameters that to be estimated is 3n (i.e., (x, y) coordinates and transmit times of n non-reference femtos). For the system of equations in (12) to have a unique solution (i.e., to not be underdetermined), the number of independent RTDOA measurements should be equal to or larger than the number of unknown variables.

Consider the simplified scenario where the RTDs are known (without loss of generality, the RTDs are known to be zero). In several aspects of the described embodiments, this would be the case if the femto locations and transmit times are determined in a first step as described above, and the so obtained femto transmit times are used to adjust the local clock of the femtos, so that the RTDs are zero. In that case, the RTDOA estimate in (7) can then be re-written as $$r_{i(j,k)} = RT\hat{D}OA_{i(j,k)} \tag{18}$$
$$= GTD_{j,k} + (\varepsilon_{i,k} - \varepsilon_{i,j})$$

The set of all available RTDOA estimates can be compactly written in matrix notation as $$r = f(z_i, z_j, z_k) + n, \tag{19}$$

where $$n = T\epsilon. \tag{20}$$

The ML estimator in (2) is equivalent to estimating unknown x and y coordinates of all non-reference femtos $z_B$ by minimizing a weighted cost function as given below:

$$\hat{z}_B = \underset{z_B}{\operatorname{argmin}}[r - f(z_B)]^T N^{-1}[r - f(z_B)], \tag{21}$$

where $f(z_i, z_j, z_k) = f(z_B)$ and N is the covariance matrix of noises in the RTDOA estimates as given by (15).

A solution to the ML estimation problem in equation (22) can also be obtained by gradient descent minimization (using Taylor series expansion) as explained before. In case the network is fully synchronized, the RTDs are zero and the noise covariance matrix N is given by (15).

The reduced number of unknown parameters to be estimated now is 2n (i.e., the x and y coordinates of n non-reference femtos). Again, the number of independent RTDOA measurements should at least be equal to the number of unknown variables to get a unique solution.

Therefore, in a second step only the locations of the femtos are solved, assuming the RTDs have been estimated in the first step and are used to synchronize the femto transmit times so that the RTDs are zero.

Figure 3A:
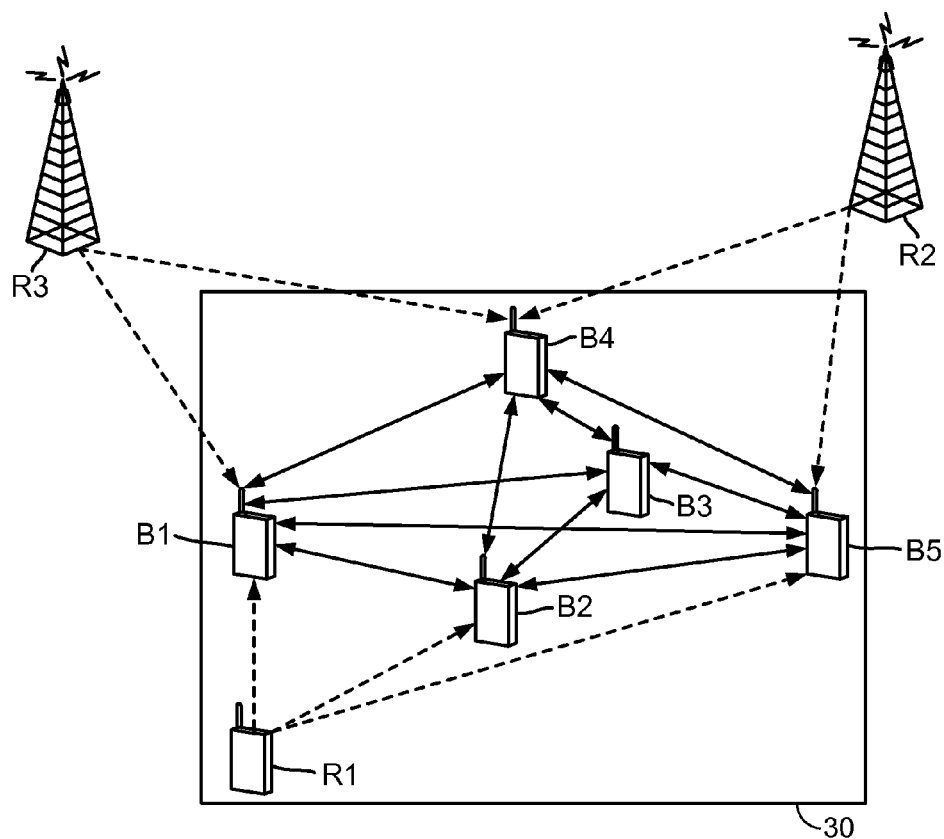
FIG. 3A illustrates, in a high-level block diagram similar to FIGS. 1A-1E, another system of wireless transceivers B1,B2, B3, B4, B5, R1, R2 and R3, operated as per the method of FIG. 2, in some aspects of the described embodiments.
Figure 3B:
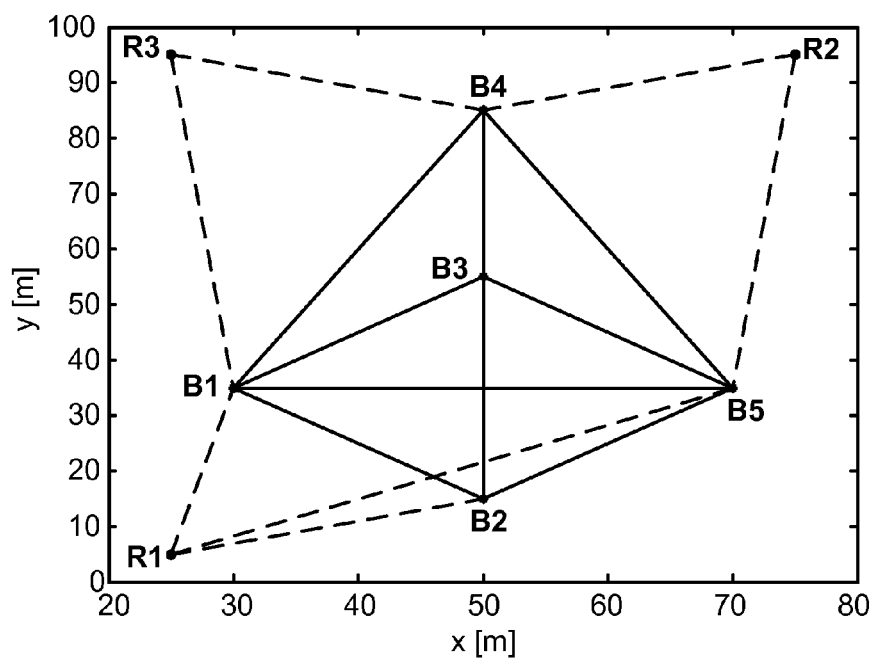
FIG. 3B illustrates, in a graph, wireless connectivity between wireless transceivers B1,B2, B3, B4, B5, R1, R2 and R3 in the system of FIG. 3A.

As an example illustrating the performance of the method described above, let us consider a cellular network layout with three reference and five non-reference transceivers as shown in FIG. 3A. A reference transceiver could either be a macro or femto base station. Macro base stations are deployed after careful network planning and have fixed and known position coordinates and can be synchronized using e.g., GPS. A femto placed, e.g., close to a window, can find its position using, e.g., a built-in Assisted GPS/GNSS receiver. The non-reference devices (femtos) are placed deep indoors such that they do not have reception from enough sources (GPS/GNSS satellites or macro base stations) to estimate their positions using conventional trilateration or multilateration methods.

In the example of FIG. 3A, no non-reference femto receives signals from more than two reference base stations. In particular, the femto B3 shown in the middle of room 30 in FIG. 3A does not receive signals from any reference transceiver. For determining position of a transceiver with unknown coordinates using conventional approaches, signals from at least three reference transceivers would be needed. Therefore, none of the non-reference transceivers in FIG. 3A could be located using conventional methods.

Connectivity in the example in FIG. 3A is shown in form of a graph in FIG. 3B, where the locations of the reference transceivers R1, R2 and R3 are marked by circles. In the connectivity graph of FIG. 3B, the "reference to non-reference" and "non-reference to non-reference" connections are shown by dashed lines and solid lines respectively. The x and y coordinates of the reference (R1, R2, R3) and non-reference (B1, B2, B3, B4, B5) transceivers for this example are listed below:

$z_{R1}=[25,5]^T$,
$z_{R2}=[75,95]^T$,
$z_{R3}=[25,95]^T$,
$z_{B1}=[30,35]^T$,
$z_{B2}=[50,15]^T$,
$z_{B3}=[50,55]^T$,
$z_{B4}=[50,85]^T$,
$z_{B5}=[70,35]^T$.

The matrices $C_r$ and $C_b$ for the assumed connectivity are given below. As shown, the non-reference transceivers have full connectivity among themselves $$C_r = \begin{bmatrix} 1 & 1 & 0 & 0 & 1 \\ 0 & 0 & 0 & 1 & 1 \\ 1 & 0 & 0 & 1 & 0 \end{bmatrix},$$

$$C_b = \begin{bmatrix} 0 & 1 & 1 & 1 & 1 \\ 1 & 0 & 1 & 1 & 1 \\ 1 & 1 & 0 & 1 & 1 \\ 1 & 1 & 1 & 0 & 1 \\ 1 & 1 & 1 & 1 & 0 \end{bmatrix}$$

It's assumed that all reference transceivers (femtos and macros in this example) are synchronized to each other and transmit at known time. Without loss of generality, we put $t_{R1}=t_{R2}=t_{R3}=0$. Note, the transmit times of the unknown transceivers (B1-B5) are unequal to zero, and also different for all transceivers, and not known.

For the 17 connections shown in FIG. 3B, a set of 16 equations for RTDOA estimates at different non-reference femtos are listed below. Even though this set of equations is not unique, it is complete such that no new equation that is independent of all those already included in the set can be found. The dimensions of difference operators T and $T_t$ are 16×17 and 16×8, respectively.

$RT\hat{D}OA_{B1(B2,R1)} = \hat{\tau}_{B1,B2} - \hat{\tau}_{B1,R1}$ $RT\hat{D}OA_{B1(B3,R1)} = \hat{\tau}_{B1,B3} - \hat{\tau}_{B1,R1}$ $RT\hat{D}OA_{B1(B4,R1)} = \hat{\tau}_{B1,B4} - \hat{\tau}_{B1,R1}$ $RT\hat{D}OA_{B1(B5,R1)} = \hat{\tau}_{B1,B5} - \hat{\tau}_{B1,R1}$ $RT\hat{D}OA_{B2(B1,R1)} = \hat{\tau}_{B2,B1} - \hat{\tau}_{B2,R1}$ $RT\hat{D}OA_{B2(B3,R1)} = \hat{\tau}_{B2,B3} - \hat{\tau}_{B2,R1}$ $RT\hat{D}OA_{B2(B4,R1)} = \hat{\tau}_{B2,B4} - \hat{\tau}_{B2,R1}$ $RT\hat{D}OA_{B2(B5,R1)} = \hat{\tau}_{B2,B5} - \hat{\tau}_{B2,R1}$ $RT\hat{D}OA_{B5(B1,R1)} = \hat{\tau}_{B5,B1} - \hat{\tau}_{B5,R1}$ $RT\hat{D}OA_{B5(B3,R1)} = \hat{\tau}_{B5,B3} - \hat{\tau}_{B5,R1}$ $RT\hat{D}OA_{B5(B4,R1)} = \hat{\tau}_{B5,B4} - \hat{\tau}_{B5,R1}$ $RT\hat{D}OA_{B4(B1,R2)} = \hat{\tau}_{B4,B1} - \hat{\tau}_{B4,R2}$ $RT\hat{D}OA_{B4(B3,R2)} = \hat{\tau}_{B4,B3} - \hat{\tau}_{B4,R2}$ $RT\hat{D}OA_{B5(B1,R2)} = \hat{\tau}_{B5,B1} - \hat{\tau}_{B5,R2}$ $RT\hat{D}OA_{B1(B2,R3)} = \hat{\tau}_{B1,B2} - \hat{\tau}_{B1,R3}$ $RT\hat{D}OA_{B4(B1,R3)} = \hat{\tau}_{B4,B1} - \hat{\tau}_{B4,R3}$ The diagonal covariance matrix of the noise in range measurements $\epsilon$ is a square matrix with its dimensions given by the number of available connections N (N=17 for the connectivity shown in FIG. 3B), as given below:

$$\varepsilon = \begin{bmatrix} \sigma^2_{B1,R1} & 0 & 0 & 0 & \ldots & 0 & 0 \\ 0 & \sigma^2_{B2,R1} & 0 & 0 & \ldots & 0 & 0 \\ & & \vdots & & & & \\ 0 & 0 & 0 & \sigma^2_{B4,R3} & \ldots & & \\ 0 & \ldots & & \sigma^2_{B1,B2} & \ldots & 0 & 0 \\ 0 & \ldots & & 0 & \sigma^2_{B1,B3} & \ldots & 0 & 0 \\ & & & & \vdots & & \\ 0 & 0 & 0 & 0 & \ldots & 0 & \sigma^2_{B4,B5} \end{bmatrix} \quad (22)$$

where $\sigma_{i,j}^2$ is the variance of TOA measurements between transceiver i and j. For simplicity, in one aspect of the described embodiments we assume the errors in TOA measurements to be normally distributed and independent of each other but with the same variance, i.e., $\sigma_{i,j}^2=2$ for all pairs of transceivers i and j.

A submatrix $G_{xy}$ obtained by considering only the first 2n columns of G (which correspond to the x and y coordinates of n non-reference femtos) is called geometry matrix when the partial derivates are computed at the true positions $z_B$.

The 2n×2n covariance matrix Q of the estimated x and y coordinates of n non-reference femtos is given by the equation below:

$$Q = (G_{xy}^T N^{-1} G_{xy})^{-1} \quad (23)$$

$$= \begin{bmatrix} \sigma_{x_{B1}}^2 & \sigma_{x_{B1} y_{B1}} & \sigma_{x_{B1} x_{B2}} & \cdots & \sigma_{x_{B1} y_{Bn}} \\ \sigma_{y_{B1} x_{B1}} & \sigma_{y_{B1}}^2 & \sigma_{y_{B1} x_{B2}} & \cdots & \sigma_{y_{B1} y_{Bn}} \\ & & \ddots & & \\ \sigma_{x_{Bn} x_{B1}} & \sigma_{x_{Bn} y_{B1}} & \sigma_{x_{Bn} x_{B2}} & & \\ \sigma_{y_{Bn} x_{B1}} & \sigma_{y_{Bn} y_{B1}} & \sigma_{y_{Bn} x_{B2}} & \cdots & \sigma_{y_{Bn}}^2 \end{bmatrix} \quad (24)$$

For a non-reference femto i, we ignore the cross-correlations between its x and y coordinates and those of the rest of (n−1) non-reference femtos and extract only a submatrix $Q_{Bi}$ as given below:

$$Q_{Bi} = \begin{bmatrix} \sigma_{x_{Bi}}^2 & \sigma_{x_{Bi} y_{Bi}} \\ \sigma_{y_{Bi} x_{Bi}} & \sigma_{y_{Bi}}^2 \end{bmatrix} \quad (25)$$

Figure 3C:
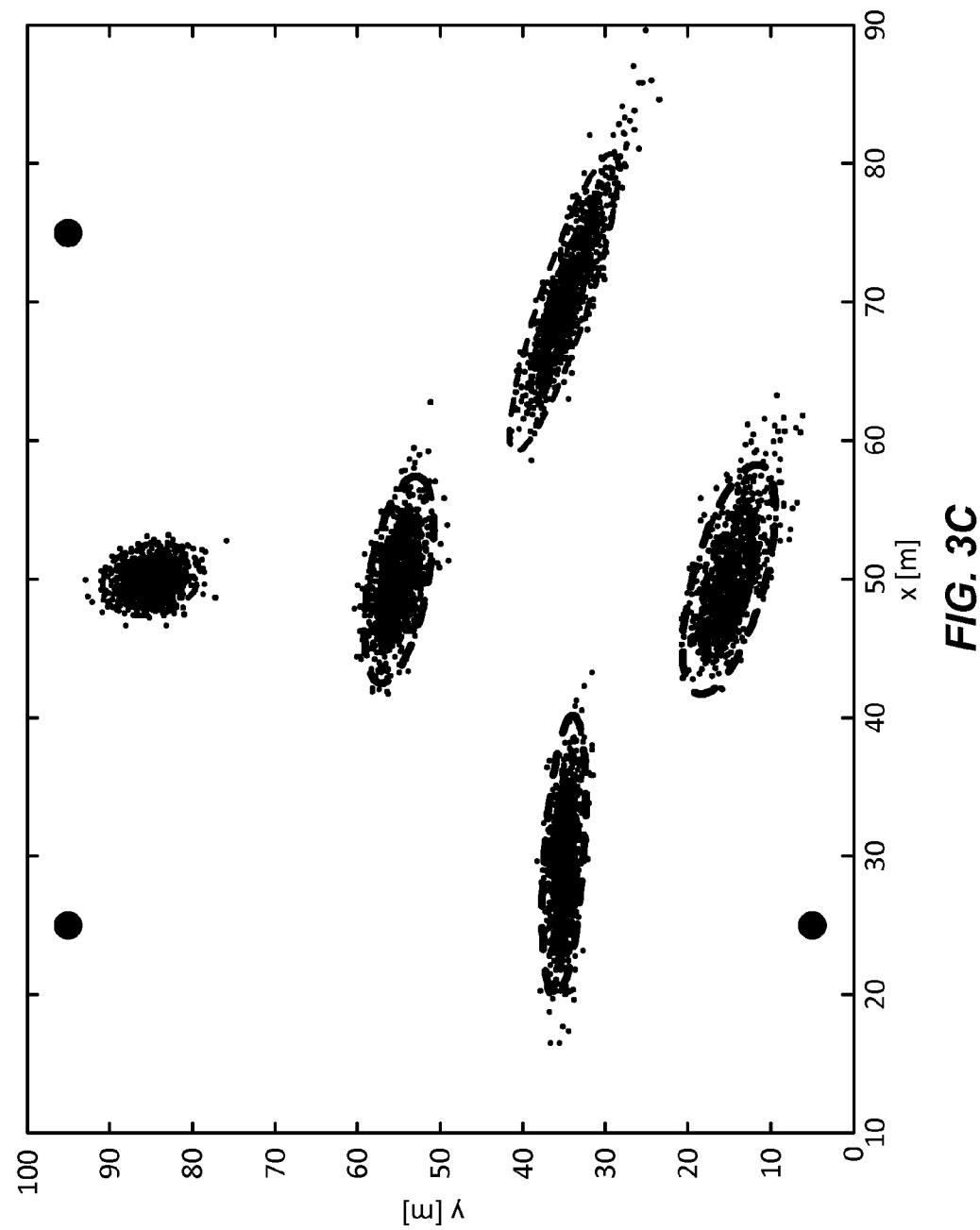
FIGS. 3C and 3D illustrate estimates made by computer 190 for locations of wireless transceivers B1,B2, B3, B4, B5 illustrated in FIG. 3A, wherein time of arrival measurements are made in an asynchronous network and a synchronous network respectively.

For the assumed variance in TOA estimates (i.e., $\sigma_{i,j}^2 = 2$), the estimated positions of the non-reference transceivers are plotted as dots in FIG. 3C around their true positions for 1000 independent sets of measurements. The error ellipses enclosing 65% and 95% of all position estimates are also shown. The ellipses for a non-reference transceiver are computed using the corresponding 2×2 covariance matrix as given by equation (27).

The transmit times at the non-reference transceivers are estimated for each set of measurement in addition to the position coordinates as described above. These estimated transmit times can be used to synchronize the non-reference femtos. The local clock in the non-reference femto is adjusted for the estimated transmit times (i.e., advanced or delayed based on the transmit time estimate). After this adjustment of clocks in the non-reference femtos, the RTDs in the network are all zero, and therefore, the femto network is synchronized to the macro network time.

With the new adjusted (i.e., synchronized) transmit times, the position location method described above can be repeated, but this time, only the locations of the non-reference femtos are solved, because the RTDs are now zero. This indicates the number of unknowns to estimate are less, resulting in an improved estimate of the unknown locations. In this case, less connectivity (i.e., less RTDOA estimates) would be sufficient to estimate the unknown femto locations only.

Figure 3D:
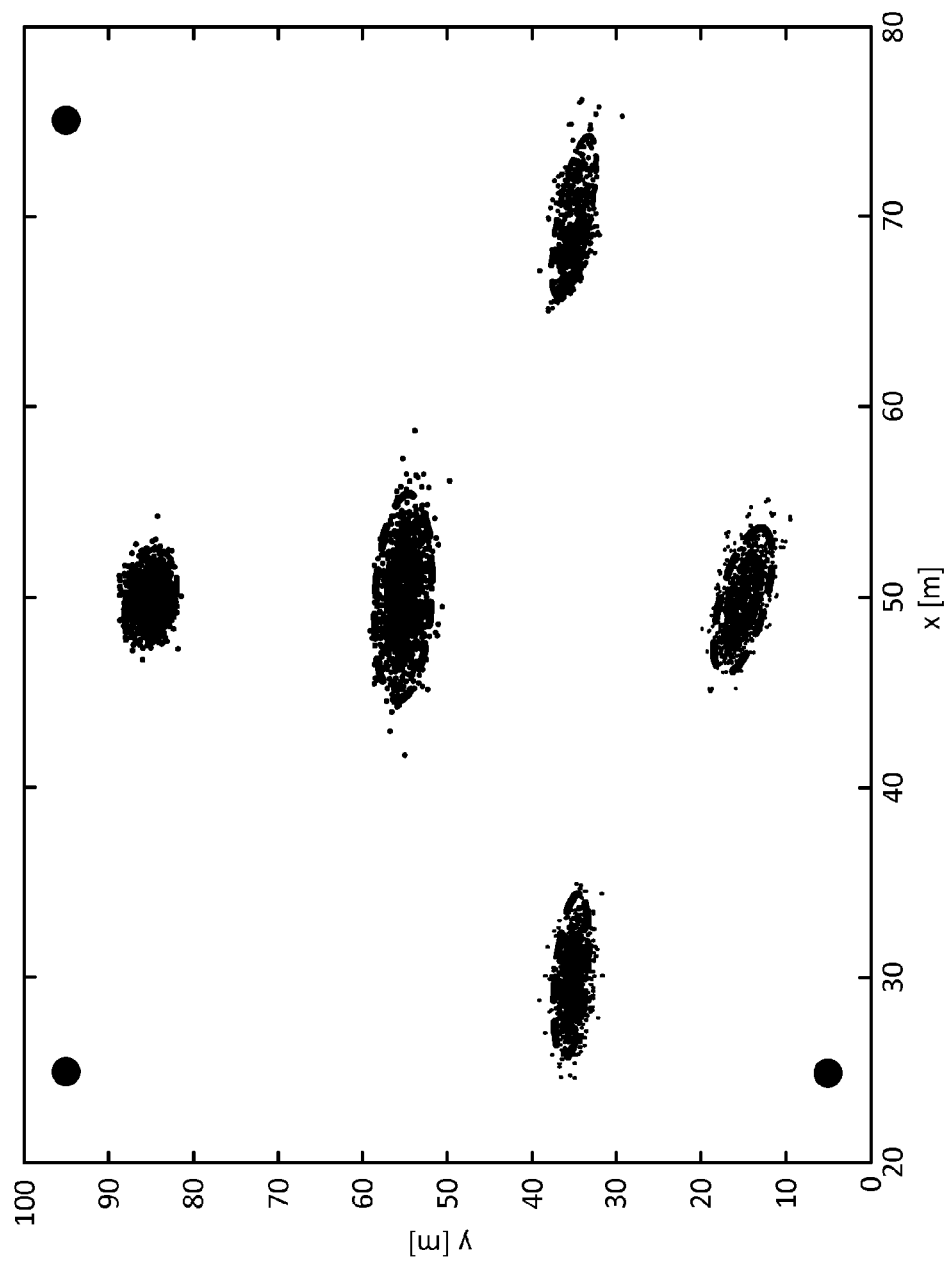

The result of the second run of the method after adjustment of the transmit times of the non-reference femtos is plotted as dots in FIG. 3D around their true positions for 1000 independent sets of measurements. The error ellipses enclosing 65% and 95% of all position estimates are also shown. It can be noticed, when visually comparing FIG. 3D and FIG. 3C that the error ellipses are now smaller, i.e., an improved location estimate can be obtained after a second run of the method when after the first run the estimated transmit times have been used to adjust the transmit times of the non-reference femtos.

Figure 8:
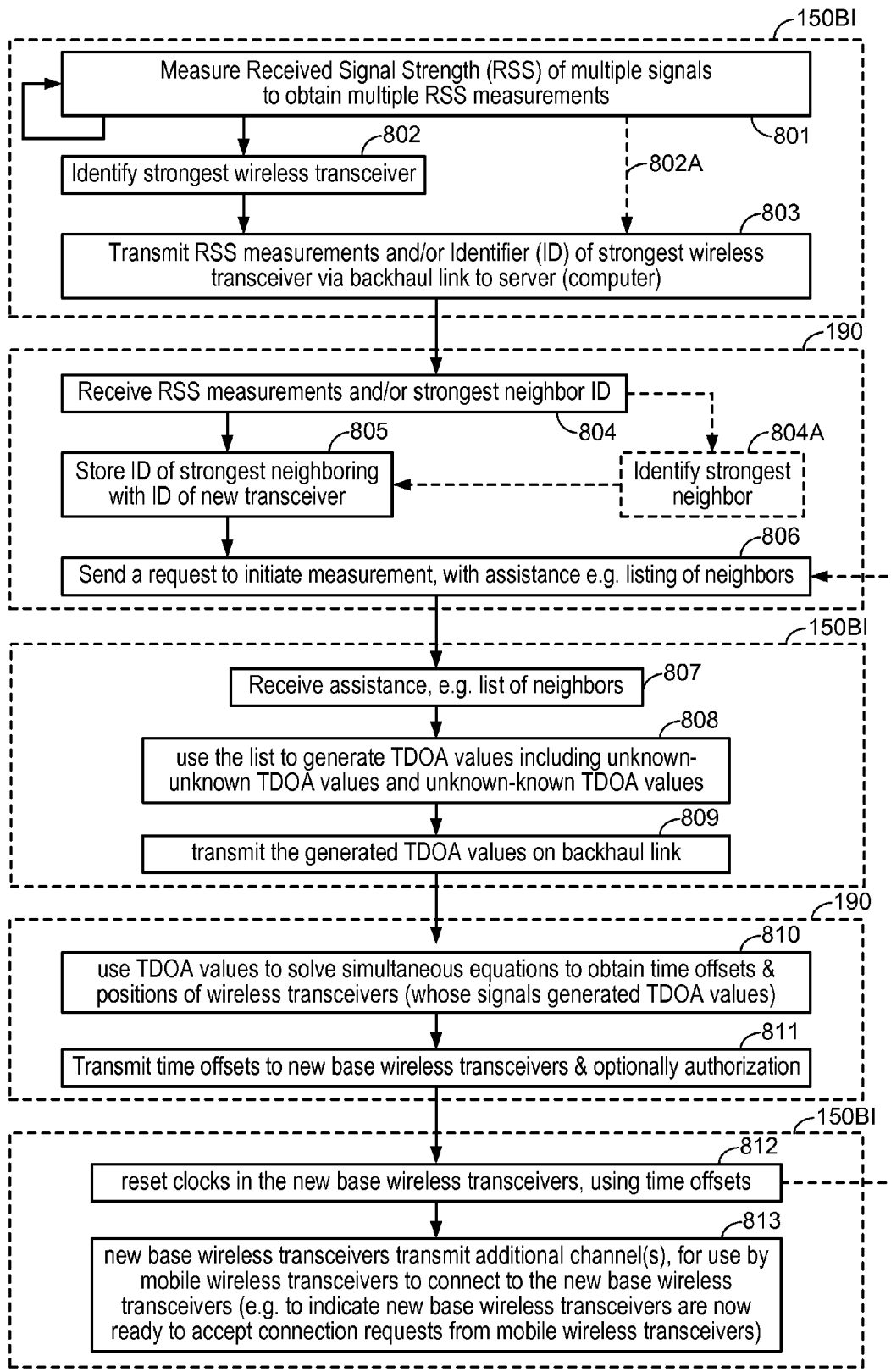
FIG. 8 illustrates, in another high-level flow chart, another method performed by a system of the type shown in FIG. 1A, to improve accuracy in measurements made by a wireless transceiver in certain aspects of the described embodiments.

In several aspects of the described embodiments, each femto is equipped with a Network Listening Module (NLM) which is typically used to measure the signal strengths of neighboring macros so as to set the downlink (DL) transmit power of the femtos. In several aspects of the described embodiments, this NLM module may also be used to obtain TDOA measurements and/or TOA measurements. The following procedure, or components thereof, may be used by the femto to obtain TDOA measurements:

(1) The non-reference femto measures the strongest macro cell or reference femto in its vicinity. For example, wireless transceiver 150BI measures received signal strength (RSS) of multiple signals, to obtain multiple RSS measurements as per act 801 (see FIG. 8) and then sorts the measurements to identify the transceiver having the largest measurement as the strongest as per act 802.

(2) In order to request assistance data from a location server 190, the femto cell provides the strongest macro cell (or reference femto) as its reference. For example, as per act 803 in FIG. 8, wireless transceiver 150BI transmits RSS measurements and/or identity of the strongest macro cell on backhaul link 189 to computer 190.

(3) The location server 190 responds to the request by providing assistance data (e.g. via backhaul link 189), e.g. in the form of a listing of macro and femto cells in its vicinity (for use in making TDOA/TOA measurements) and any other data that may assist the femto in making the TDOA/TOA measurements (e.g., pilot signal configuration information, etc.). This listing may be updated periodically or when an event occurs (e.g. a new femto is added to the network.). Other assistance data (e.g. for assisted GNSS) may also be provided by the location server 190 to the femto. For example, as illustrated by act 804, computer 190 receives the RSS measurements and/or the identity (ID) of the strongest neighbor of the new wireless transceiver 150BI. If the strongest neighbor has not yet been identified (e.g. if act 802 is skipped by performing act 802A), then computer 190 performs act 804A to find the strongest neighbor. Then, computer 190 performs act 805 to store the RSS measurements and/or to store strongest neighbor's ID with the new transceiver's ID. Computer 190 performs act 806 of sending assistance to the new transceiver 150BI, after performing act 805.

(4) The femto uses this assistance data to obtain TDOA/TOA measurements. For example, as illustrated by act 807, wireless transceiver 150BI receives the assistance (e.g. a list of neighbors) and goes to act 808. In act 808, wireless transceiver 150BI uses the assistance to generate TDOA values, e.g. uses the list to make measurements. The TDOA values generated in act 808 include unknown-unknown TDOA values and unknown-known TDOA values as described herein. Then, in an act 809, the TDOA values generated in act 808 are transmitted via backhaul link 189 to computer 190. Computer 190 then uses the received TDOA values to solve simultaneous equations as per act 810, and then in act 811 computer 190 transmits time offsets and authorization to the new wireless transceiver 150BI. New wireless transceiver 150BI uses the time offset to reset its clock (as per act 812) and then joins the network by transmitting a predetermined signal with a predetermined set of codes (e.g. a pilot signal or PRS).

To reduce the number of unknowns to solve for, in some aspects of the described embodiments a non-reference femto sets its timing (e.g. between acts 807 and 808 in FIG. 8) based on a time at which that femto receives its signal from a reference femto or macro. The femto could indicate this information to the location server (e.g. in the form of femto's own ID, and an ID of the femto from which the signal is received, and timing).

In some aspects of the described embodiments, unlike planned macros, the Physical Cell Identity (PCI) of a femto may not be unique in a geographic area. To prevent confusion, in several aspects of the described embodiments the femto may need to report its own and/or neighbor femtos Global Cell Identity (GCI) or equivalent unique identifier of itself, as well as the cell it is using as a time reference. Hence, in certain aspects of the described embodiments, computer 190 uses two identifiers namely a femto's PCI and the GCI in combination as the femto's ID.

In several aspects of the described embodiments, the TDOA is obtained by measurements of Positioning Reference Signals (PRS) in the case the network operates according to the 3GPP LTE standard. One issue with such measurements is that the PRS of all cells typically overlap in a macro environment. This is a problem for femtos as they can't transmit and receive PRS at the same time. One solution used in several aspects of the described embodiments is to have different femtos transmit PRS at different times (e.g. by choosing different PRS configuration). Such "time reuse" has different variations depending on the aspect of the described embodiments. For example, in some aspects of the described embodiments, a time slot picked by a particular femto is chosen randomly, while in other aspects the time slot is signaled to other femtos etc.

In several aspects of the described embodiments, two or more femtos simultaneously silence their pilot signals (generated by their downlink transmitters), while one or more of these silenced femtos makes measurements of signals from non-silenced (i.e. active) femtos. Silencing of femtos reduces interference (from the silenced femtos) which enables additional measurements to be made than would be possible without silencing. Femtos may be silenced for certain silence intervals, which may correspond to PRS occasions described above.

In some aspects of the described embodiments, a PRS signal that is used to obtain TDOAs is prepared and transmitted as described in U.S. application Ser. No. 12/651,838 which is incorporated by reference herein in its entirety, as noted at the beginning of the current patent application.

In some aspects of the described embodiments, a duration for silencing a neighboring femto is calculated by computer 190 for a given femto in a predetermined manner, e.g. based on a number of femtos whose pilot signals are sensed at the given femto. Then the neighboring femto is requested to observe silence for the calculated duration, starting from whenever the given femto is instructed to start its measurements.

Although certain aspects of coordinated silence are described above, numerous other ways to use coordinated silence will be readily apparent in view of this disclosure, as well as the disclosure in U.S. application Ser. No. 12/561,844 which is incorporated by reference herein in its entirety, as noted at the beginning of the current patent application.

In some aspects of the described embodiments, a solution to the ML estimation problem in equation (22) is obtained by gradient descent minimization (using Taylor series expansion) as explained before. In case the network is fully synchronized, the RTDs are zero and the noise covariance matrix is given by equation (15). Alternately, when an non-reference transceiver i obtains its synchronization from a reference transceiver j by setting its transmit time to the time at which it receives the signal from cell j, then $$t\_i - t\_j = \text{sqrt}[(x\_i - x\_j)^2 + (y\_i - y\_j)^2]$$

This makes the RTDs a function of the unknown positions, thus leading to only 2n unknown variables, which can be solved if there are 2n equations.

Note that although in some aspects of the described embodiments, x and y coordinates are used to identify the geographic position of a wireless transceiver, in other aspects of the described embodiments, latitude, longitude and altitude are used instead.

In some aspects of the described embodiments, a method and apparatus of the type described herein in reference to FIGS. 1A-1E, 2, 3A-3D, 4A-4C, 5A-5H, 6A, 6B, and 7A-7G are used with the United States Global Positioning System (GPS). In several such aspects, time in GPS clock software is maintained by its estimated value in a reference wireless transceiver 150RA, and an uncertainty associated with that value. It may be noted that after an accurate GPS location fix, the GPS time will often be accurately known (within a few tens of nanoseconds uncertainty in the current GPS implementations).

Moreover, in addition to GPS, a method and apparatus illustrated in FIGS. 1A-1E, 2, 3A-3D, 4A-4C, 5A-5H, 6A, 6B, and 7A-7G may also be used with various other satellite positioning systems (SPS), such as the Russian Glonass system, the European Galileo system, any system that uses satellites from a combination of satellite systems, or any satellite system developed in the future. Accordingly, although a GPS environment is used in some aspects of the described embodiments, the system and method described herein may be implemented in any positioning system.

Furthermore, some aspects of the disclosed method and apparatus may be used with positioning determination systems that utilize wireless signals from pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used in describing this described embodiments, is intended to include pseudolites, equivalents of pseudolites, and possibly others. The term "SPS signals", as used herein, is intended to include SPS-like signals from pseudolites or equivalents of pseudolites.

Depending on the aspect of the described embodiments, a wireless transceiver 150BI (FIG. 1A) of the type described above may also be included in any mobile station (MS), of the type described herein. As used herein, a mobile station (MS) refers to a device such as a cellular or other wireless communication device (e.g. cell phone), personal communication system (PCS) device, personal navigation device (PND), Personal Information Manager (PIM), Personal Digital Assistant (PDA), laptop or other suitable mobile device which is capable of receiving wireless communications. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server computer, or at another device associated with the network. Any operable combination of the above are also considered a "mobile station." The terms "mobile station" and "mobile device" are often used interchangeably. Personal Information Managers (PIMs) and Personal Digital Assistants (PDAs) which are capable of receiving wireless communications. Note that in some aspects of the described embodiments, such a mobile station is equipped with a network listening module (NLM) configured to perform TOA measurements that are then transmitted to computer 190.

The methodologies described herein in reference to any one or more of FIGS. 1A-1E, 2, 3A-3D, 4A-4C, 5A-5H, 6A, 6B, and 7A-7G may be implemented by various means depending upon the application. For example, these methodologies may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any non-transitory machine readable medium tangibly embodying instructions (e.g. in binary) may be used in implementing the methodologies described herein. For example, computer instructions (in the form of software) 421 may be stored in a memory 192 (FIG. 4B) of computer 190, and executed by a processor 194, for example a microprocessor. Moreover, memory 192 (FIG. 4B) may be implemented within a single chip that includes processor 194 or external to the chip that contains processor 194. As used herein the term "memory" refers to any type of long term, short term, volatile (e.g. DRAM), nonvolatile (e.g. SRAM), or other memory accessible by a processor 194 of a computer 190 (FIG. 4B) and is not to be limited to any particular type of memory or number of memories, or type of media upon which memory is stored.

Note that each of wireless transceivers 150BI, 150BJ, 150BK, 150RA, 150RB (see FIG. 1A) may itself include one or more processors and one or more memories, similar to computer 190 illustrated in FIG. 4B. Hence, such processor (s) in wireless transceivers 150BI, 150BJ, 150BK, 150RA may be programmed with instructions comprised in non-transitory computer-readable storage media, to prepare and transmit TOA and/or TDOA measurements, in response to requests from computer 190. Depending on the aspect of the described embodiments, when making the measurements, such processor(s) in wireless transceivers 150BI, 150BJ, 150BK, 150RA may use clocks that are not synchronized (e.g. to one another and/or to a global time base of a wireless communication network).

Some aspects of the described embodiments use a cost function that is a complex (non-convex) function of 2n or 3n variables/parameters with possibly multiple local minima. In several aspects of the described embodiments, position/time estimates are obtained by minimizing this cost function, i.e., finding the global minimum. Non-linear least squares (LS) method is used in certain aspects of the described embodiments. Non-linear cost function can be linearized by expanding constituent terms using Taylor series and retaining only the zero-th and first order terms. Least squares method that is used in some aspects of the described embodiments is sensitive to initial guesses of unknown parameters with which the iterative minimization is started. Specifically, if initial guesses are too far-off from true values, the method may fail to converge to a solution. In such cases, the iterative minimization may be started again with new, different values, of initial guesses in several aspects of the present described embodiments. Moreover, the minimization of the cost function can be repeated several times, each time with a different set of initial guesses. At each repetition of the iterative minimization procedure, the value of the cost function after convergence is stored in some memory. In a final step, a converged solution which resulted in the minimum value of the cost function is selected (from among multiple converged solutions) as the final solution. In some aspects of the described embodiments, positioning performance results are obtained using non-linear least squares method, wherein initial guesses are the true values of the unknown parameters, and performance results are considered as reference results that accurately identify the position and time offsets of non-reference femtos.

In some situations, no prior information (or guesses) about the positions of non-reference femtos may be available. Only positions and transmit times of reference femto/macro base station are known. In some aspects of the described embodiments, non-linear least squares (LS) method may converge to a local minimum or fail to converge at all if initial guesses are just randomly selected in the 2n-(or 3n-) dimensional search space. Hence, several aspects of the described embodiments use a stochastic search technique which is able to search for global minimum while mostly avoiding getting stuck in a local minimum, such as a Simulated Annealing (SA) technique, or a Genetic Algorithm (GA) technique. Genetic Algorithm technique is used in some aspects of the described embodiments by computer 190 searching for a global minimization although it may fail to refine search around a minimum. Moreover, Simulated Annealing technique is used in some aspects of the described embodiments by computer 190 to do a finer search around a function minimum.

Some aspects of the described embodiments minimize the cost function and estimate positions/transmit times of non-reference femtos by using a non-linear LS method in computer 190 with many initial guesses with parameter values selected randomly within or close to the building 30 containing femtos. For example, a computer 190 in some aspects of the described embodiments selects parameter values corresponding to a run which gives the smallest value of a cost function. Several aspects of the described embodiments use a combination of Genetic Algorithm (GA) and Simulated Annealing (SA). Specifically, Genetic Algorithm is run multiple times within a bounded search area (using rough dimensions of the building 30 e.g. 30 meters×30 meters or dimensions of street boundaries within which building 30 is located) and the best result (smallest value of the cost function) is selected. Next, 3n parameter values (described above) corresponding to the best result from Genetic Algorithm are used as initial guesses for Simulated Annealing. Thereafter, Simulated Annealing is also run multiple times while updating algorithm parameters. Depending on the aspect of the described embodiments, Genetic Algorithm and/or Simulated Annealing is/are followed by LS method of the type described above in reference to FIGS. 5A-5H, where GA and/or SA provides initial guesses of parameter values.

In some aspects of the described embodiments, global search using GA is followed by further refinement using SA as follows: GA is run 5 times and a best result (smallest value of the cost function) is selected. Next, parameter values corresponding to the best result from GA are used as initial guesses for a first run of SA. In each subsequent run of SA, the parameter values from pervious run are taken as initial guesses. In total, SA is run 10 times. Thereafter, parameter values corresponding to smallest cost function are taken as final solution which identifies unknown positions of new wireless transceivers 150BI, 150BJ and 150BK. Accordingly, note that in some aspects of the described embodiments, a least squares solution to the simultaneous equations is not used at all, because a combination of GA and SA as described in this paragraph results in relatively accurate values for the unknown positions.

Figure 9:
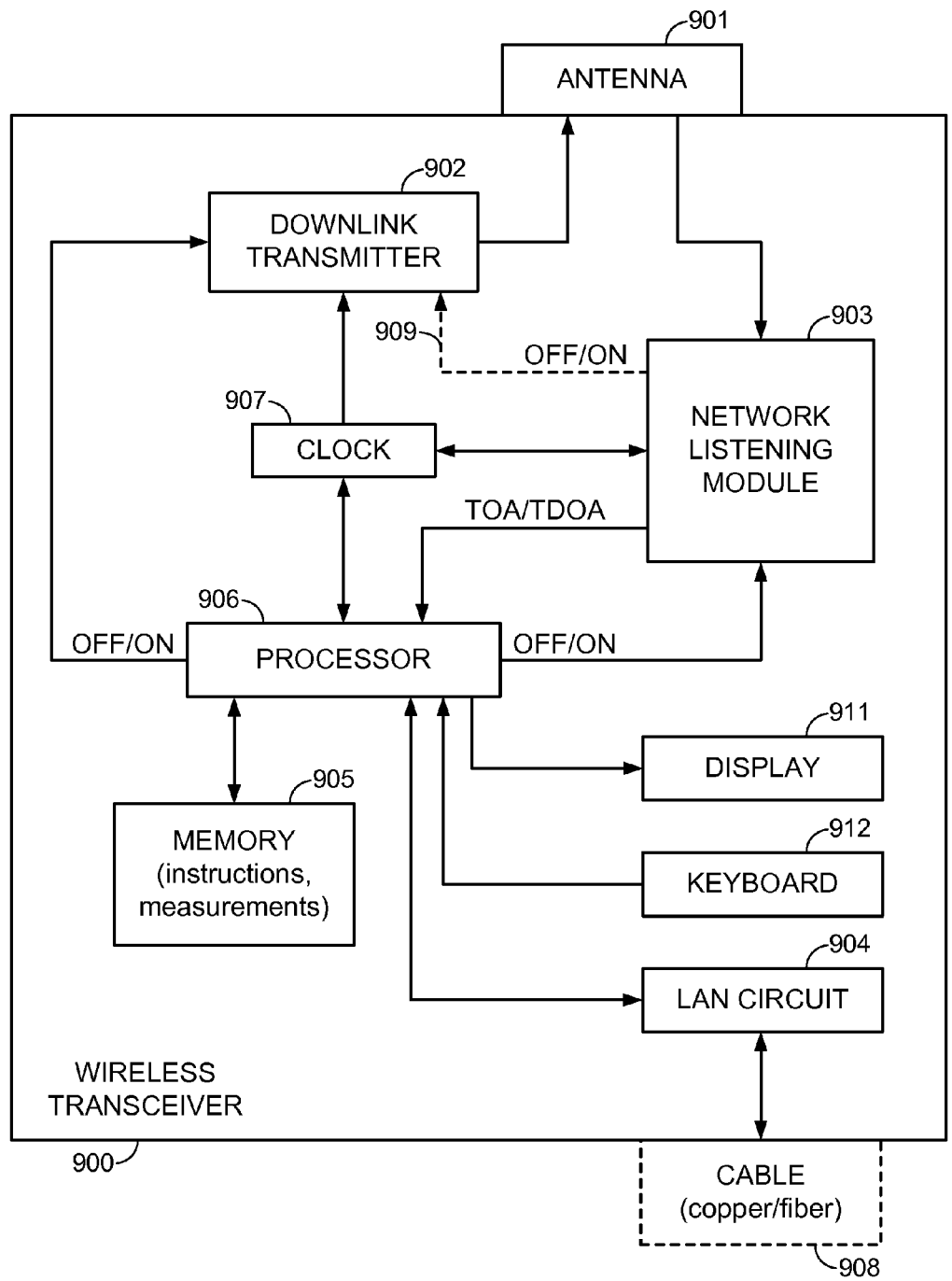
FIG. 9 illustrates, in a high-level block diagram a wireless transceiver 900 that makes measurements used by computer 190 to calculate unknown positions and optionally time offsets of multiple wireless transceivers (including transceiver 900), in certain aspects of the described embodiments.

In several aspects of the described embodiments, several wireless transceivers of the type described above, such as wireless transceivers 150RA, 150RB, 150BI, 150BJ and 150BK are implemented as illustrated in FIG. 9 by a wireless transceiver 900. Wireless transceiver 900 includes a clock 907 to be synchronized to a wireless communication network, and a network listening module 903 to generate measurements (relative to clock 907) of times of arrival (TOA) of wireless signals that are sensed by antenna 901. The network listening module 903 is a downlink receiver in several aspects of the described embodiments.

Conventional femtos may include a network listening module to sense the radio environment, e.g., for interference management purposes. In certain aspects of the described embodiments, the sensing of the radio environment (e.g. wireless signals) by a conventional femto may be modified by updating its firmware to perform methods of the type described herein, e.g. to include the functionality to measure TOA values. In some aspects of the described embodiments, firmware in wireless transceiver 900 is implemented to perform a method of determining a TOA value as described in U.S. application Ser. No. 12/606,037 that has been incorporated by reference above.

Referring back to FIG. 9, some wireless signals on antenna 901 may be received from unknown positions and have unknown timings while other wireless signals on antenna 901 may be received from known positions and have known timings (relative to a common clock of a wireless network). In several aspects of the described embodiment, a processor 906 in transceiver 900 is coupled to a network listening module 903 to receive TOA measurements being made therein. Note that processor 906 includes an arithmetic logic unit (ALU) which in turn includes a subtractor of the type described above in reference to ALU 197 of FIG. 4C, A memory 905 may be coupled to processor 906 to receive and store the measurements temporarily until retrieved by processor 906 for use in transmission via LAN circuit 904 to a cable 908 (formed of copper or optical fiber). Memory 905 may include machine instructions to processor 906 to use the measurements to compute time difference of arrival (TDOA) values. On execution of instructions in memory 905 by processor 906, each TDOA value may be computed as a difference between a pair of measurements among the measurements in memory 905.

In some aspects of the described embodiments, wireless transceiver 900 includes a downlink transmitter 902 to transmit a wireless signal on antenna 901. Downlink transmitter 902 is coupled to network listening module 903 by a line 909, so that module 903 can turn off transmitter 902 while making measurements and turn on transmitter 902 when measurements are completed. Moreover, processor 906 is also coupled to downlink transmitter 902 to turn it off in response to a request (such as a silence request) received on the LAN circuit 904. In several aspects, the silence request may specify a duration of silence therein. If so, after turning off downlink transmitter 902, processor 906 waits for the duration (as specified) and then turns on downlink transmitter 902.

If implemented in firmware and/or software, the functions may be stored as one or more instructions or code on a non-transitory computer-readable storage medium. Examples include non-transitory computer-readable storage media encoded with a data structure and non-transitory computer-readable storage media encoded with a computer program. Non-transitory computer-readable storage media may take the form of an article of manufacture. Non-transitory computer-readable storage media includes any physical computer storage media that can be accessed by a computer. By way of example, and not limitation, such non-transitory computer-readable storage media can comprise SRAM, ROM, EEPROM, CD-ROM or other optical disk storage, magnetic disk storage or other magnetic storage devices, or any other non-transitory medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Moreover, position determination techniques used by computer 190 (FIG. 1A) may be used for various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

The described embodiments may be implemented in conjunction with Wi-Fi/WLAN or other wireless networks. In addition to Wi-Fi/WLAN signals, a wireless/mobile station may also receive signals from satellites, which may be from a Global Positioning System (GPS), Galileo, GLONASS, NAVSTAR, QZSS, a system that uses satellites from a combination of these systems, or any SPS developed in the future, each referred to generally herein as a Satellite Positioning System (SPS) or GNSS (Global Navigation Satellite System). The described embodiments may also be implemented in conjunction with pseudolites or a combination of systems that includes pseudolites. The described embodiments can be implemented in conjunction with femtocells or a combination of systems that includes femtocells.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass).

In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The methodologies may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals," as used herein, is intended to include SPS-like signals from pseudolites or equivalents of pseudolites.

This disclosure includes example embodiments; however, other implementations can be used. Designation that something is "optimized," "required" or other designation does not indicate that the current disclosure applies only to systems that are optimized, or systems in which the "required" elements are present (or other limitation due to other designations). These designations refer only to the particular described implementation.

Of course, many implementations of a method and system described herein are possible depending on the aspect of the described embodiments. The techniques can be used with protocols other than those discussed herein, including protocols that are in development or to be developed.

"Instructions" as referred to herein include expressions which represent one or more logical operations. For example, instructions may be "machine-readable" by being interpretable by a machine (in one or more processors) for executing one or more operations on one or more data objects. However, this is merely an example of instructions and claimed subject matter is not limited in this respect. In another example, instructions as referred to herein may relate to encoded commands which are executable by a processing circuit (or processor) having a command set which includes the encoded commands. Such an instruction may be encoded in the form of a machine language understood by the processing circuit. Again, these are merely examples of an instruction and claimed subject matter is not limited in this respect.

In several aspects of the described embodiments, a non-transitory computer-readable storage medium is capable of maintaining expressions which are perceivable by one or more machines. For example, a non-transitory computer-readable storage medium may comprise one or more storage devices for storing machine-readable instructions and/or information. Such storage devices may comprise any one of several non-transitory storage media types including, for example, magnetic, optical or semiconductor storage media. Such storage devices may also comprise any type of long term, short term, volatile or non-volatile devices memory devices. However, these are merely examples of a non-volatile computer-readable storage medium and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "locating," "terminating," "identifying," "initiating," "detecting," "solving", "obtaining," "hosting," "maintaining," "representing," "estimating," "reducing," "associating," "receiving," "transmitting," "determining," "storing" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine (or computer) readable instructions stored in a non-transitory computer-readable storage medium, for example. Such machine (or computer) readable instructions may comprise, for example, software or firmware stored in a non-transitory computer-readable storage medium included as part of a computing platform (e.g., included as part of a processing circuit or external to such a processing circuit). Further, unless specifically stated otherwise, a process described herein, with reference to flow diagrams or otherwise, may also be executed and/or controlled, in whole or in part, by such a computing platform.

Numerous modifications and adaptations of the various aspects described herein are encompassed by the attached claims.

The invention claimed is:

1. A method of determining unknown positions of wireless transceivers to be added to a wireless communication network, the method comprising:

obtaining a plurality of time difference of arrival (TDOA) values comprising a plurality of unknown-unknown TDOA values and a plurality of unknown-known TDOA values;

wherein each unknown-unknown TDOA value identifies a difference between a pair of measurements made at a first unknown position, the pair of measurements being of times of arrival of wireless signals transmitted from a pair of additional unknown positions;

wherein each unknown-known TDOA value identifies a difference between another pair of measurements, with one measurement in said another pair being of time of arrival of a wireless signal transmitted from one of the unknown positions and another measurement in said another pair being of time of arrival of an additional wireless signal transmitted from a known position;

solving a set of simultaneous equations, to identify at least the unknown positions, based on at least (a) the plurality of TDOA values and (b) a plurality of known positions including said known position; and storing in a memory, identifications of said unknown positions obtained by said solving.

2. The method of claim 1 further comprising:
prior to said obtaining, transmitting to a wireless transceiver at said first unknown position, a command to perform measurements.

3. The method of claim 1 further comprising:
receiving said measurements from said first unknown position; and
subtracting at least one of said measurements from another of said measurements to obtain at least one of said TDOA values.

4. The method of claim 1 wherein:
the wireless signals are clocked at known time offsets relative to one another.

5. The method of claim 1 wherein:
the wireless signals are clocked at unknown time offsets relative to one another; and
said time offsets are obtained by said solving of said set of simultaneous equations.

6. The method of claim 5 further comprising, after the storing:
obtaining a plurality of re-computed TDOA values;
wherein at least one re-computed TDOA value identifies a difference between a pair of repeated measurements that are made at the first unknown position after reset of an internal clock used in making the measurements by use of a time offset obtained by said solving; and
re-solving the set of simultaneous equations to identify at least a plurality of re-computed positions based on at least (a) the plurality of re-computed TDOA values and (b) the plurality of known positions; and
storing in said memory, at least the plurality of re-computed positions.

7. The method of claim 1 further comprising:
prior to said obtaining, transmitting to the unknown position, a listing of wireless transceivers whose signals are to be measured to generate at least a subset of said plurality of time difference of arrival (TDOA) values.

8. A method for a new wireless transceiver to be added to a wireless communication network, the method comprising:
receiving a first request;
generating a first plurality of measurements in response to the first request, by measuring at a first unknown position, a first plurality of times of arrival of a set of wireless signals;
transmitting the first plurality of measurements;
receiving a second request;
generating a second plurality of measurements in response to the second request by measuring at the first unknown position, a second plurality of times of arrival of wireless signals in a subset within said set;
wherein the subset excludes a wireless signal of maximum received signal strength (RSS) in said set; and
transmitting the second plurality of measurements.

9. The method of claim 8 further comprising:
setting a clock based on a time of arrival of a wireless signal from a known position;
wherein said setting is performed prior to receipt of the second request; and
transmitting an identification of a wireless transceiver at the known position, from which is received said wireless signal used in said setting of said clock.

10. The method of claim 8 further comprising:
receiving a timing offset with the second request; and
resetting a clock based on said timing offset, prior to said generating the second plurality of measurements.

11. A method for a new wireless transceiver to be added to a wireless communication network, the method comprising:
measuring received signal strength (RSS) of a plurality of wireless signals, to obtain a plurality of RSS measurements;
using the plurality of RSS measurements to identify a maximum RSS measurement therein;
transmitting an identification of a wireless transceiver that generated the maximum RSS measurement;
receiving a listing of wireless transceivers;
using the listing to generate a plurality of time difference of arrival (TDOA) values comprising a plurality of unknown-unknown TDOA values, and a plurality of unknown-known TDOA values;
wherein each unknown-unknown TDOA value identifies a difference between a pair of measurements at an unknown position, the pair of measurements being of times of arrival of signals transmitted from unknown positions;
wherein each unknown-known TDOA value identifies a difference between another pair of measurements at said unknown position, with one measurement in said another pair being of time of arrival of a wireless signal transmitted from one of the unknown positions and another measurement in said another pair being of time of arrival of an additional wireless signal transmitted from a known position; and
transmitting the plurality of TDOA values.

12. The method of claim 11 further comprising:
receiving a time offset that depends at least partially on the plurality of TDOA values; and
resetting an internal clock using the time offset.

13. The method of claim 11 further comprising:
joining the wireless communication network, by wirelessly transmitting a predetermined signal with a predetermined set of codes.

14. An apparatus for adding to a wireless communication network, a plurality of non-reference wireless transceivers having unknown positions and clocks of unknown synchronization relative to one another, the apparatus comprising:
means for obtaining a plurality of time difference of arrival (TDOA) values comprising a plurality of unknown-unknown TDOA values, and a plurality of unknown-known TDOA values;
wherein each unknown-unknown TDOA value identifies a difference between a pair of measurements made by a non-reference wireless transceiver located at an unknown position, the pair of measurements being of times of arrival of signals transmitted from unknown positions, by a corresponding pair of non-reference wireless transceivers;

wherein each unknown-known TDOA value identifies a difference between another pair of measurements at said non-reference wireless transceiver, with one measurement in said another pair being of time of arrival of a signal transmitted by one of the non-reference wireless transceivers and another measurement in said another pair being of time of arrival of an additional signal transmitted by a reference wireless transceiver comprised in the wireless communication network;

means, responsive to at least (a) the plurality of TDOA values and (b) a plurality of known positions of reference wireless transceivers in the wireless communication network, for solving a set of simultaneous equations, to identify at least the unknown positions of said non-reference wireless transceivers; and means for storing in a memory, identifications of said unknown positions obtained by said means for solving.

15. The apparatus of claim 14 wherein:
said means for solving additionally yields at least a plurality of time offsets of clocks internal to said non-reference wireless transceivers.

16. The apparatus of claim 14 further comprising:
means for transmitting on a backhaul link, a command to initiate said measurements; and
means for receiving from said backhaul link, said plurality of TDOA values.

17. The apparatus of claim 14 further comprising:
means for transmitting on a backhaul link, a command to initiate said measurements;
means for receiving from said backhaul link, said plurality of measurements; and
means for subtracting said measurements from one another.

18. The apparatus of claim 14 further comprising:
means for obtaining a plurality of re-computed TDOA values;
wherein each re-computed TDOA value identifies a difference between a pair of repeated measurements at said one of the non-reference wireless transceivers, each repeated measurement identifying said time of arrival relative to a common clock after reset; and
means, responsive to at least (a) the plurality of re-computed TDOA values and (b) the plurality of known positions of the plurality of reference wireless transceivers, for re-solving the set of simultaneous equations to identify at least a plurality of re-computed positions of said plurality of non-reference wireless transceivers.

19. A non-transitory storage medium comprising instructions, which, when executed by a machine, cause a processor to perform operations, the instructions comprising:
instructions to obtain a plurality of time difference of arrival (TDOA) values comprising a plurality of unknown-unknown TDOA values, and a plurality of unknown-known TDOA values;
wherein each unknown-unknown TDOA value identifies a difference between a pair of measurements made by a non-reference wireless transceiver located at an unknown position, the pair of measurements being of times of arrival of signals transmitted from unknown positions, by a corresponding pair of non-reference wireless transceivers;
wherein each unknown-known TDOA value identifies a difference between another pair of measurements at said non-reference wireless transceiver, with one measurement in said another pair being of time of arrival of a signal transmitted by one of the non-reference wireless transceivers and another measurement in said another pair being of time of arrival of an additional signal transmitted by a reference wireless transceiver comprised in the wireless communication network;

instructions, responsive to at least (a) the plurality of TDOA values and (b) a plurality of known positions of reference wireless transceivers in the wireless communication network, to solve a set of simultaneous equations, to identify at least the unknown positions of said non-reference wireless transceivers; and instructions to store in a memory, identifications of said unknown positions obtained by execution of said instructions to solve.

20. The storage medium of claim 19 wherein:
execution of the instructions to solve additionally yields at least a plurality of time offsets of clocks internal to said non-reference wireless transceivers.

21. The storage medium of claim 19 further comprising:
instructions to transmit a command to measure said time of arrival; and
instructions to receive from a backhaul link, said plurality of TDOA values.

22. The storage medium of claim 19 further comprising:
instructions to transmit a command to measure said time of arrival;
instructions to receive said measurements from a backhaul link; and
instructions to subtract said measurements from one another.

23. A wireless transceiver comprising:
a clock to be synchronized to a wireless communication network;
a network listening module to generate measurements relative to said clock to be synchronized, of a plurality of times of arrival of wireless signals from unknown position and having unknown timing and of another plurality of times of arrival of signals from known positions and having known timing;
a processor coupled to the network listening module to receive said measurements;
a memory coupled to the processor;
wherein the memory comprises machine instructions to said processor to compute a plurality of time difference of arrival (TDOA) values, each TDOA value being a difference between a pair of measurements among said plurality of measurements; and
a local area network (LAN) circuit coupled to the memory to receive therefrom the plurality of TDOA values.

24. The wireless transceiver of claim 23 further comprising:
a downlink transmitter coupled to the processor;
the downlink transmitter being turned off by the processor in response to request on the LAN circuit.

25. A non-transitory storage medium comprising instructions, which, when executed by a machine, cause a processor to perform operations, the instructions comprising:
instructions to generate a plurality of measurements, by measuring relative to said clock to be synchronized, a plurality of times of arrival of signals from a plurality of non-reference wireless transceivers of unknown position and unknown timing and another plurality of times of arrival of signals from another plurality of reference wireless transceivers of known position and known timing;

instructions to compute a plurality of time difference of arrival (TDOA) values, each TDOA value being computed as a difference between a pair of measurements among said plurality of measurements; and instructions to transmit the plurality of TDOA values.

26. The non-transitory storage medium of claim 25 further comprising:

instructions to receive a command to measure the plurality of times of arrival.

27. The non-transitory storage medium of claim 25 further comprising:

instructions, responsive to a command, to transmit a predetermined signal with a predetermined set of codes.

28. A computer comprising a local area network (LAN) circuit coupled to one or more processors and one or more memories, the one or more memories comprising:

data comprising a plurality of known locations of reference wireless transceivers;

software comprising instructions to said one or more processors to obtain a plurality of time difference of arrival (TDOA) values comprising a plurality of unknown-unknown TDOA values and a plurality of unknown-known TDOA values;

wherein each unknown-unknown TDOA value identifies a difference between a pair of measurements at a first unknown position, the pair of measurements being of times of arrival of wireless signals transmitted from a pair of additional unknown positions;

wherein each unknown-known TDOA value identifies a difference between another pair of measurements, with one measurement in said another pair being of time of arrival of a wireless signal transmitted from one of the unknown positions and another measurement in said another pair being of time of arrival of an additional wireless signal transmitted from a known position;

software comprising instructions to said one or more processors to solve a set of simultaneous equations, to identify at least the unknown positions, based on at least (a) the plurality of TDOA values and (b) a plurality of known positions including said known position; and software comprising instructions to said one or more processors to store in said one or more memories, identifications of said unknown positions resulting from execution of said instructions to solve.

29. The computer of claim 28 wherein the one or more memories further comprise:

software comprising instructions to subtract at least one of said measurements from another of said measurements to obtain at least one of said TDOA values.

30. The computer of claim 28 wherein the one or more memories further comprise:

software comprising instructions to said one or more processors to obtain a plurality of re-computed TDOA values;

wherein at least one re-computed TDOA value identifies a difference between a pair of repeated measurements that are made at the first unknown position after reset of an internal clock used to make the measurements, by use of a time offset obtained by execution of said instructions to solve the set of simultaneous equations; and software comprising instructions to said one or more processors to re-solve the set of simultaneous equations to identify at least a plurality of re-computed positions based on at least (a) the plurality of re-computed TDOA values and (b) the plurality of known positions; and software comprising instructions to said one or more processors to store in said one or more memories, at least the plurality of re-computed positions.

31. A wireless transceiver comprising:

means for receiving a first request;

means for generating a first plurality of measurements in response to the first request, by measuring at a first unknown position, a first plurality of times of arrival of a set of wireless signals;

means for transmitting the first plurality of measurements;

means for receiving a second request;

means for generating a second plurality of measurements in response to the second request by measuring at the first unknown position, a second plurality of times of arrival of wireless signals in a subset within said set;

wherein the subset excludes a wireless signal of maximum received signal strength (RSS) in said set; and means for transmitting the second plurality of measurements.

32. The wireless transceiver of claim 31 further comprising:

means for setting a clock based on a time of arrival of a wireless signal from a known position;

wherein said means for setting is operated prior to receipt of the second request; and means for transmitting an identification of a wireless transceiver at the known position, from which wireless transceiver is received said wireless signal used in said means for setting of said clock.

33. The wireless transceiver of claim 31 further comprising:

means for receiving a timing offset with the second request; and means for resetting a clock based on said timing offset, prior to operation of said means for generating the second plurality of measurements.

34. A non-transitory storage medium comprising instructions, which, when executed by a machine, cause a processor to perform operations, the instructions comprising:

instructions to receive a first request;

instructions to generate a first plurality of measurements in response to the first request, by measuring at a first unknown position, a first plurality of times of arrival of a set of wireless signals;

instructions to transmit the first plurality of measurements;

instructions to receive a second request;

instructions to generate a second plurality of measurements in response to the second request by measuring at the first unknown position, a second plurality of times of arrival of wireless signals in a subset within said set;

wherein the subset excludes a wireless signal of maximum received signal strength (RSS) in said set; and instructions to transmit the second plurality of measurements.

35. The non-transitory storage medium of claim 34 further comprising:

instructions to set a clock based on a time of arrival of a wireless signal from a known position;

wherein said instructions to set are configured to be performed prior to receipt of the second request; and instructions to transmit an identification of a wireless transceiver at the known position, from which is received said wireless signal used in said instructions to set said clock.

36. The non-transitory storage medium of claim 34 further comprising:

instructions to receive a timing offset with the second request; and instructions to reset a clock based on said timing offset, prior to execution of said instructions to generate the second plurality of measurements.

37. A computer comprising a local area network (LAN) circuit coupled to one or more processors and one or more memories, the one or more memories comprising software, the software comprising instructions to said one or more processors, the instructions comprising:
   instructions to receive a first request;
   instructions to generate a first plurality of measurements in response to the first request, by measuring at a first unknown position, a first plurality of times of arrival of a set of wireless signals;
   instructions to transmit, via the LAN circuit, the first plurality of measurements;
   instructions to receive a second request;
   instructions to generate a second plurality of measurements in response to the second request by measuring at the first unknown position, a second plurality of times of arrival of wireless signals in a subset within said set;
   wherein the subset excludes a wireless signal of maximum received signal strength (RSS) in said set; and
   instructions to transmit, via the LAN circuit, the second plurality of measurements.

38. The computer of claim 37 further comprising:
   instructions to set a clock based on a time of arrival of a wireless signal from a known position;
   wherein said instructions to set are to be performed prior to receipt of the second request; and
   instructions to transmit an identification of a wireless transceiver at the known position, from which is received said wireless signal used in said setting of said clock.

39. The computer of claim 37 further comprising:
   instructions to receive a timing offset with the second request; and
   instructions to reset a clock based on said timing offset, prior to execution of said instructions to generate the second plurality of measurements.

40. A wireless transceiver comprising:
   means for measuring received signal strength (RSS) of a plurality of wireless signals, to obtain a plurality of RSS measurements;
   means for using the plurality of RSS measurements to identify a maximum RSS measurement therein;
   means for transmitting an identification of a wireless transceiver that generated the maximum RSS measurement;
   means for receiving a listing of wireless transceivers;
   means for using the listing to generate a plurality of time difference of arrival (TDOA) values comprising a plurality of unknown-unknown TDOA values, and a plurality of unknown-known TDOA values;
   wherein each unknown-unknown TDOA value identifies a difference between a pair of measurements at an unknown position, the pair of measurements being of times of arrival of signals transmitted from unknown positions;
   wherein each unknown-known TDOA value identifies a difference between another pair of measurements at said unknown position, with one measurement in said another pair being of time of arrival of a wireless signal transmitted from one of the unknown positions and another measurement in said another pair being of time of arrival of an additional wireless signal transmitted from a known position; and
   means for transmitting the plurality of TDOA values.

41. The wireless transceiver of claim 40 further comprising:
   means for receiving a time offset that depends at least partially on the plurality of TDOA values; and
   means for resetting an internal clock using the time offset.

42. The wireless transceiver of claim 40 further comprising:
   means for joining the wireless communication network, by wirelessly transmitting a predetermined signal with a predetermined set of codes.

43. A non-transitory storage medium comprising instructions, which, when executed by a machine, cause a processor to perform operations, the instructions comprising:
   instructions to measure received signal strength (RSS) of a plurality of wireless signals, to obtain a plurality of RSS measurements;
   instructions to use the plurality of RSS measurements to identify a maximum RSS measurement therein;
   instructions to transmit an identification of a wireless transceiver that generated the maximum RSS measurement;
   instructions to receive a listing of wireless transceivers;
   instructions to use the listing to generate a plurality of time difference of arrival (TDOA) values comprising a plurality of unknown-unknown TDOA values, and a plurality of unknown-known TDOA values;
   wherein each unknown-unknown TDOA value identifies a difference between a pair of measurements at an unknown position, the pair of measurements being of times of arrival of signals transmitted from unknown positions;
   wherein each unknown-known TDOA value identifies a difference between another pair of measurements at said unknown position, with one measurement in said another pair being of time of arrival of a wireless signal transmitted from one of the unknown positions and another measurement in said another pair being of time of arrival of an additional wireless signal transmitted from a known position; and
   instructions to transmit the plurality of TDOA values.

44. The non-transitory storage medium of claim 43 further comprising:
   instructions to receive a time offset that depends at least partially on the plurality of TDOA values; and
   instructions to reset an internal clock using the time offset.

45. The non-transitory storage medium of claim 43 further comprising:
   instructions to join the wireless communication network, by wirelessly transmitting a predetermined signal with a predetermined set of codes.

46. A computer comprising a local area network (LAN) circuit coupled to one or more processors and one or more memories, the one or more memories comprising software, the software comprising instructions to said one or more processors, the instructions comprising:
   instructions to measure received signal strength (RSS) of a plurality of wireless signals, to obtain a plurality of RSS measurements;
   instructions to use the plurality of RSS measurements to identify a maximum RSS measurement therein;
   instructions to transmit, via the LAN circuit, an identification of a wireless transceiver that generated the maximum RSS measurement;
   instructions to receive, via the LAN circuit, a listing of wireless transceivers;
   instructions to use the listing to generate a plurality of time difference of arrival (TDOA) values comprising a plurality of unknown-unknown TDOA values, and a plurality of unknown-known TDOA values;

wherein each unknown-unknown TDOA value identifies a difference between a pair of measurements at an unknown position, the pair of measurements being of times of arrival of signals transmitted from unknown positions;

wherein each unknown-known TDOA value identifies a difference between another pair of measurements at said unknown position, with one measurement in said another pair being of time of arrival of a wireless signal transmitted from one of the unknown positions and another measurement in said another pair being of time of arrival of an additional wireless signal transmitted from a known position; and instructions to transmit, via the LAN circuit, the plurality of TDOA values.

47. The computer of claim 46 further comprising:

instructions to receive a time offset that depends at least partially on the plurality of TDOA values; and instructions to reset an internal clock using the time offset.

48. The computer of claim 46 further comprising:

instructions to join the wireless communication network, by wirelessly transmitting a predetermined signal with a predetermined set of codes.

49. A wireless transceiver comprising:

means for generating a plurality of measurements, by measuring relative to said clock to be synchronized, a plurality of times of arrival of signals from a plurality of non-reference wireless transceivers of unknown position and unknown timing and another plurality of times of arrival of signals from another plurality of reference wireless transceivers of known position and known timing;

means for computing a plurality of time difference of arrival (TDOA) values, each TDOA value being computed as a difference between a pair of measurements among said plurality of measurements; and means for transmitting the plurality of TDOA values.

50. The wireless transceiver of claim 49 further comprising:

means for receiving a command to measure the plurality of times of arrival.

51. The wireless transceiver of claim 49 further comprising:

means, responsive to a command, for transmitting a predetermined signal with a predetermined set of codes.

52. A method for a new wireless transceiver to be added to a wireless communication network, the method comprising:

generating a plurality of measurements, by measuring relative to said clock to be synchronized, a plurality of times of arrival of signals from a plurality of non-reference wireless transceivers of unknown position and unknown timing and another plurality of times of arrival of signals from another plurality of reference wireless transceivers of known position and known timing;

computing a plurality of time difference of arrival (TDOA) values, each TDOA value being computed as a difference between a pair of measurements among said plurality of measurements; and transmitting the plurality of TDOA values.

53. The method of claim 52 further comprising:

receiving a command to measure the plurality of times of arrival.

54. The method of claim 52 further comprising:

responsive to a command, transmitting a predetermined signal with a predetermined set of codes.

* * * * *